US012225538B2

(12) United States Patent
Jeon et al.

(10) Patent No.: US 12,225,538 B2
(45) Date of Patent: Feb. 11, 2025

(54) CONFIGURATION FOR WIRELESS COMMUNICATION IN INACTIVE OR IDLE STATES

(71) Applicant: Comcast Cable Communications, LLC, Philadelphia, PA (US)

(72) Inventors: Hyoungsuk Jeon, Centreville, VA (US); Esmael Dinan, McLean, VA (US); Taehun Kim, Reston, VA (US); Kyungmin Park, Vienna, VA (US); Yunjung Yi, Vienna, VA (US); Hua Zhou, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/358,194

(22) Filed: Jun. 25, 2021

(65) Prior Publication Data

US 2021/0410181 A1 Dec. 30, 2021

Related U.S. Application Data

(60) Provisional application No. 63/044,538, filed on Jun. 26, 2020.

(51) Int. Cl.
*H04W 72/23* (2023.01)
*H04W 72/1268* (2023.01)
*H04W 76/27* (2018.01)
*H04W 76/30* (2018.01)

(52) U.S. Cl.
CPC ....... *H04W 72/23* (2023.01); *H04W 72/1268* (2013.01); *H04W 76/27* (2018.02); *H04W 76/30* (2018.02)

(58) Field of Classification Search
None
See application file for complete search history.

(56) References Cited

U.S. PATENT DOCUMENTS

| 2018/0139778 | A1* | 5/2018 | Chou | H04W 76/27 |
| 2018/0270895 | A1* | 9/2018 | Park | H04W 24/04 |
| 2018/0288746 | A1* | 10/2018 | Zhang | H04L 12/189 |
| 2018/0295651 | A1* | 10/2018 | Cao | H04W 72/23 |
| 2019/0132862 | A1* | 5/2019 | Jeon | H04L 5/0098 |

(Continued)

FOREIGN PATENT DOCUMENTS

| WO | 2019217829 A1 | 11/2019 |
| WO | 2020067711 A1 | 4/2020 |

(Continued)

OTHER PUBLICATIONS

International Search Report and Written Opinion—PCT/US2021/039030—mailing date Sep. 2, 2021.

(Continued)

*Primary Examiner* — Jamaal Henson
(74) *Attorney, Agent, or Firm* — Banner & Witcoff, Ltd.

(57) ABSTRACT

Data may be communicated during a connected state of the wireless device using configured resources. The wireless device may transition to an inactive state and/or an idle state. A release message, for transitioning the wireless device from the connected state, may indicate resource information for the wireless device to use to be able to send and/or receive data in the inactive state and/or in the idle state.

30 Claims, 31 Drawing Sheets

(56) References Cited

U.S. PATENT DOCUMENTS

| | | | |
|---|---|---|---|
| 2019/0297537 A1 | 9/2019 | Tsai et al. | |
| 2020/0045694 A1* | 2/2020 | Yan | H04W 72/02 |
| 2020/0092905 A1* | 3/2020 | Vos | H04W 72/1268 |
| 2020/0107268 A1 | 4/2020 | Lee et al. | |
| 2020/0296759 A1* | 9/2020 | Agiwal | H04L 1/1822 |
| 2021/0014864 A1* | 1/2021 | Phuyal | H04W 72/23 |
| 2021/0022143 A1* | 1/2021 | Xiong | H04W 76/27 |
| 2021/0160879 A1* | 5/2021 | Lin | H04W 72/0453 |
| 2021/0307055 A1* | 9/2021 | Tsai | H04W 76/38 |
| 2021/0315049 A1* | 10/2021 | Wei | H04W 76/36 |
| 2022/0116802 A1* | 4/2022 | Kim | H04W 76/27 |

FOREIGN PATENT DOCUMENTS

| | | |
|---|---|---|
| WO | 2020076027 A1 | 4/2020 |
| WO | 2020087280 A1 | 5/2020 |

OTHER PUBLICATIONS

R1-2102076; 3GPP TSG-RAN WG1 Meeting #104-e; Moderator (ZTE): "Summary on the physical layer aspects of small data transmission" e-Meeting Jan. 25-Feb. 5, 2021.
R1-2100080; 3GPP TSG RAN WG1 #104-e; e-Meeting, Jan. 25-Feb. 5, 2021; ZTE, Sanechips "Discussion on physical layer aspects of small data transmission".
R2-2003257 3GPP TSG-RAN2 Meeting #109-e-Bis, Online, Apr. 20, 2020-Apr. 30, 2020, Source: ZTE Corporation, Sanechips, Title: Complete the HARQ process for PUR.
R2-2003258 3GPP TSG-RAN2 Meeting #109-e-Bis, Online, Apr. 20, 2020-Apr. 30, 2020, Source: ZTE Corporation, Sanechips, Title: Correction on successful PUR transmission indication.
R2-2003267 3GPP TSG-RAN2 Meeting #109-e-Bis, Online, Apr. 20, 2020-Apr. 30, 2020, Source: ZTE Corporation, Sanechips, Title: Correction on TA timer maintenance.
R2-2003278 3GPP TSG-RAN2 Meeting #109-e-Bis, Online, Apr. 20, 2020-Apr. 30, 2020, Source: ZTE Corporation, Sanechips, Title: Capture RRC setup using PUR.
3GPP TS 36.321 V16.0.0 (Mar. 2020), Technical Specification, 3rd Generation Partnership Project; Technical Specification Group Radio Access Network; Evolved Universal Terrestrial Radio Access (E-UTRA); Medium Access Control (MAC) protocol specification (Release 16).
3GPP TS 36.331 V16.0.0 (Mar. 2020), Technical Specification, 3rd Generation Partnership Project; Technical Specification Group Radio Access Network; Evolved Universal Terrestrial Radio Access (E-UTRA); Radio Resource Control (RRC); Protocol specification (Release 16).
3GPP TS 36.423 V16.0.0 (Dec. 2019) 3rd Generation Partnership Project; Technical Specification Group Radio Access Network; Evolved Universal Terrestrial Radio Access Network (E-UTRAN); X2 application protocol (X2AP) (Release 16).
3GPP TS 8.300 V16.0.0 (Dec. 2019) 3rd Generation Partnership Project; Technical Specification Group Radio Access Network; NR; NR and NG-RAN Overall Description; Stage 2 (Release 16).
3GPP TS 38.321 V15.8.0 (Dec. 2019) 3rd Generation Partnership Project; Technical Specification Group Radio Access Network; NR; Medium Access Control (MAC) protocol specification (Release 15).
3GPP TS 38.331 V16.0.0 (Mar. 2020) 3rd Generation Partnership Project; Technical Specification Group Radio Access Network; NR; Radio Resorce Control (RRC) protocol specification (Release 16).
3GPP TS 38.423 V16.1.0 (Mar. 2020), Technical Specification, 3rd Generation Partnership Project; Technical Specification Group Radio Access Network; NG-RAN; Xn application protocol (XnAP) (Release 16).

R1-2103334 3GPP TSG RAN WG1 Meeting #104B-e, Online, Apr. 12-20, 2021, Source: LG Electronics Inc., Title: Discussion on Physical Layer Aspects of Small Data Transmission.
R1-2103494 3GPP TSG RAN WG1 #104b-e, e-Meeting, April 12-Apr. 20, 2021, Source: ZTE, Sanechips, Title: Discussion on the physical layer aspects of small data transmission.
R2-2005737 3GPP TSG-RAN WG2 Meeting #110 electronic, Online, Jun. 1-Jun. 12, 2020, Source: Session Chair (Huawei), Title: Report NB-IoT breakout session.
R2-2004632 3GPP TSG-RAN WG2 Meeting #110-e, Electronic meeting, Jun. 1-12, 2020, Source: Ericsson, Title: [E906, E907] Remaining open issues in PUR.
R2-2004633 3GPP TSG-RAN WG2 Meeting #110-e, Online, Jun. 1-12, 2020, Source: Ericsson [To be RAN2], Title: LS reply on PUR transmission for NB-IoT/eMTC.
R2-2004817 3GPP TSG-RAN WG2 Meeting #110 electronic, Online, Jun. 11-Jun. 12, 2020, Source: ITL, Title: Remaining issue on NB-IoT Preconfigured resources.
R2-2005019 3GPP TSG_RAN WG2 Meeting #110-e, Online, Jun. 1-12, 2020, Source: Huawei, HiSilicon, Title: Discussion on start offset and requested TBS for PUR.
R2-2005020 3GPP TSG-RAN WG2 Meeting #110-e, Online, Jun. 1-12, 2020, Source: Huawei, HiSilicon, Title: RRC-MAC interactions for PUR.
R2-2005021 3GPP TSG-RAN WG2 Meeting #110-e, Online, Jun. 1-12, 2020, Source: Huawei, HiSilicon, Title: Discussion on RAN1 LSs for PUR.
R2-2005022 3GPP TSG-RAN WG2 Meeting #110-e, Online, Jun. 1-12, 2020, Source: Huawei, Title: Reply LS on PUR working assumption for NB-IoT and eMTC.
R2-2005023 3GPP TSG-RAN WG2 Meeting #110-e, Online, Jun. 1-12, 2020, Source: Huawei, Title: Reply LS on open PUR issues for NB-IoT/eMTC.
R2-2005035 3GPP TSG-RAN WG2 Meeting#110 e-Meeting, Jun. 1-12, 2020, Source: ZTE Corporation, Sanechips, Title: Remaining FFSs for PUR.
R2-2005206 3GPP TSG-RAN2 Meeting #110-e, Online, Jun. 1-12, 2020, Source: Qualcomm Incorporated, Title: [H810] [H840] [H854] PUR start time offset.
R2-2005569 3GPP TSG-RAN WG2 Meeting #110 electronic, Online, Jun. 1-Jun. 12, 2020, Source: ASUSTeK, Title: Remaining issue of D-PUR TA timer in RRC.
R2-2005570 3GPP TSG-RAN WG2 Meeting #110 electronic, Online, Jun. 1-Jun. 12, 2020, Source: ASUSTeK, Title: PUR configuration maintenance during RRC state transition.
R2-2005571 3GPP TSG-RAN WG2 Meeting #110e, Electronic Jun. 1-12, 2020, Source: ASUSTeK, Title: HARQ feedback in RRC_IDLE.
R2-2005936 3GPP TSG-RAN WG2 Meeting #110, Online, Jun. 1-12, 2020, Source: Ericsson (Summary rapporteur), Title: [ATT110-e][313] PUR open issues.
R2-2005937 3GPP TSG-RAN WG2 #110-e, Online, Jun. 1-12, 2020, Source: Ericsson [To be RAN2], Title: LS reply on PUR transmission for NB-IoT/eMTC.
R2-2005940 3GPP TSG-RAN WG2 Meeting #110, Online, Jun. 1-12, 2020, Source: Ericsson (Summary rapporteur), Title: [ATT110-e][313] PUR open issues—Phase 2.
R2-2005945 3GPP TSG-RAN WG2 Meeting #110, Online, Jun. 1-12, 2020, Source: Ericsson (Summary rapporteur), Title: [ATT110-e][313] PUR open issues—Phase 3.
R2-2005946 3GPP TSG-RAN WG2 #110-e, Online, Jun. 1-12, 2020, Source: RAN2, Title: LS reply on PUR transmission for NB-IoT/eMTC.
R2-2005726 3GPP TSG-RAN WG2 Meeting #110, Online, Jun. 1-12, 2020, Source: Ericsson (Summary rapporteur), Title: Summary for 7.2.3 Preconfigured uplink resources.
Feb. 6, 2024—Japanese Office Action—JP App. No. 2022-580137.

* cited by examiner

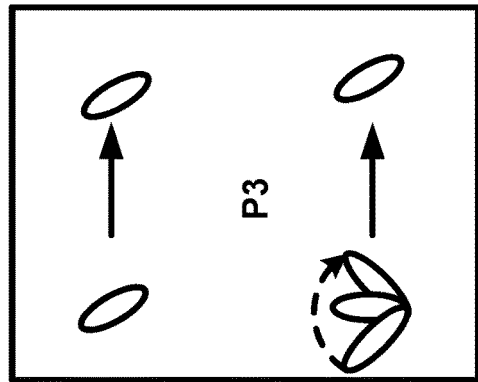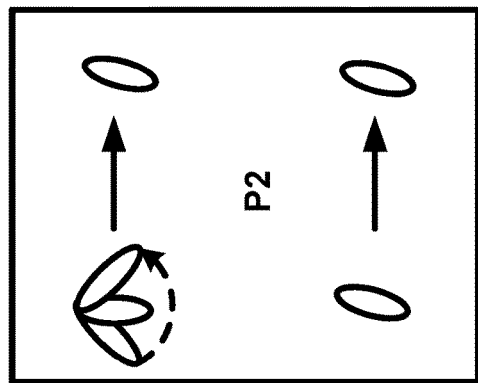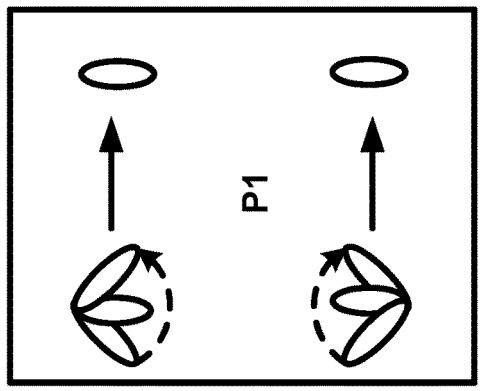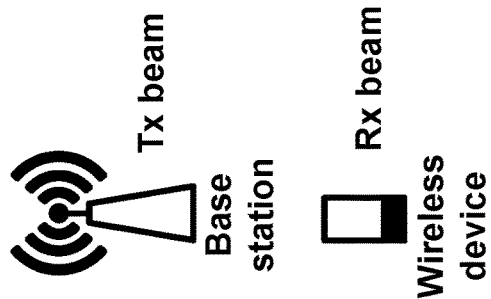
FIG. 12A
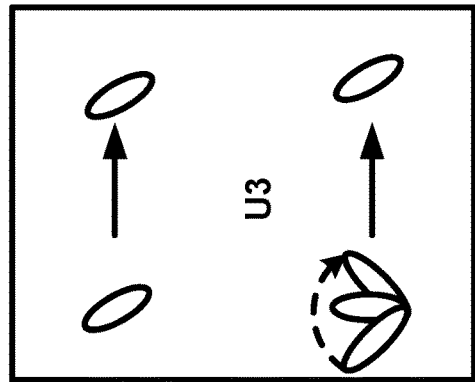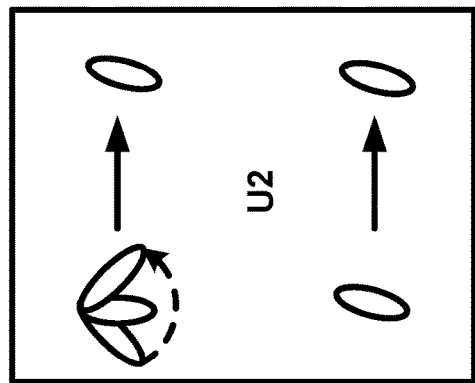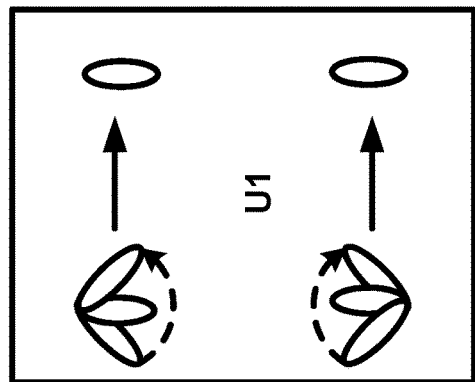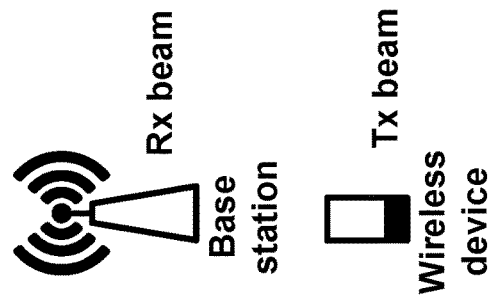
FIG. 12B

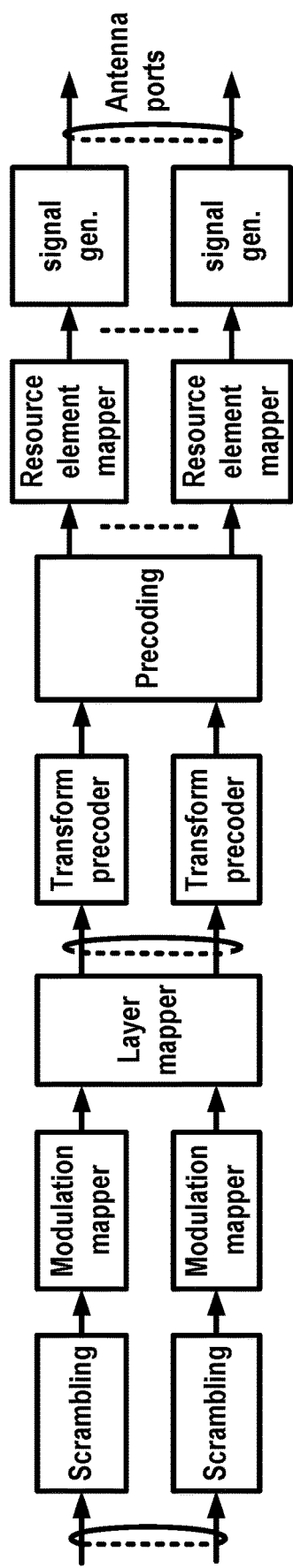
FIG. 16A
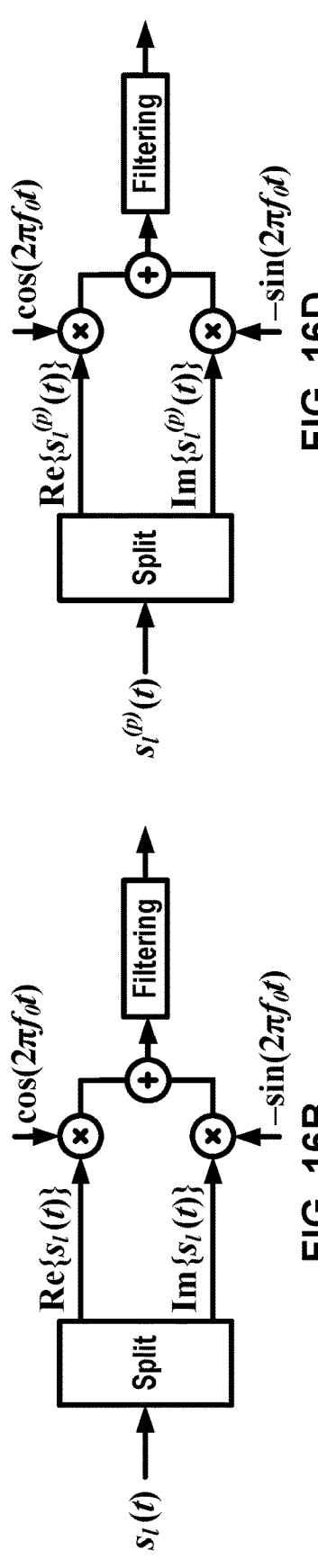
FIG. 16B
FIG. 16D
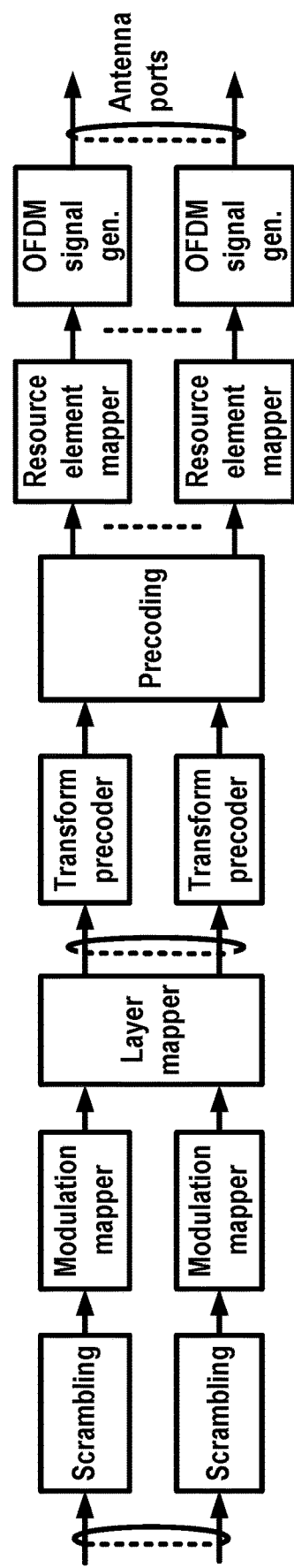
FIG. 16C

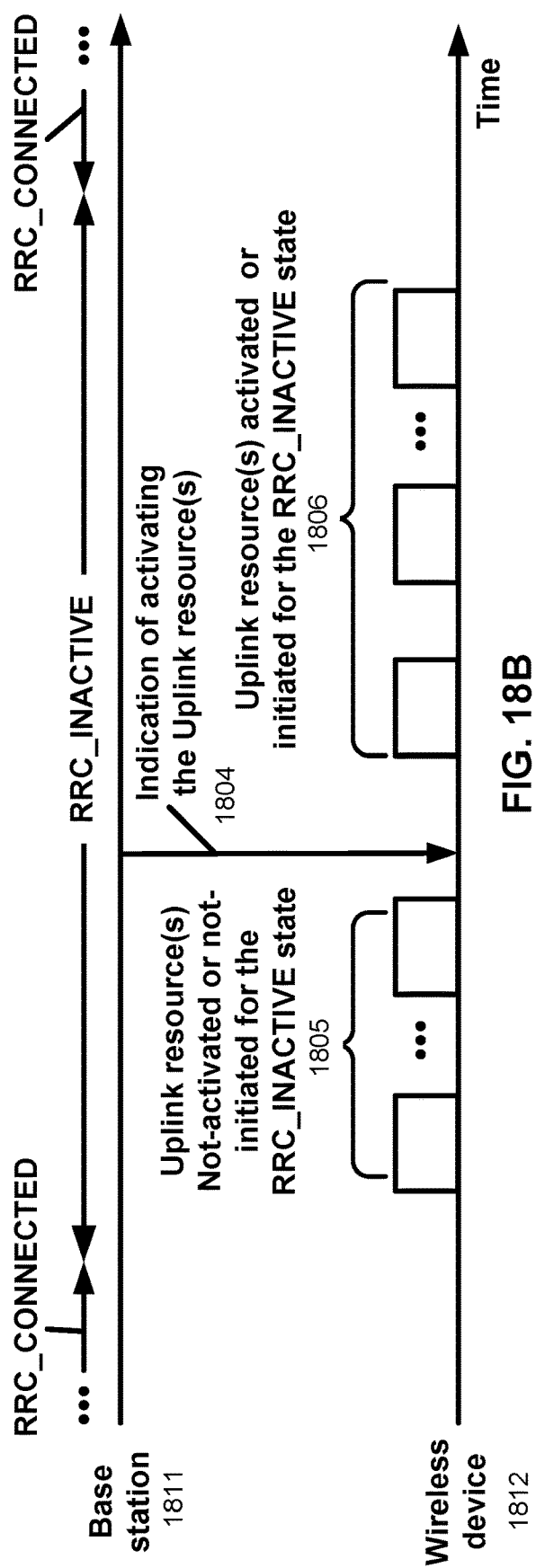

CONFIGURATION FOR WIRELESS COMMUNICATION IN INACTIVE OR IDLE STATES

CROSS-REFERENCE TO RELATED APPLICATIONS

This application claims the benefit of U.S. Provisional Application No. 63/044,538, filed on Jun. 26, 2020. The above-referenced application is hereby incorporated by reference in its entirety.

BACKGROUND

Wireless devices typically send and receive data during a connected state (e.g., radio resource control (RRC) connected state). Wireless devices typically do not send or receive data during an active state (e.g., RRC inactive state) or an idle state (e.g., RRC idle state).

SUMMARY

The following summary presents a simplified summary of certain features. The summary is not an extensive overview and is not intended to identify key or critical elements.

A base station may configure resources for the wireless device to use during a connected state. Data may be communicated during the connected state of the wireless device using the configured resources. The wireless device may transition to an inactive state and/or to an idle state, for example, if the wireless device may not have a quantity of data (e.g., greater than a threshold) to send to the base station. A release message, for transitioning the wireless device from the connected state to the inactive state and/or to the idle state, may indicate resource information for the wireless device to be able to use to send and/or receive data in the inactive state and/or in the idle state. By including such information in the release message, the wireless device may be able to send and/or receive data, such as small data transmissions (e.g., instant messaging, push notifications, sensor data, etc.), during the inactive state and/or during the idle state without requiring to return to the connected state, which may provide advantages such as reduced signaling overhead, reduced power consumption, and/or reduced latency.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 12A shows examples of downlink beam management procedures.

FIG. 12B shows examples of uplink beam management procedures.

FIG. 16A, FIG. 16B, FIG. 16C, and FIG. 16D show examples of uplink and downlink signal transmission.

FIG. 18A shows an example of configuration and/or activation of one or more radio resources.

FIG. 18B shows an example of configuration and/or activation of one or more radio resources.

DETAILED DESCRIPTION

Figure 1A:
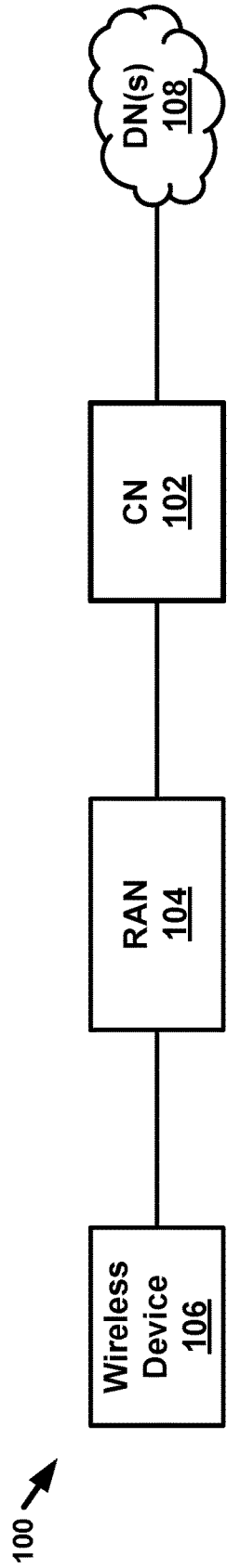
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to transmission and/or reception configuration and signaling for wireless communication.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
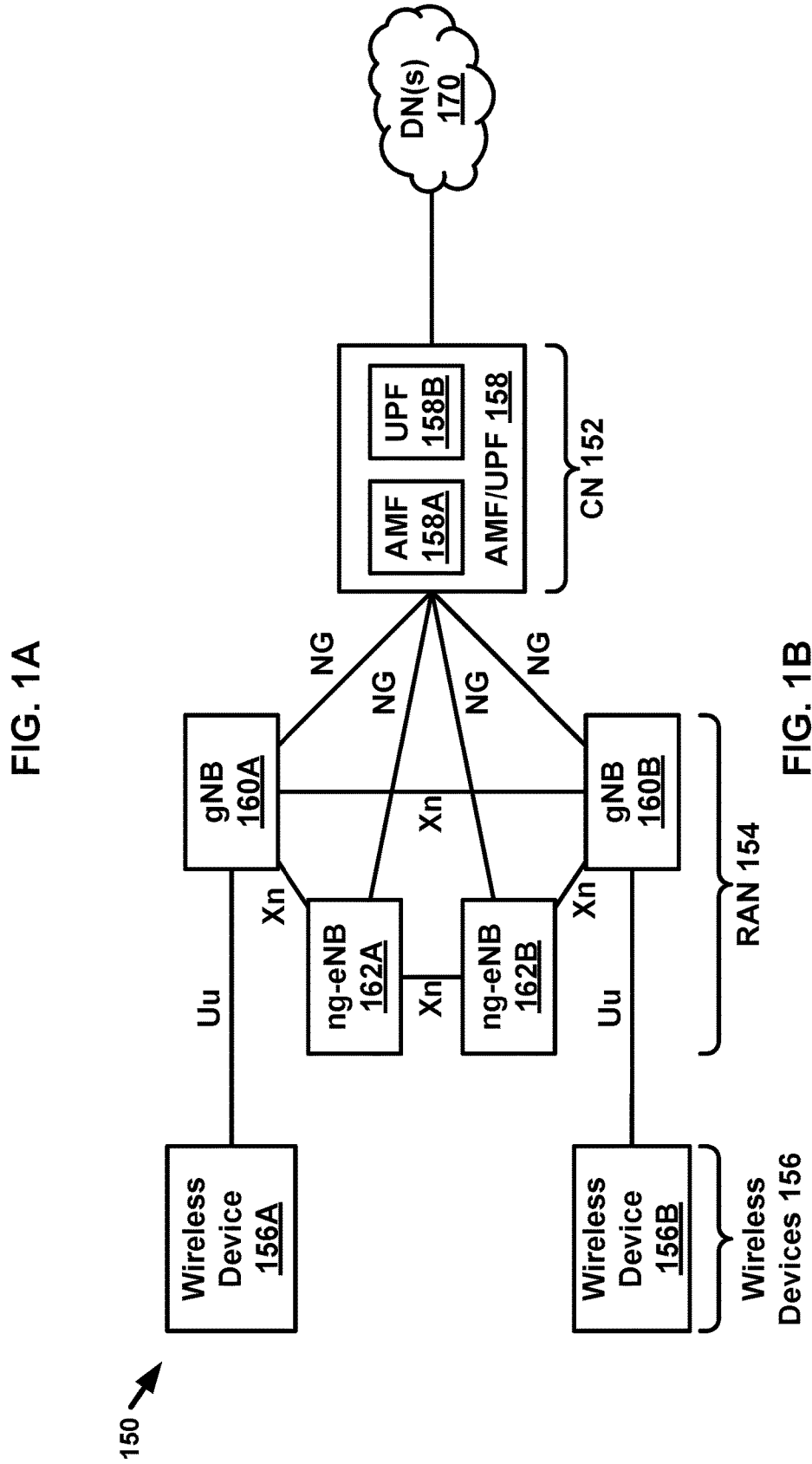

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
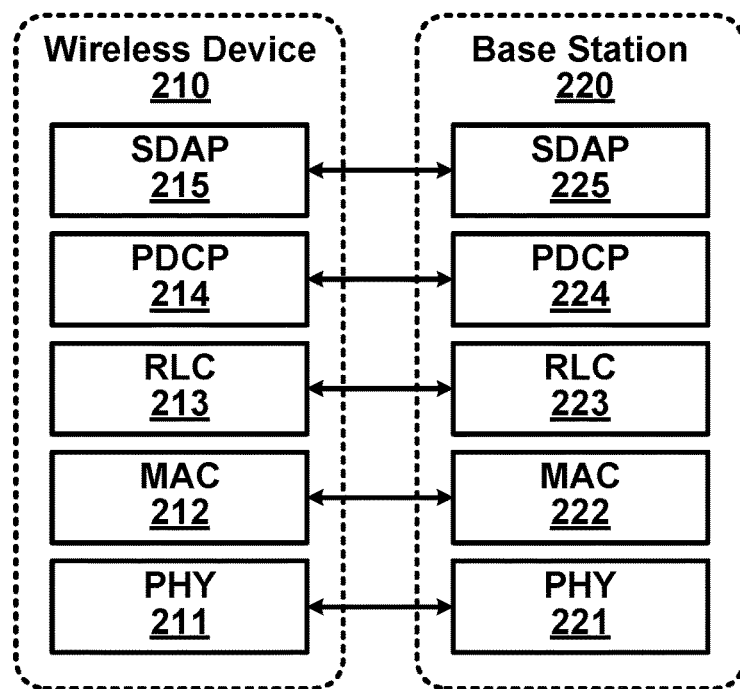
FIG. 2A shows an example user plane.
Figure 2B:
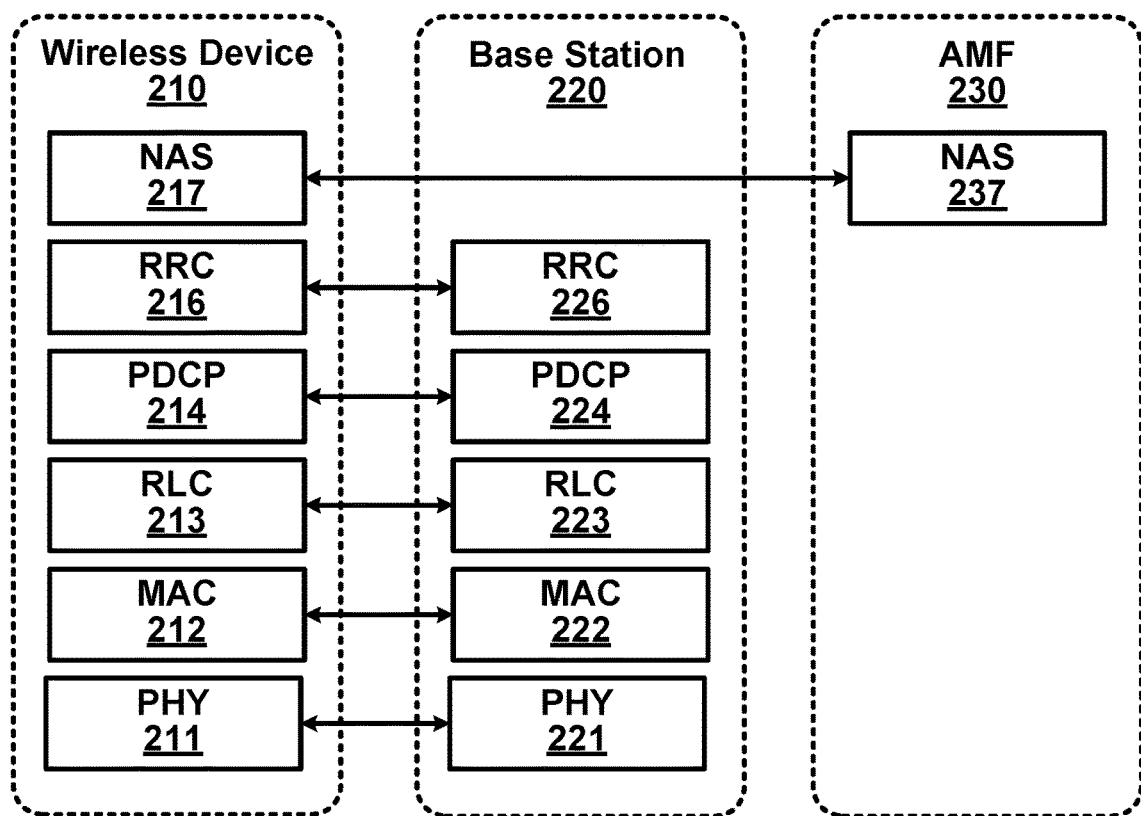
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
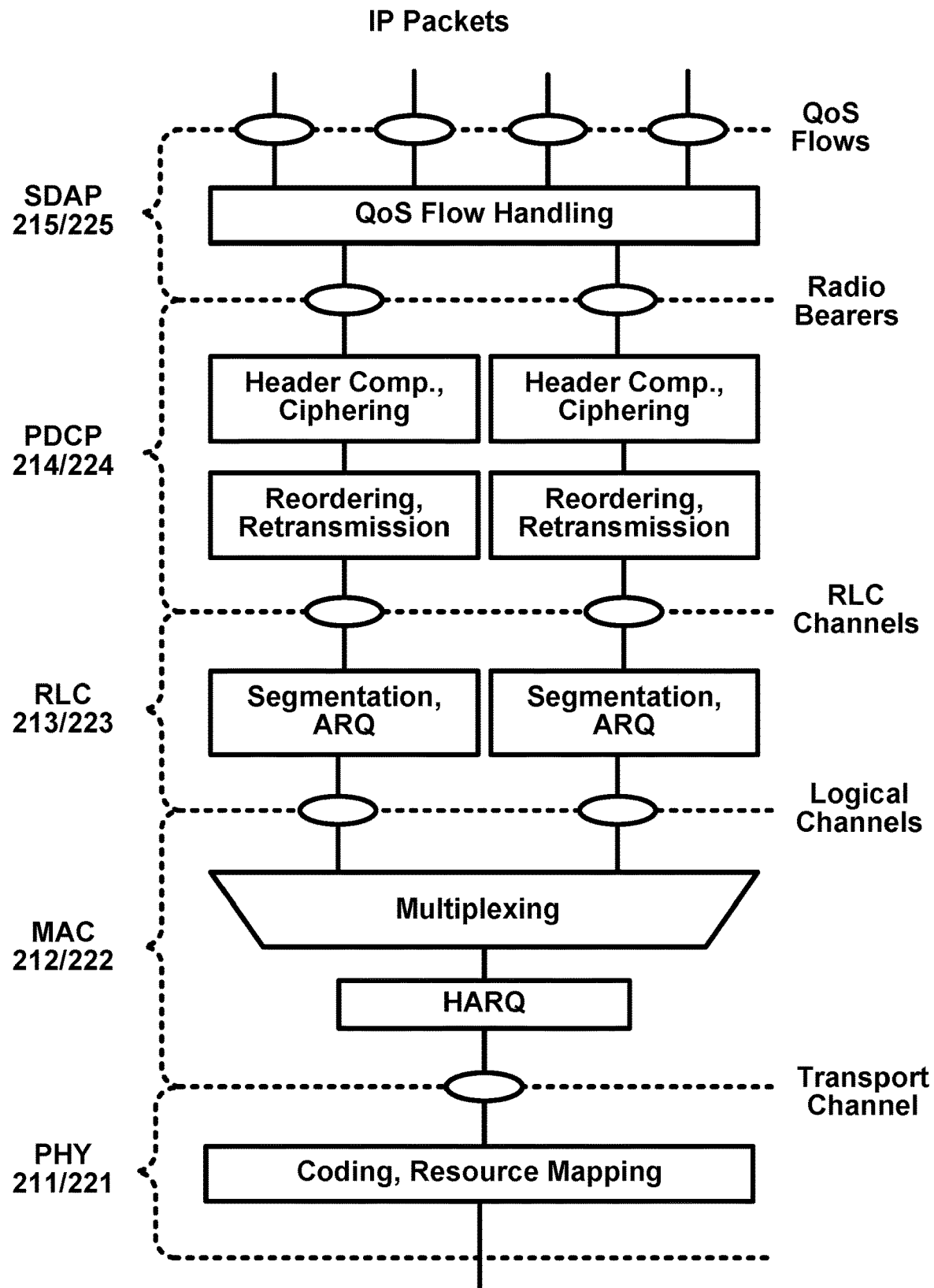
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/ or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4:
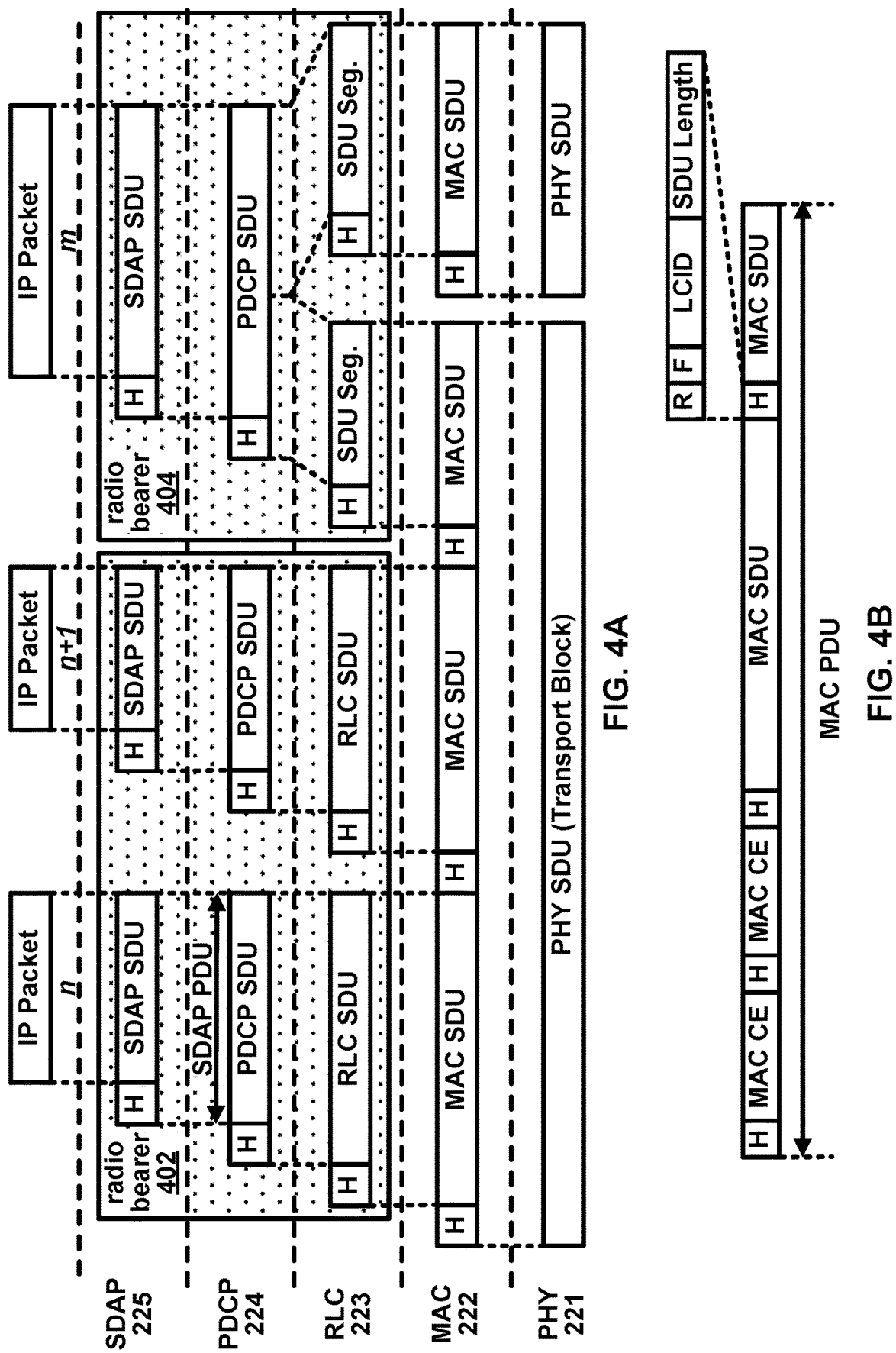
FIG. 4A shows an example downlink data flow for a user plane configuration.
FIG. 4B shows an example format of a Medium Access Control (MAC) subheader in a MAC Protocol Data Unit (PDU).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figure 5:
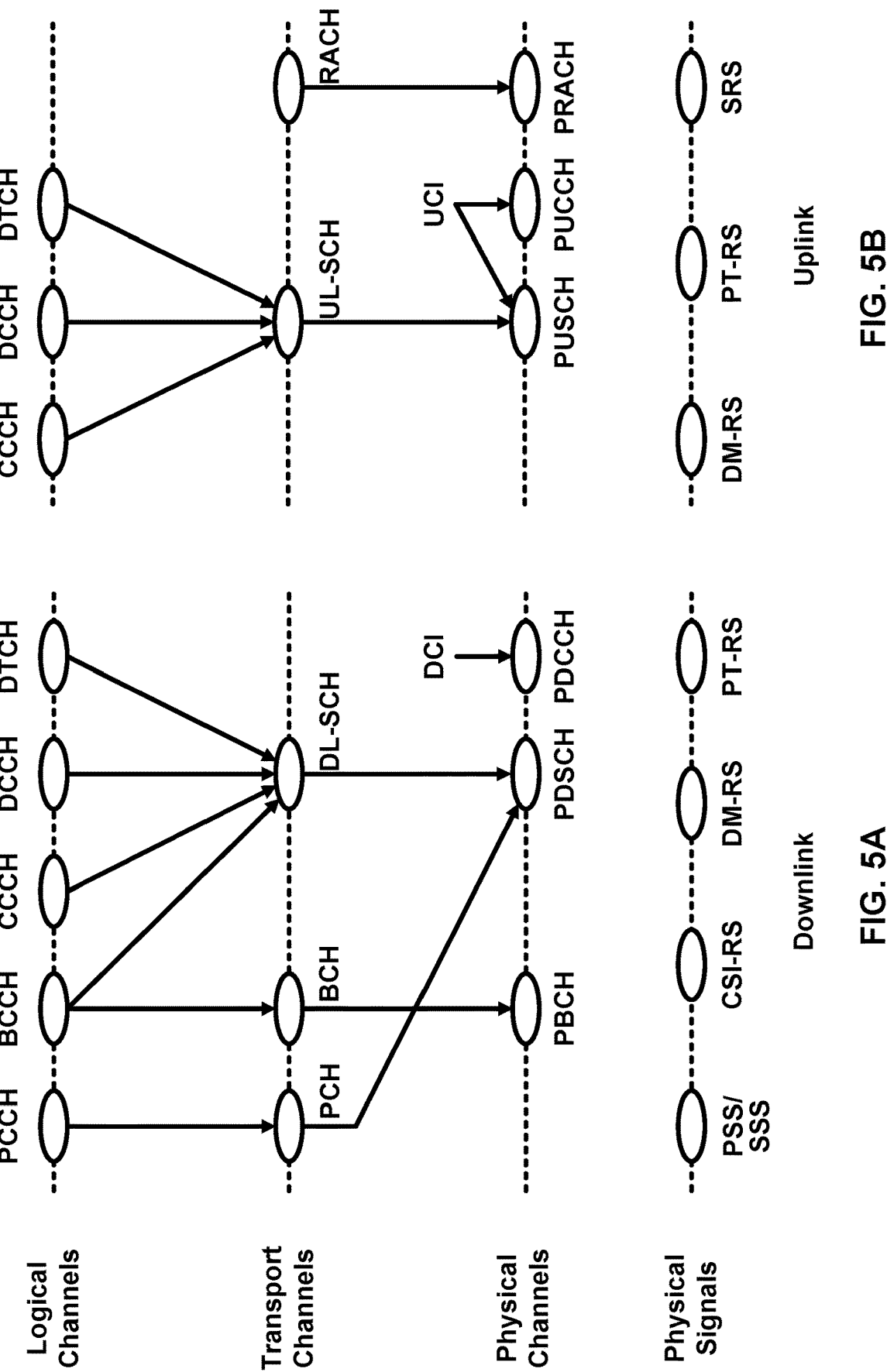
FIG. 5A shows an example mapping for downlink channels.
FIG. 5B shows an example mapping for uplink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
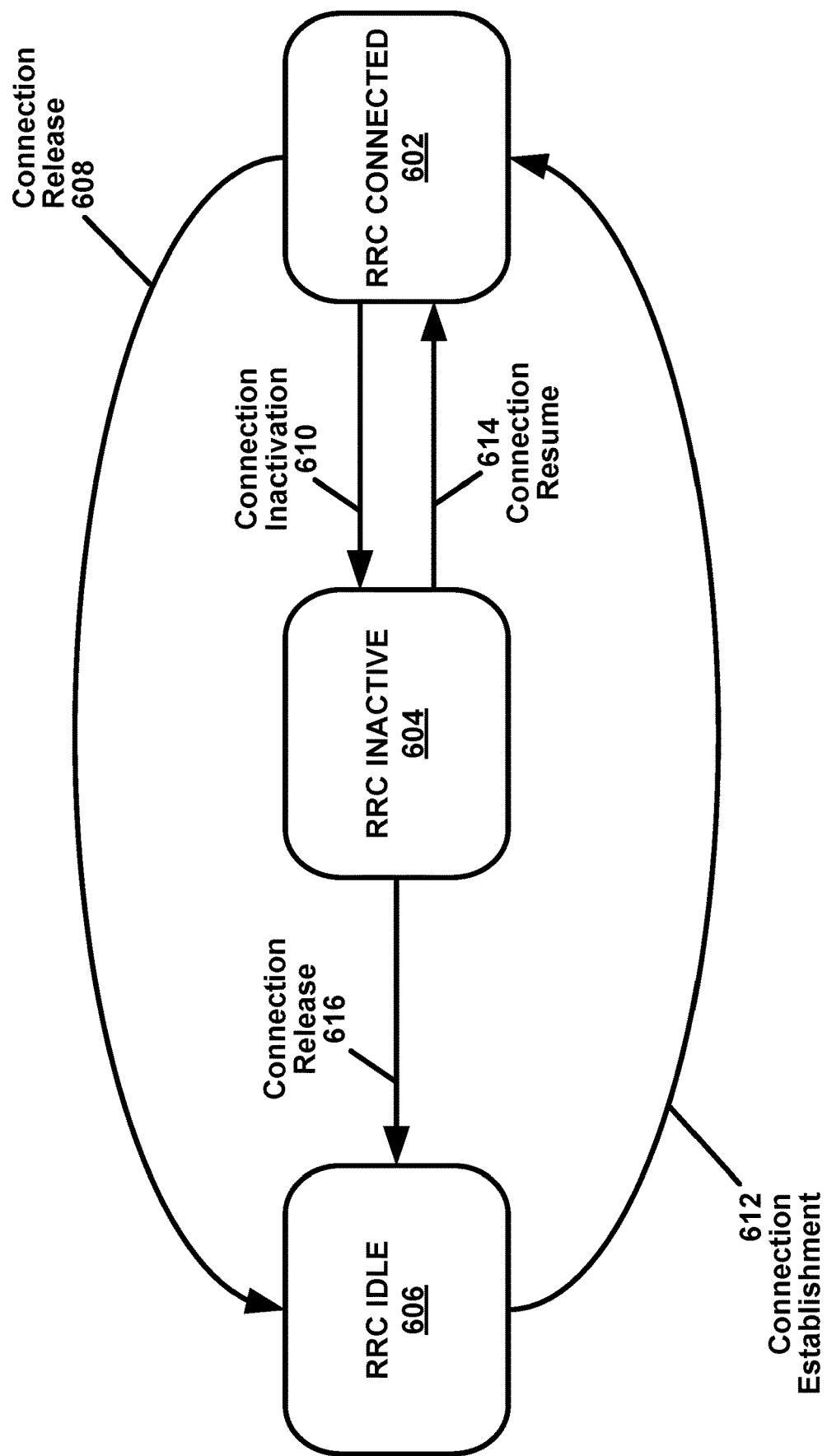
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
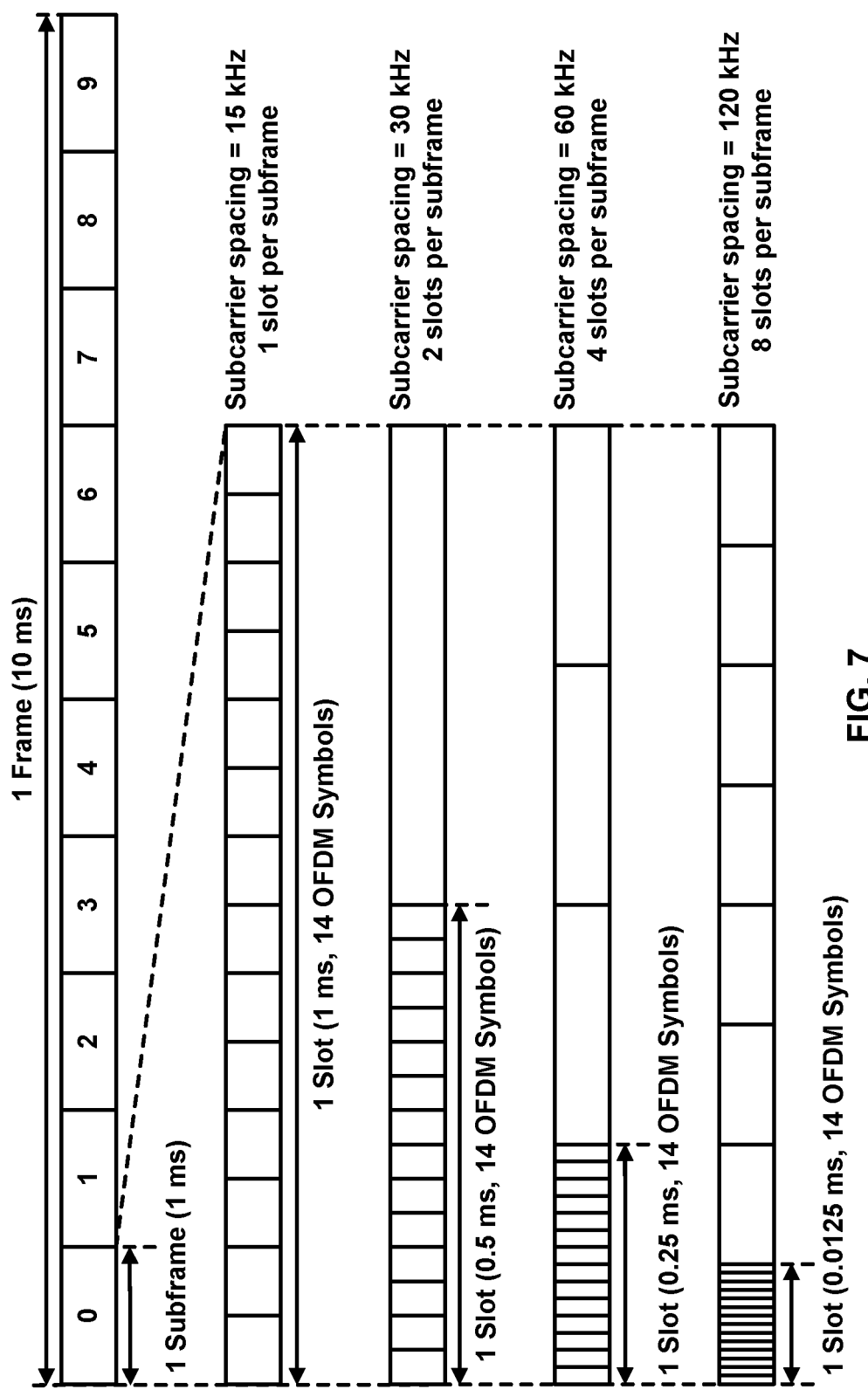
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
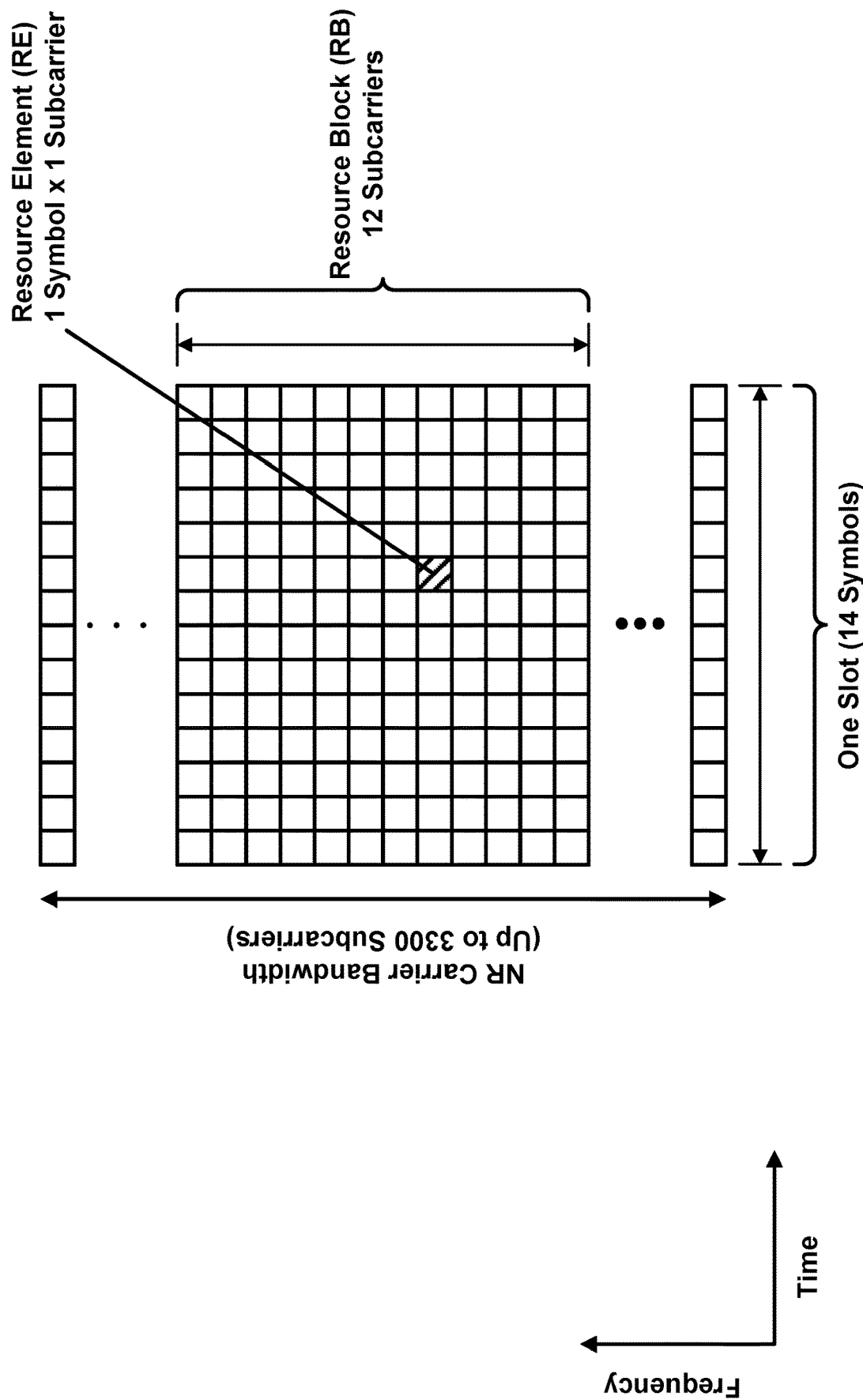
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
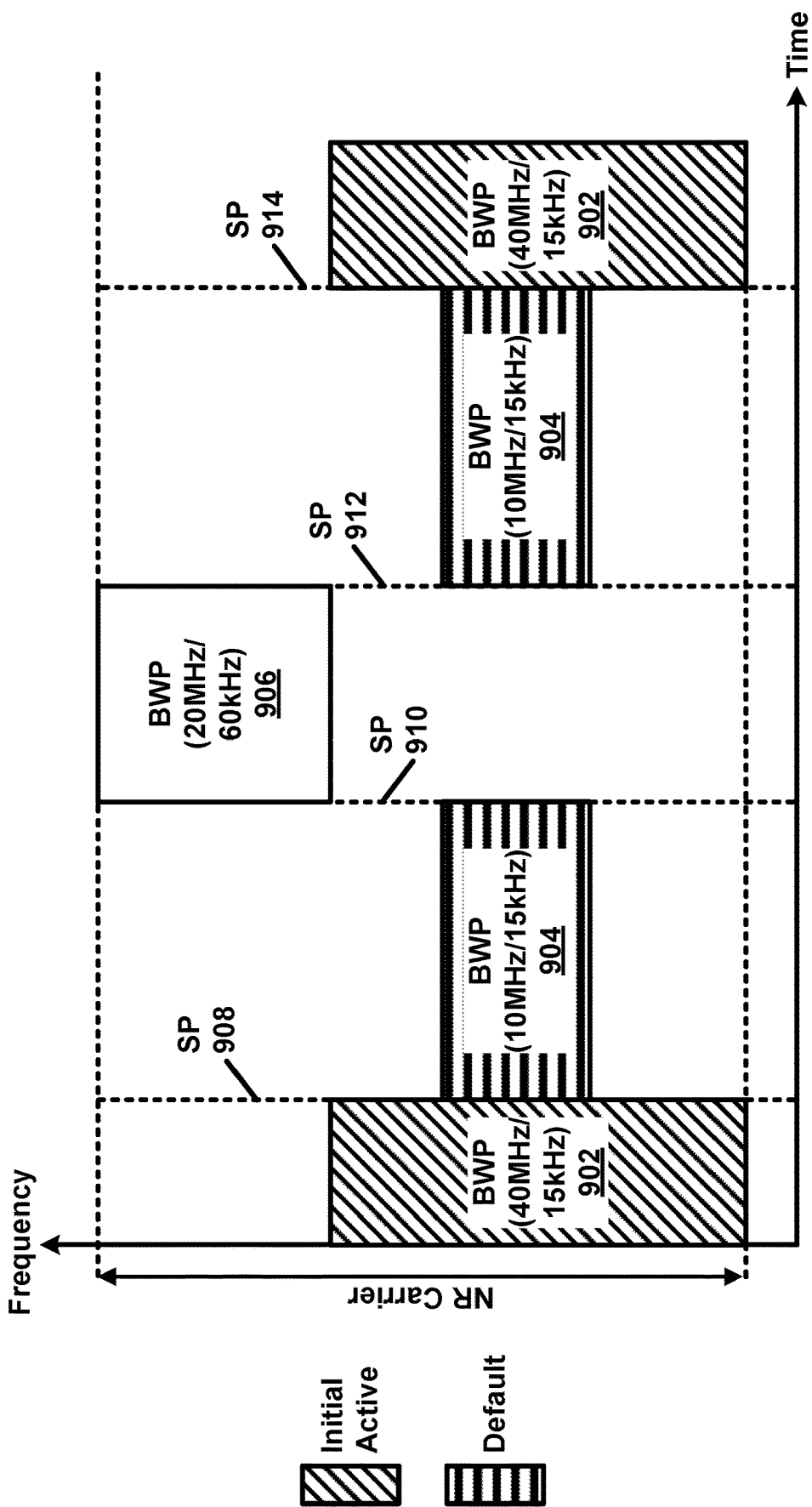
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
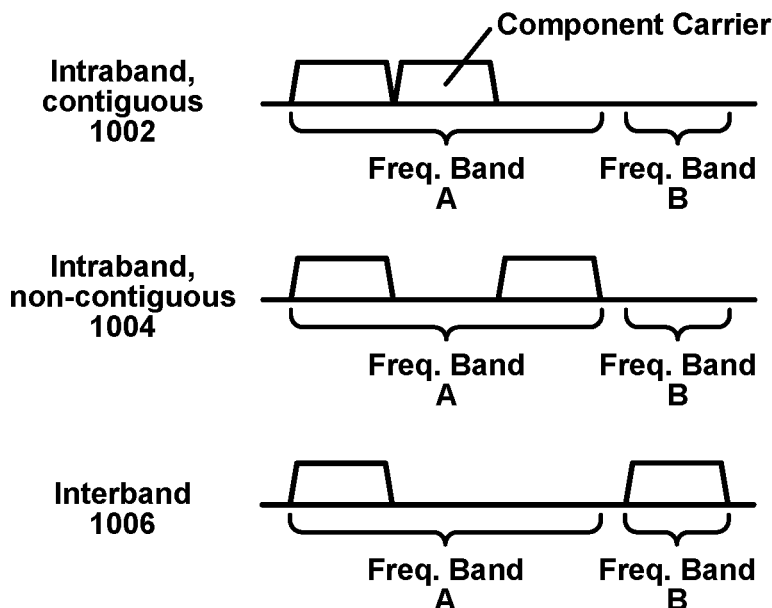
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
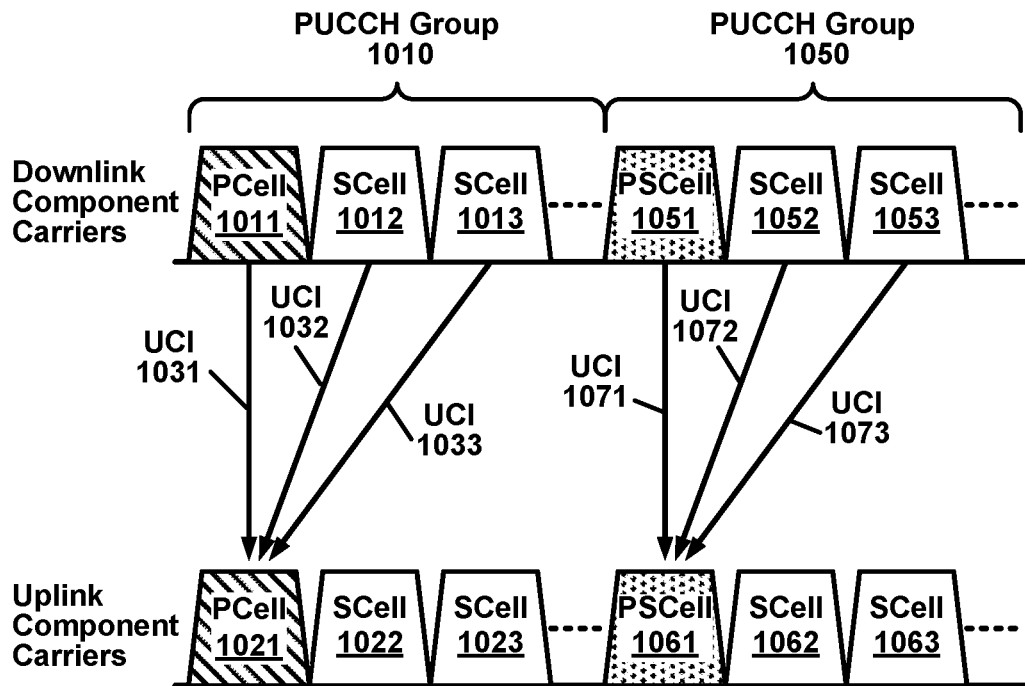
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
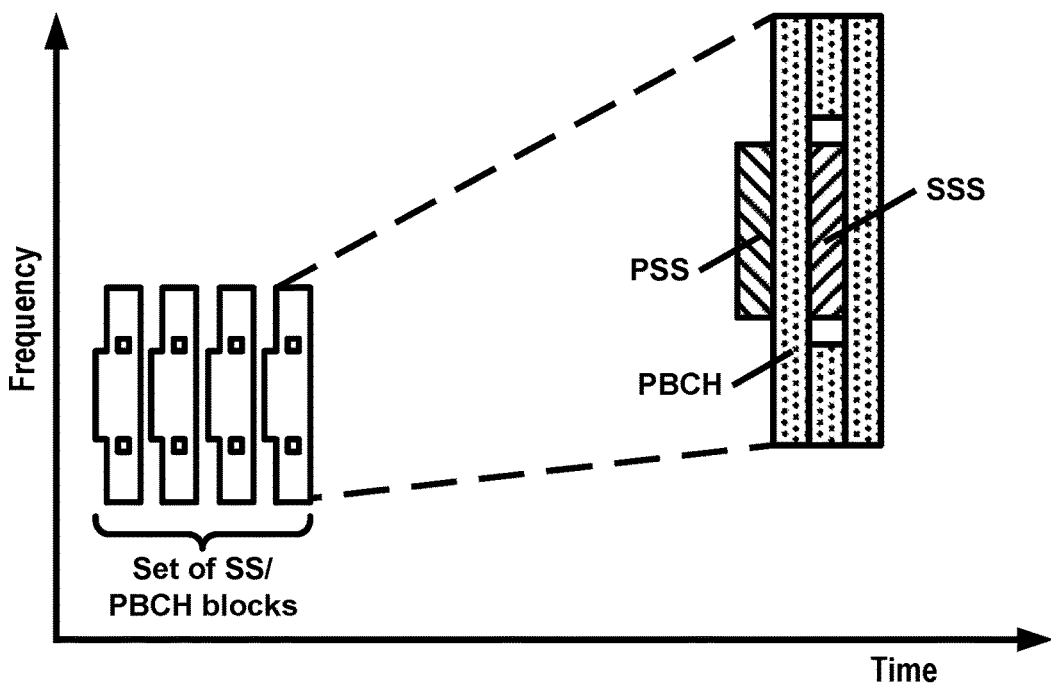
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indexes. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
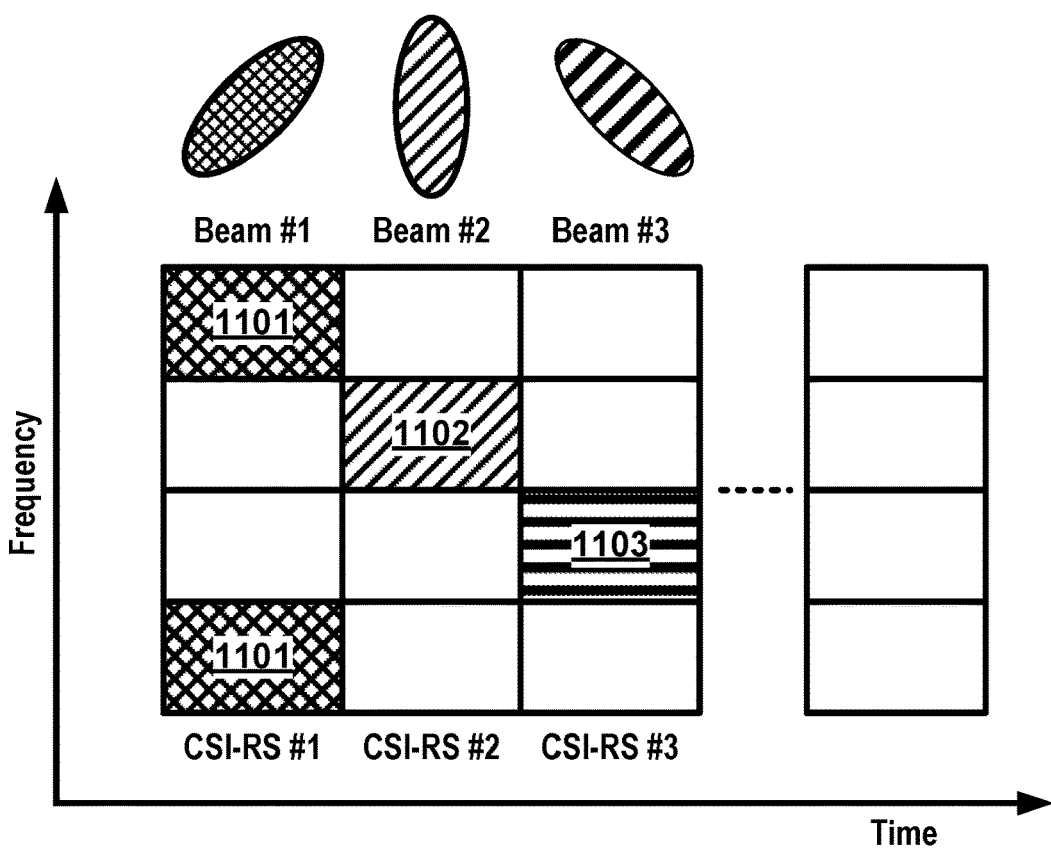
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figures 13A, 13B, 13C:
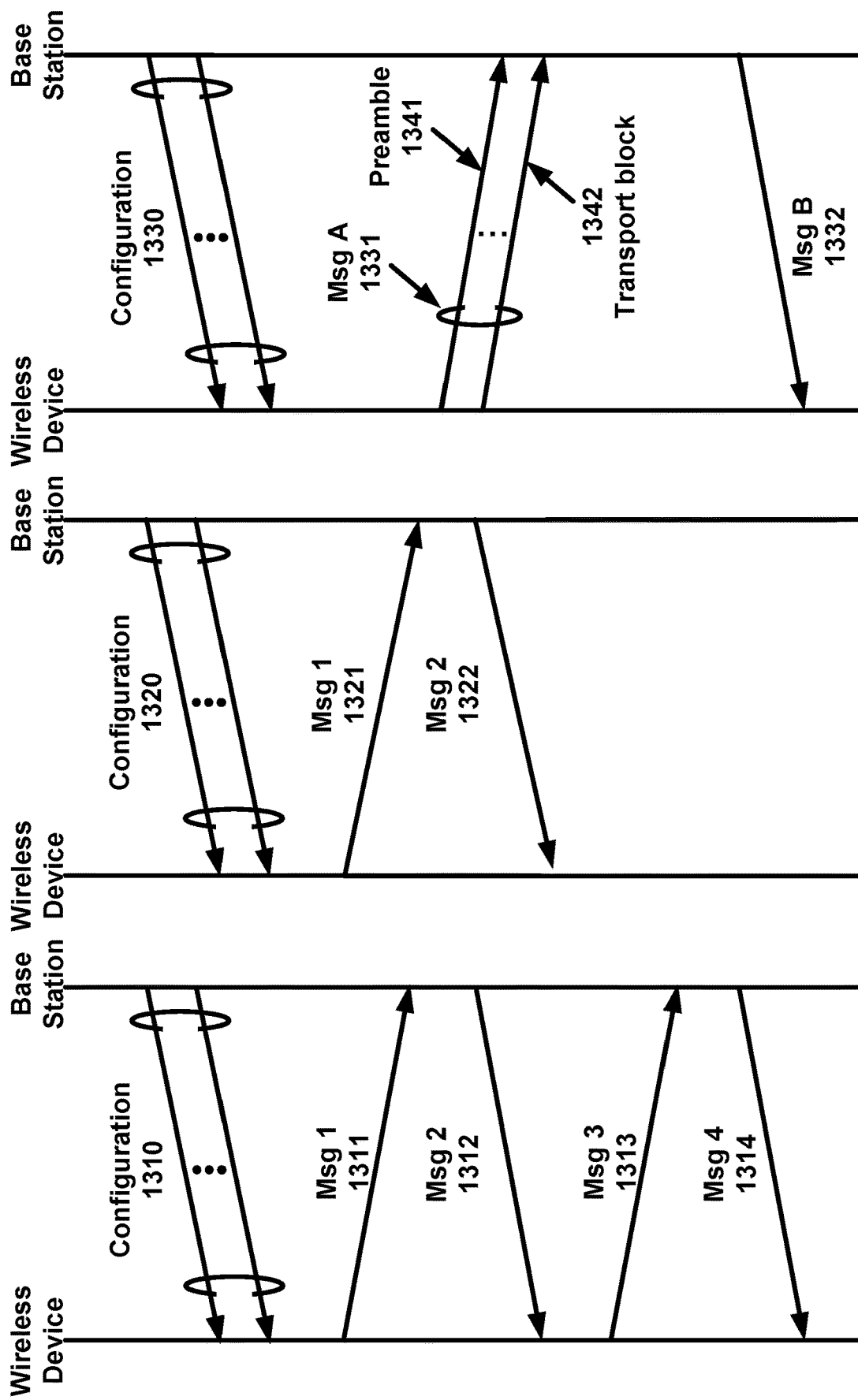
FIG. 13A shows an example four-step random access procedure.
FIG. 13B shows an example two-step random access procedure.
FIG. 13C shows an example two-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-RNTI}=1+s\_id+14 \times t\_id+14 \times 80 \times f\_id+14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after (e.g., based on or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
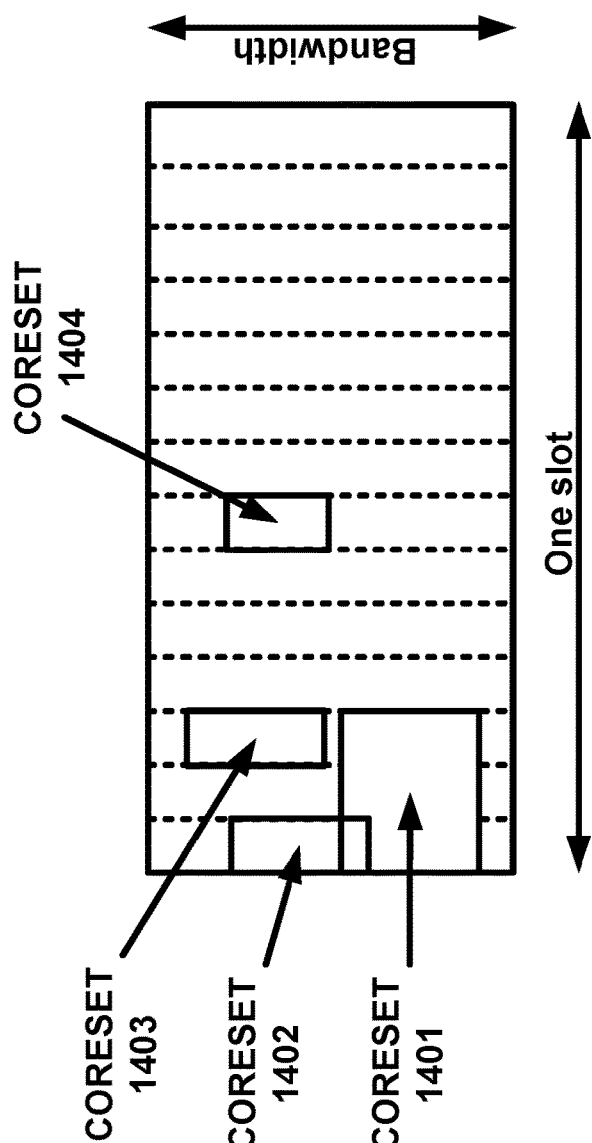
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
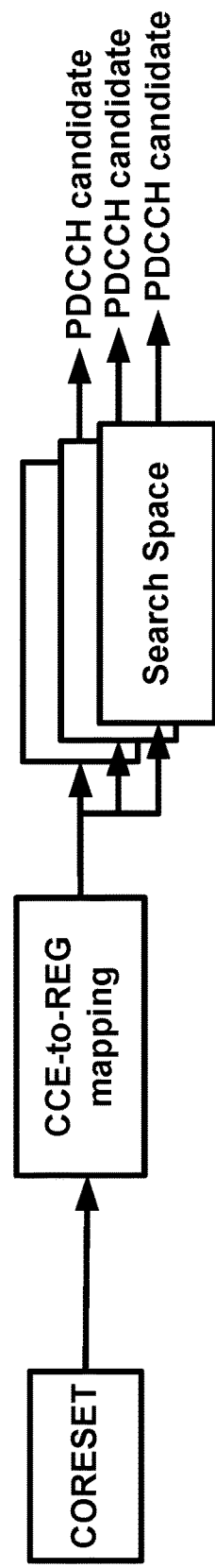
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
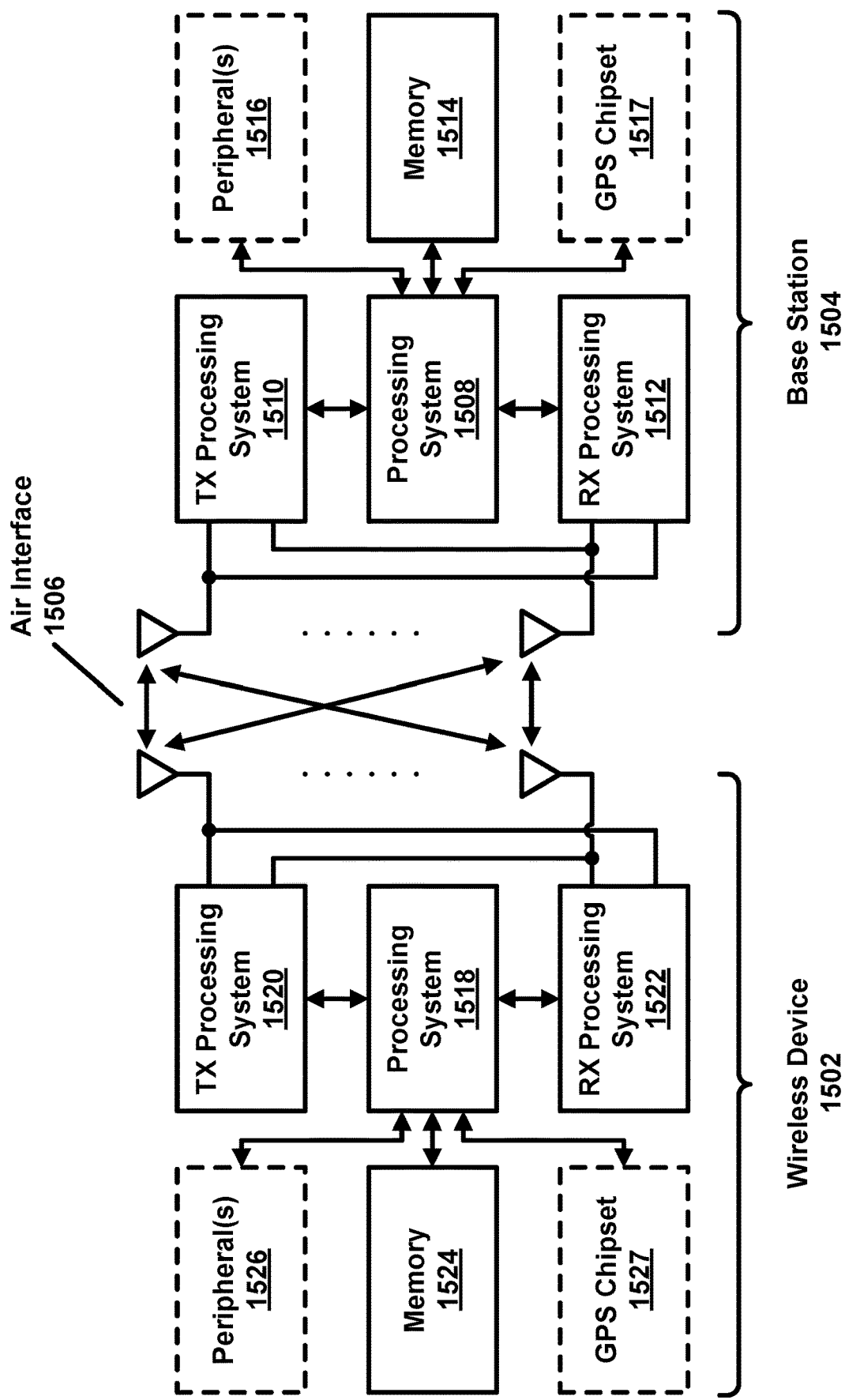
FIG. 15A shows an example of communications between a wireless device and a base station.

FIG. 15A shows example communications between a wireless device and a base station. A wireless device 1502 and a base station 1504 may be part of a communication network, such as the communication network 100 shown in FIG. 1A, the communication network 150 shown in FIG.

1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For sending/transmission processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
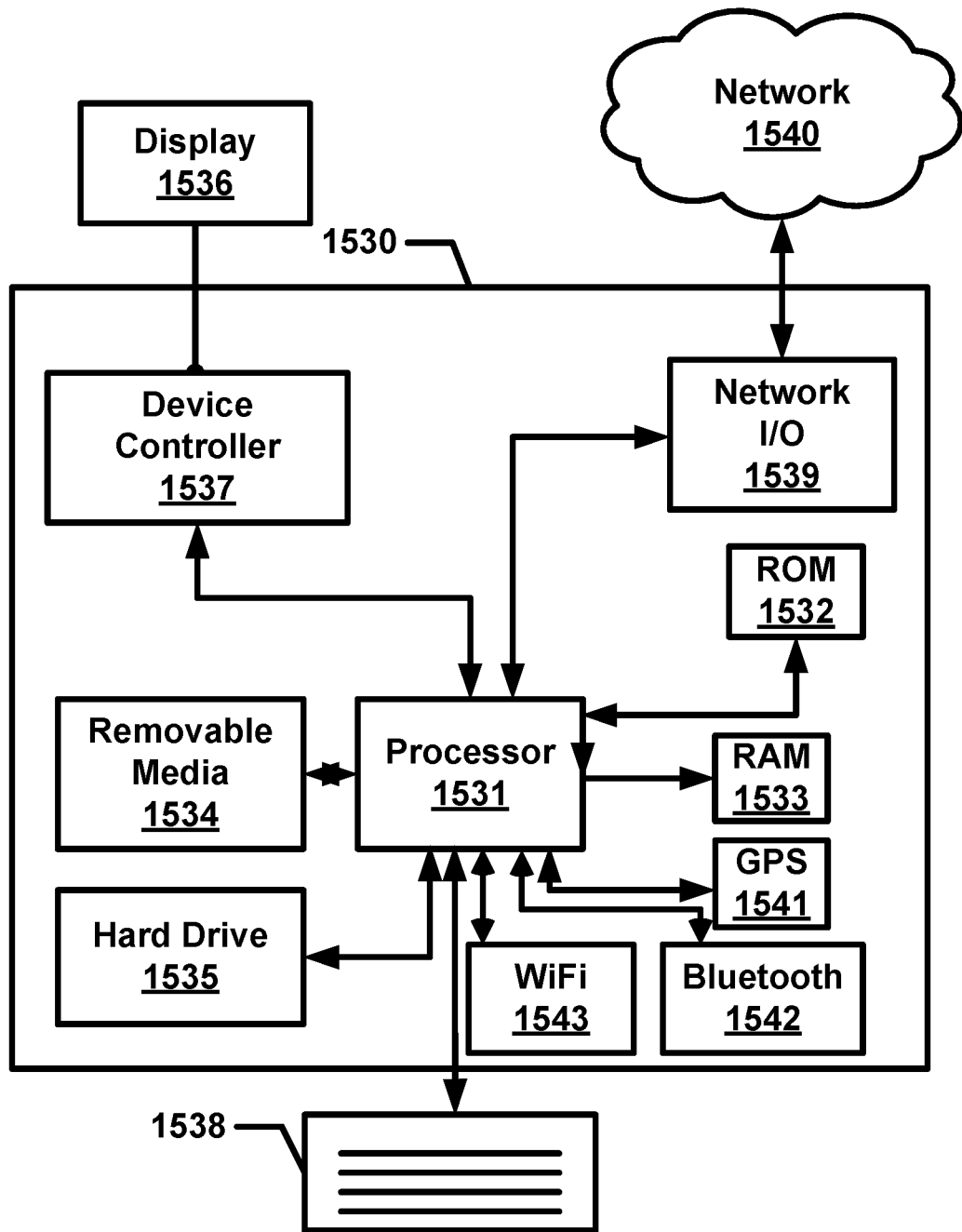
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A wireless device may operate in one or more states. The one or more states may comprise, for example, a connected state, a disconnected state, an active state, an inactive state, an idle state, a power saving state, and/or any other state. The one or more states may comprise RRC states, such as RRC_CONNECTED, RRC_INACTIVE, RRC_IDLE, and/or the like. The wireless device may switch/transition to/from one or more states. The wireless device may perform, and/or may be incapable of performing, one or more operations in a particular state. The wireless device may not perform (e.g., may not be allowed to perform or may prohibit) an transmission(s) (e.g., uplink data transmission(s)) in an RRC_INACTIVE state and/or an RRC_IDLE state. In such a case, the wireless device may make (e.g., set up, establish, re-establish, and/or resume) a connection to a network/device for transmission(s) of DL data (e.g., mobile terminated (MT)) and/or UL data (e.g., mobile originated (MO)) The wireless device may perform one or more procedures (e.g., connection setup procedure) to make a connection to the network/device in the RRC_INACTIVE state (and/or in the RRC-IDLE state). The wireless device may perform the one or more procedures (e.g., connection setup or resume procedure) during a time that DL data (e.g., mobile terminated (MT)) and/or UL data (e.g., mobile originated (MO)) are available for transmission (e.g., stored in a buffer). Based on the one or more procedures (e.g., after or in response to successfully completing a connection setup and/or a resume procedure), the RRC state of the wireless device may switch/transition to an RRC_CONNECTED state from an RRC_INACTIVE state (and/or from an RRC_IDLE state). The wireless device may receive (e.g., perform a reception of) DL transmission(s) (e.g., receive DL data) and/or send UL transmission(s) (e.g., transmit UL data) in the RRC_CONNECTED state. The wireless device may switch/transition to the RRC_INACTIVE state (and/or to the RRC_IDLE state) from RRC_CONNECTED state, for example, based on (e.g., after or in response to) having no DL data (e.g., to be received) and/or UL data (e.g., to be sent/transmitted) available (e.g., no such data stored in buffer(s)). To switch/transition to the RRC_INACTIVE state from the RRC_CONNECTED state, the wireless device may perform a connection release procedure. The connection release procedure (e.g., an RRC release procedure) may result in switching/transitioning the RRC state (e.g., of the wireless device) to the RRC_INACTIVE state (and/or to the RRC_IDLE) from the RRC_CONNECTED state. The connection release procedure may comprise sending/transmitting by a base station, and/or receiving by a wireless device, one or more release messages (e.g., RRC release message). The one or more release messages may result in release of resources previously indicated for use by the wireless device. The wireless device may lack sufficient resources for sending/transmitting one or more messages (e.g., data, payload, etc.) after switching/transitioning from the RRC_CONNECTED state. At least some resources (e.g., previously configured/active BWPs) may not be available for use by the wireless device in a state other than RRC_CONNECTED. At least some resources (e.g., initial BWP) may be insufficient and/or inefficient to use for sending/transmitting the one or more messages. The wireless device may be required to establish/re-establish a connection in the RRC_CONNECTED state before being able to send/transmit the one or more messages (e.g., data, payload, etc.).

Switching and/or transitioning a wireless device state may require control signaling. Switching and/or transition between an RRC_INACTIVE state (and/or an RRC_IDLE state) and the RRC_CONNECTED state may require a wireless device to send/transmit and/or receive a plurality of control signals in one or more layers that may comprise different layers (e.g., RRC messages, MAC CEs, and/or DCI messages). An RRC connection setup procedure may require a wireless device to send/transmit, to a base station, an RRC connection setup request and/or to receive an RRC connection setup message (e.g., as a response to the RRC connection setup request). An RRC connection resume procedure may require the wireless device to send/transmit, to a base station, an RRC connection resume request and/or to receive an RRC connection resume message (e.g., as a response to the RRC connection resume request). An RRC connection release procedure may require the wireless device to receive, from a base station, an RRC connection release request. At least some communications, such as for DL and/or UL transmission of a small quantity of data (e.g., available and/or upon arrival), may not be efficiently communicated during a time period in which a wireless device may be in an RRC_INACTIVE state (and/or in an RRC_IDLE state). For example, it may be inefficient for a wireless device to establish (and/or resume) a connection to a network/device (e.g., switch/transition to the RRC_CONNECTED state from the RRC_INACTIVE state and/or from the RRC_IDLE state) and/or release the connection (e.g., switch/transition to the RRC_INACTIVE state and/or to the RRC_IDLE state from the RRC_CONNECTED state) for the purposes of sending/transmitting DL and/or UL transmission(s) of small data in the RRC_CONNECTED state. Such small data transmission(s), and the associated state switching/transitioning, may result in increasing unnecessary power consumption (e.g., by a wireless device) and/or signaling overhead. For example, the signaling overhead (e.g., control signaling overhead) that may be required to send/transmit a message (e.g., data, a payload, etc.) may be larger than (and/or comparable in size relative to) the message itself. State switching/transitioning (e.g., RRC state switching/transitioning) for the relatively small and/or infrequent messages (e.g., DL and/or UL data packet(s)) may cause unnecessary power consumption and/or signaling overhead for a wireless device.

Small and/or infrequent transmissions (e.g., data packets, payloads, etc.) may be required for a variety of applications. Such small and/or infrequent transmission (which may be referred to herein as small data transmission (SDT)) may comprise, for example, traffic generated from smartphone applications and/or any wireless device application, Instant Messaging (IM) services, heart-beat/keep-alive traffic from IM/email clients and/or other apps/applications, push notifications from various applications, non-smartphone applications, wearable devices, positioning information/service (e.g., vehicle-to-everything and/or location service), sensors (e.g., for transmitting temperature, pressure readings periodically and/or in an event triggered manner), smart meters and smart meter networks sending meter readings, multicast broadcast multimedia service (MBMs), and/or any other wireless device that communicates with one or more other devices (e.g., in a communication network). The SDT may comprise transmissions via satellite (e.g., a geostationary equatorial orbit, low earth orbit, and/or medium earth orbit satellite system) and/or non-terrestrial networks (NTN), for example, for a connection of remote areas and/or airborne and/or seaborne platforms (e.g., airships, unmanned aerial vehicles, and/or blimps).

As described herein, a wireless device may be configured for one or more transmissions (e.g., SDT) in one or more states (e.g., RRC_INACTIVE state and/or RRC_IDLE state) that may not be a connected state (e.g., RRC_CONNECTED). The wireless device may be configured to send/transmit one or more messages (e.g., perform uplink data transmission(s)) in an RRC_INACTIVE state (and/or in an RRC_IDLE state). The one or more messages may comprise data traffic (e.g., in DTCH) of the wireless device. The wireless device may send/transmit one or more data packets in an RRC_INACTIVE state (and/or an RRC_IDLE state). The wireless device may receive, from a base station, scheduling information (e.g., one or more RRC messages) indicating one or more uplink radio resources in the RRC_INACTIVE state for the wireless device. The one or more uplink radio resources may comprise a BWP (and/or any other wireless resource) for use by the wireless device in the RRC_INACTIVE state and/or in the RRC_IDLE state (e.g., an SDT BWP). The scheduling information may be provided in one or more release messages (e.g., RRC release message). A message (e.g., RRC release message) may comprise the scheduling information and information for switching/transitioning the state of the wireless device (e.g., from RRC_CONNECTED to RRC_INACTIVE and/or to RRC_IDLE). The one or more uplink radio resources may be for infrequent data transmission (e.g., SDT). The one or more uplink radio resources may be for non-periodic data transmission (e.g., SDT). The one or more uplink radio resources may be for periodic data transmission (e.g., SDT). The wireless device may send/transmit the one or more data packets via the one or more radio resources during a time period in which the state of the wireless device is the RRC_INACTIVE state (and/or RRC_IDLE state and/or any other state that is not RRC_CONNECTED). The wireless device may not switch/transition its RRC state to the RRC_CONNECTED to send/transmit the one or more data packets via the one or more radio resources. The wireless device may be configured to use the one or more radio resources, for example, at least until receiving an indication to release and/or reconfigure the one or more radio resources (e.g., a broadcast message indicating a change/reconfiguration of a configuration parameter of the wireless device). The uplink transmission(s) via the one or more radio resources in an RRC_INACTIVE state (and/or in an RRC_IDLE state) may be efficient and/or flexible (e.g., for low throughput short data bursts). The uplink transmission(s) via the one or more radio resources in an RRC_INACTIVE state (and/or in an RRC_IDLE state) may provide advantages such as more efficient signaling (e.g., signaling overhead may be less than payload/data). The uplink transmission(s) via the one or more radio resources in an RRC_INACTIVE state (and/or in an RRC_IDLE state) may reduce signaling overhead. The uplink transmission(s) via the one or more radio resources in an RRC_INACTIVE state (and/or in an RRC_IDLE state) may improve the battery performance of the wireless device. For example, a wireless device that has intermittent small data packets (e.g., SDT) in the RRC_INACTIVE state (and/or the RRC_IDLE state) may benefit from such uplink transmission(s) in the RRC_INACTIVE state (and/or the RRC_IDLE state).

A particular type of a message may configure (e.g., provide) scheduling information (e.g., the one or more radio resources). The scheduling information may be beneficial to the wireless device (e.g., if the particular type of the message comprises radio configuration parameters, of the one or more radio resources, dedicated to the wireless device). The radio configuration parameters dedicated to the wireless device may be determined/selected by a base station, which may provide advantages such as reduced battery power of the wireless device and/or improved reliability and/or latency of the communications between the wireless device and the base station. The particular type of the message may comprise a wireless device-specific RRC message (e.g., an RRC release message). A broadcast and/or multicast message (e.g., system information) may not comprise the radio configuration parameters dedicated to the wireless device. The broadcast and/or multicast message (e.g., system information) may configure (e.g., provide) scheduling information of radio resources shared with a plurality of wireless devices (e.g., not dedicated to the wireless device). The scheduling information may be beneficial for the wireless device (e.g., if the wireless device receives the particular type of the message when the wireless device performs the SDT). The particular type of the message may comprise the scheduling information (e.g., the one or more radio resources dedicated to the wireless device) determined (e.g., by the base station) based on recent wireless channel conditions. The scheduling information may be determined based on the recent wireless channel conditions which may improve the reliability of communications between the wireless device and/or the base station. The message may comprise one or more release messages (e.g., RRC release message) that may indicate a switch/transition to an RRC_INACTIVE state (and/or an RRC_IDLE state). The one or more release messages (e.g., RRC release message) may comprise the last message (e.g., wireless device-specific RRC message) that the wireless device may receive before the SDT and/or that comprises the scheduling information (e.g., the one or more radio resources dedicated to the wireless device) that may be determined (e.g., by the base station) based on recent wireless channel conditions before the SDT. An RRC reconfiguration message that the wireless device may receive in an RRC_CONNECTED state may be improper to configure (e.g., provide) the scheduling information (e.g., the one or more radio resources). The wireless device may keep/maintain and RRC_CONNECTED state based on (e.g., after or in response to) receiving the RRC reconfiguration message. Wireless channel conditions at a time that the wireless device may receive an RRC reconfiguration may be different from wireless channel conditions at a time that the wireless device preforms an SDT in the RRC_INACTIVE state and/or the RRC_IDLE state.

As described herein, uplink data transmission(s) in an RRC_INACTIVE state may be interchangeable with uplink data transmission(s) in an RRC_IDLE state. For example, the procedure(s), configuration parameter(s), and/or feature description(s) that may be related to uplink data transmission(s) in an RRC_INACTIVE state may be applicable to and/or available to an RRC_IDLE state (e.g., unless otherwise indicated specifically for an RRC_IDLE state). The procedure(s), configuration parameter(s), and/or feature description(s) herein that may be related to uplink data transmission(s) in an RRC_IDLE state may be applicable to and/or available to an RRC_INACTIVE state (e.g., unless otherwise indicated specifically for an RRC_INACTIVE state). The procedure(s), configuration parameter(s), and/or description(s) herein that may be related to uplink data transmission(s) in an RRC_INACTIVE state may be applicable to and/or available for an RRC_IDLE state of the wireless device, for example, if RRC CONNECTED and/or RRC IDLE states are at least RRC states in which a wireless device may be configured to operate. The procedure(s), configuration parameter(s), and/or description(s) herein that may be related to uplink data transmission(s) may be applicable to and/or available for an RRC_INACTIVE and/or an RRC_IDLE state of a wireless device, for example, if RRC_CONNECTED, RRC_INACTIVE, and/or RRC_IDLE states are at least three RRC states in which a wireless device may be configured to operate. Reference herein to RRC_INACTIVE may refer to any inactive state, such as any inactive state of a wireless device. Reference herein to RRC_CONNECTED may refer to any connected state, such as any connected state of a wireless device to another communication device (e.g., base station). Reference herein to RRC_IDLE may refer to any idle state, such as any idle state of a wireless device.

Figure 17:
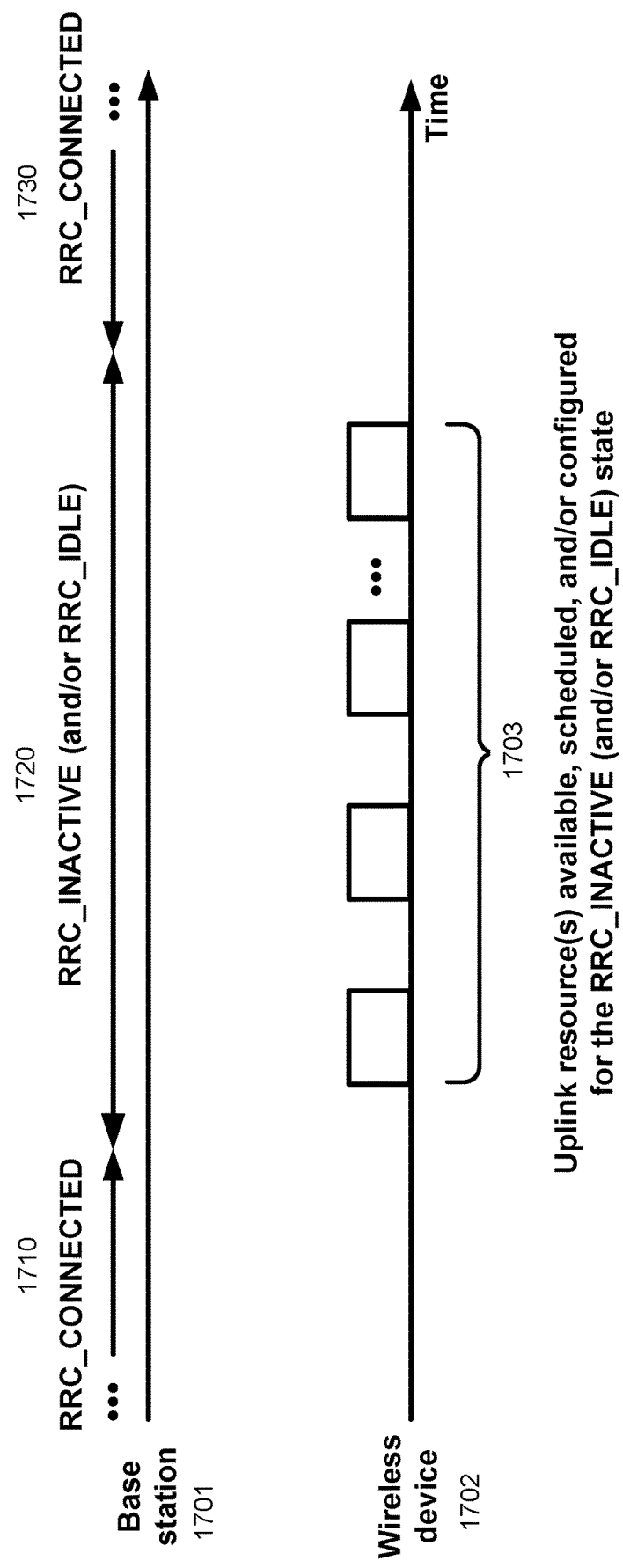
FIG. 17 shows an example of resource availability for various states of a wireless device.

FIG. 17 show an example of resource availability for various states of a wireless device. Wireless device states may comprise, for example, RRC_CONNECTED, RRC_INACTIVE, RRC_IDLE, and/or any other state associated with connectivity, activity, power, and/or the like. One or more data packet transmission(s) and/or other transmission(s) may occur (and/or may be scheduled to occur) in an RRC_INACTIVE state (and/or an RRC_IDLE state). The transmission(s) may correspond to resource(s) 1703 that may be available, scheduled, and/or configured. The one or more data packet transmission(s) may comprise any transmission(s) described herein. A wireless device 1702 may receive, from a base station 1701, one or more RRC message(s) configuring the resource(s) 1703. The resource(s) 1703 may comprise uplink resources. Additionally or alternatively, the resource(s) 1703 may comprise any combination of uplink resources, downlink resources, and/or sidelink resources. The uplink resource(s) may be available, scheduled, and/or configured in the RRC_INACTIVE state (and/or RRC_IDLE state). The wireless device 1702 may determine whether to use (and/or initiate, and/or activate) or stop to use (and/or clear, and/or suspend, and/or deactivate) the resource(s) 1703 based on an RRC state of the wireless device 1702. The wireless device 1702 may receive radio resource configuration parameters associated with one or more radio resources (e.g., uplink radio resources, the resources 1703, etc.) that the wireless device 1702 may use in the RRC_INACTIVE state (and/or an RRC_IDLE state). The one or more radio resources may be configured (e.g., pre-configured). The one or more radio resources may be configured, for example, at a time that the wireless device is in the RRC_CONNECTED state, the RRC_INACTIVE state, RRC_IDLE state, and/or any other state. The wireless device 1702 may receive an RRC message comprising the radio resource configuration parameters of the one or more radio resources during a time that the wireless device is in the RRC_CONNECTED state (e.g., at step 1710). The wireless device may not initiate (and/or may not activate) the one or more radio resources during a time that the wireless device is in the RRC_CONNECTED state (e.g., at step 1710). An RRC release message may comprise radio resource configuration parameters of the one or more radio resources. The wireless device may initiate (and/or or activate) the one or more radio resources based on (e.g., after and/or in response to) receiving a release message (e.g., an RRC release message). The wireless device may initiate (and/or activate and/or use) the one or more radio resources based on (e.g., after and/or in response to) the RRC state of the wireless device 1702 being in (and/or transitioning to) the RRC_INACTIVE state (and/or an RRC_IDLE state) (e.g., at step 1720). The wireless device 1702 may send/transmit one or more data packets (and/or any transmission(s)) via the one or more radio resources during a time that the RRC state is in (e.g., while keeping the RRC state as) the RRC_INACTIVE state (and/or an RRC_IDLE state). The wireless device 1702 may send/transmit the one or more data packets (and/or any other transmissions), for example, without transitioning to the RRC_CONNECTED state (e.g., at step 1720). The wireless device 1702 may determine to transition an RRC state to the RRC_CONNECTED state from the RRC_INACTIVE state (and/or from an RRC_IDLE state) (e.g., at step 1730). Based on (e.g., after or in response to) switching/transitioning the RRC state to the RRC_CONNECTED state, the wireless device 1702 may determine to stop to use (and/or clear, and/or suspend, and/or deactivate) the one or more resource(s).

The wireless device 1702 may determine to switch/transition an RRC state (e.g., of the wireless device) to an RRC_INACTIVE state (and/or to an RRC_IDLE state). The wireless device may determine to switch/transition the RRC state from an RRC_CONNECTED state. The wireless device 1702 may determine to switch/transition an RRC state to the RRC_INACTIVE state (and/or to an RRC_IDLE state), for example, based on (e.g., after or in response to) receiving one or more RRC messages. The wireless device 1702 may receive, from the base station 1701, one or more RRC messages (e.g., an RRC release message). The one or more RRC messages (e.g., RRC release message) may indicate a release of an RRC connection (e.g., a release from a network). Based on (e.g., after or in response to) receiving the RRC message, the wireless device 1702 may perform an RRC release procedure. The RRC release procedure may comprise a release of one or more established radio bearers and/or configured radio resources. The RRC release procedure may comprise a suspension of the RRC connection (e.g., if a signaling radio bearer (SRB) (e.g., SRB2) and/or at least one dedicated radio bearer (DRB) are setup) and/or a suspension of the established radio bearer(s). Based on (e.g., after and/or in response to) receiving the RRC message (and/or performing the RRC release procedure), the wireless device 1702 may switch/transition (and/or determine to switch/transition) an RRC state of the wireless devices to an RRC_INACTIVE state (and/or to an RRC_IDLE state) from an RRC_CONNECTED state.

The wireless device 1702 may determine to transition an RRC state from an RRC_INACTIVE state (and/or an RRC_IDLE state) to an RRC_CONNECTED state. The wireless device 1702 may perform a random access procedure to switch/transition to the RRC_CONNECTED state. The wireless device 1702 may perform (and/or initiate) the random access procedure for uplink transmission of uplink data that may be received during the RRC_INACTIVE state (and/or during the RRC_IDLE state). The wireless device 1702 may perform the random access procedure, for example, based on (e.g., after or in response to) receiving a paging message in the RRC_INACTIVE state (and/or an RRC_IDLE state). The wireless device 1702 may monitor (e.g., periodically monitor) a downlink control channel for the paging message and/or for any other message. The wireless device 1702 may receive, from the base station 1701 (and/or from a network and/or from any communication device), the paging message that may indicate an identifier of the wireless device (e.g., wireless device ID). The paging message may indicate that the wireless device 1702 is to perform and/or intitiate a random access procedure (e.g., for making a connection to the network and/or to any communication device).

A wireless device may receive one or more RRC messages indicating one or more uplink radio resources. The wireless device may use the one or more uplink radio resources in an RRC_INACTIVE (and/or RRC_IDLE) state. The one or more uplink radio resources in the RRC_INACTIVE (and/or RRC_IDLE) state may comprise one time use resource(s) (e.g., for a single transmission) and/or resource(s) for multiple uses. The one or more uplink radio resources in the RRC_INACTIVE (and/or RRC_IDLE) state may comprise periodic resources (e.g., for one or more uplink transmission(s)). The one or more uplink radio resources in the RRC_INACTIVE (and/or RRC_IDLE) state may comprise preconfigured uplink resources (PURs). One or more uplink grants indicating the one or more uplink radio resources in the RRC_INACTIVE (and/or RRC_IDLE) state may comprise configured and/or pre-configured grant(s). The configured and/or pre-configured grant(s) may comprise a plurality of types of grants, such as (pre-)configured grant Type 1 and/or a (pre-)configured grant Type 2. The one or more uplink radio resources determined (and/or indicated) by the (pre-)configured grant Type 1 may not require an indication of initiating/re-initiating (and/or activating/re-activating) the one or more uplink radio resources (e.g., after or in response to receiving the RRC message indicating the one or more uplink radio resources in the RRC_INACTIVE (and/or RRC_IDLE) state). The wireless device may (re-)initiate (and/or (re-)activate) the one or more uplink radio resources based on (e.g., after or in response to) receiving the RRC message comprising the (pre-)configured grant Type 1 that indicates the one or more uplink radio resources in the RRC_INACTIVE (and/or RRC_IDLE) state. The one or more uplink radio resources determined (and/or indicated) by the (pre-) configured grant Type 2 may require an indication of (re-) initiating (and/or (re-)activating) the one or more uplink radio resources (e.g., after or in response to receiving the RRC message indicating the one or more uplink radio resources). The wireless device may not (re-)initiate (and/or (re-)activate) the one or more uplink radio resources based on (e.g., after or in response to receiving the RRC message comprising the (pre-)configured grant Type 2 that indicates the one or more uplink radio resources). The wireless device may (re-)initiate (and/or (re-)activate) the one or more uplink radio resources based on (e.g., after or in response to) receiving the indication of (re-)initiating (and/or (re-) activating) the one or more uplink radio resources in the RRC_INACTIVE (and/or RRC_IDLE) state. The wireless device may receive the indication based on (e.g., after or in response to) receiving the RRC message comprising the (pre-)configured grant Type 2 that indicates the one or more uplink radio resources. The uplink grant(s) indicating the one or more uplink radio resources in the RRC_INACTIVE (and/or RRC_IDLE) state may be referred to as (pre-)configured grant(s) with a particular type indicator (e.g., a (pre-)configured grant type 3, 4, or etc.). The (pre-)configured grant Type 1 and/ir the (pre-)configured grant Type 2 may indicate one or more (e.g., periodic) uplink grants in the RRC_CONNECTED state. The (pre-) configured grant Type 3 (and/or other types of (pre-)configured grant) may indicate one or more (e.g., periodic) uplink grants in the RRC_INACTIVE (and/or RRC_IDLE) state.

FIG. 18A shows an example of configuration and/or activation of one or more radio resources. One or more (pre-)configured grant(s) may indicate one or more radio resources (e.g., uplink radio resource(s) and/or downlink radio resource(s)) in an RRC_INACTIVE state (and/or an RRC_IDLE state). The (pre-)configured grant(s) may not require an additional activation message (e.g., DCI, MAC CE, and/or RRC) for activating (and/or initiating) one or more uplink radio resources (and/or (pre-)configured grant(s)) (e.g., at 1803). A wireless device 1802 may receive one or more RRC messages comprising configuration parameters of the (pre-) configured grant(s) of a cell. The one or more RRC message may comprise an RRC release message. Based on (e.g., after or in response to) receiving the RRC message, the wireless device 1802 may determine (and/or store) the (pre-)configured grant(s) for the cell. Based on (e.g., after or in response to) receiving the one or more RRC messages, the wireless device 1802 may (re-) initiate (or activate) the (pre-)configured grant. The one or more uplink radio resources (and/or (pre-)configured grant(s)) may be activated and/or initiated (and/or valid) in an RRC_INACTIVE state. The wireless device may (re-) initiate (and/or activate) the (pre-) configured grant to start in (and/or from) a time reference. The time reference may comprise a symbol, a slot, a subframe, an SFN, a hyper-SFN (H-SFN), and/or any indication. The H-SFN comprise one or more SFNs (e.g., 1024 SFNs). the time reference may comprise a combination of one or more of a symbol, a slot, a subframe, an SFN, a hyper-SFN (H-SFN), and/or any indication. The time reference may comprise a symbol of a slot of an SFN of a H-SFN indicated by the configuration parameters (e.g., a time domain offset (e.g., indicating the H-SFN, the SFN and/or the slot) and/or a symbol number S (e.g., indicating the symbol). The wireless device 1802 may determine that the (pre-)configured grant (re-)occurs with/ using a periodicity indicated by the configuration parameters. The wireless device may communicate with and/or make a connection to a network (and/or a base station). The wireless device 1802 may perform an RRC connection setup procedure and/or an RRC connection resume procedure to make the connection. The wireless device 1802 may send/ transmit an RRC connection setup request (e.g., for the RRC connection setup procedure) and/or an RRC connection resume request (e.g., for the RRC connection resume procedure). The wireless device 1802 may receive, from a base station 1801, a response indicating a complete of making the RRC connection. The wireless device 1802 may receive an RRC connection setup complete (e.g., for the RRC connection setup procedure). The wireless device 1802 may receive an RRC connection resume complete (e.g., for the RRC connection resume procedure). The one or more uplink radio resources (and/or (pre-)configured grant(s)) may be deactivated and/or suspended (cleared, and/or invalid) in an RRC_CONNECTED state. The one or more uplink radio resources (and/or (pre-)configured grant(s)) may be deactivated and/or suspended (cleared, and/or invalid) based on (e.g., after or in response to) communicating with (and/or making the connection to) the base station 1801 (e.g., after or in response to receiving RRC connection setup and/or resume complete).

FIG. 18B shows an example of configuration and/or activation of one or more radio resources. One or more (pre-)configured grant(s) may indicate one or more radio resources (e.g., uplink radio resource(s) and/or downlink radio resource(s)) in an RRC_INACTIVE state (and/or an RRC_IDLE state). The (pre-)configured grant(s) in FIG. 18B may require an additional activation message (e.g., DCI, MAC CE, and/or RRC) that activates (and/or initiates) the one or more uplink radio resources (and/or (pre-)configured grant(s)) (e.g., at 1804). A wireless device 1812 may receive one or more RRC messages comprising configuration parameters of the (pre-)configured grant(s) of a cell (e.g., 1805). Based on (e.g., after or in response to) receiving the one or more RRC messages, the wireless device may determine (and/or store) the (pre-)configured grant(s) for the cell. The one or more RRC messages may comprise an RRC release message. Based on (e.g., after or in response to) receiving the one or more RRC messages, the wireless device may not (re-)initiate (or activate) the (pre-)configured grant (e.g., at least until the wireless device receives the (e.g., additional) activation message (e.g., DCI, MAC CE, and/or RRC)) (e.g., at 1804). The wireless device may monitor a PDCCH in an RRC_INACTIVE stare (and/or in an RRC_IDLE state) to receive the additional activation message. The wireless device may receive the (additional) activation message (e.g., DCI, MAC CE, and/or RRC) based on (e.g., after or in response to) receiving the RRC message. A DCI message carried by the PDCCH may comprise the (additional) activation message. A MAC CE, and/or RRC message received based on a downlink assignment of a DCI message carried by the PDCCH may comprise the (additional) activation message. The configuration parameters in the RRC message may indicate time and/or frequency resource allocation of the PDCCH, monitoring occasion(s) of the PDCCH, and/or a monitoring periodicity of the PDCCH. The wireless device may determine that the (pre-)configured grant (re-)occurs with a periodicity indicated by the configuration parameters and/or timing offset references (e.g., a H-SFN, a SFN, a slot and/or a symbol). A wireless device may determine the SFN (e.g., of the H-SFN), the slot and/or the symbol based on a reception timing of the additional activation message received via the PDCCH. The wireless device 1812 may receive a deactivation message that may indicate to deactivate and/or suspend (clear, and/or invalidate) the one or more uplink radio resources (and/or (pre-)configured grant(s)). The wireless device 1812 may receive the deactivation message in the RRC_INACTIVE state (and/or in the RRC_IDLE state). The wireless device 1812 may communicate with (and/or make a connection to) a network (and/or a base station 1811). The wireless device 1812 may perform an RRC connection setup procedure and/or RRC connection resume procedure to communicate with the base station 1811 (and/or to make the connection with the base station 1811). The wireless device 1812 may send/transmit an RRC connection setup request (e.g., for the RRC connection setup procedure) and/or an RRC connection resume request (e.g., for the RRC connection resume procedure). The wireless device 1812 may receive, from the base station 1811, a response indicating a completion of making the RRC connection. The wireless device 1812 may receive an RRC connection setup complete message (e.g., for the RRC connection setup procedure). The wireless device 1812 may receive an RRC connection resume complete message (e.g., for the RRC connection resume procedure). Based on (e.g., after or in response to) making the connection to, an RRC state of the wireless device 1812 may be transitioned to an RRC_CONNECTED state. The one or more uplink radio resources (and/or (pre-)configured grant(s)) (e.g., 1806) may be deactivated and/or suspended (cleared, and/or invalid), based on (e.g., after or in response to) the RRC state of the wireless device 1812 being an RRC_CONNECTED state. The one or more uplink radio resources (and/or (pre-)configured grant(s)) may be deactivated and/or suspended (cleared, and/or invalid) based on (e.g., after or in response to) making the connection to the base station 1811 (e.g., after or in response to receiving RRC connection setup and/or resume complete).

One or more uplink radio resources in an RRC_INACTIVE (and/or RRC_IDLE) state may be configured by one or more upper layer(s) (e.g., RRC layer and/or MAC layer). The wireless device 1812 may receive, from the base station 1811, message(s) (e.g., RRC message) comprising one or more configuration parameters for transmission of uplink data via the one or more uplink radio resources (e.g., 1806) in an RRC_INACTIVE (and/or RRC_IDLE) state.

The one or more configuration parameters may comprise and/or indicate an RNTI. The RNTI may be for transmission(s) of uplink data via the one or more uplink radio resources in an RRC_INACTIVE (and/or RRC_IDLE) state. The RNTI may be an identifier of the wireless device, such as a C-RNTI. The RNTI may comprise a C-RNTI. The RNTI may comprise a preconfigured uplink resource C-RNTI (e.g., PUR-C-RNTI and/or PUR-RNTI). The wireless device may monitor a PDCCH using the RNTI. The wireless device may monitor the PDCCH using the RNTI based on (e.g., after or in response to) transmission of uplink data via the one or more uplink radio resources. The wireless device may receive, via the PDCCH, DCI with/using CRC scrambled by the RNTI. The DCI may indicate a positive acknowledgement of the transmission of the uplink data. The DCI may indicate a negative acknowledgement of the transmission of the uplink data. The DCI may indicate a retransmission of the transmission of the uplink data. The DCI may indicate an uplink grant for the retransmission. The DCI may indicate an updated parameter value(s) of the one or more configuration parameters. The DCI may indicate a (e.g., new or updated) timing advance value for transmission of uplink data via the one or more uplink radio resources in an RRC_INACTIVE (and/or RRC_IDLE) state. The DCI may indicate a trigger/initiation of an RA procedure. The one or more configuration parameters may indicate a duration of a response window (e.g., example parameter name: ResponseWindowSize). The wireless device may monitor the PDCCH for the duration of the response window to receive, from a base station, a response (e.g., the DCI) to the transmission of data.

The one or more configuration parameters may indicate a number/quantity of skipped uplink grants (and/or resource occasions) (e.g., example parameter name: ImplicitReleaseAfter). The wireless device may determine to release (clear, deactivate, discard, and/or suspend) the one or more uplink radio resources, uplink grant(s) indicating the one or more uplink radio resources, and/or the one or more configuration parameters, for example, based on the indicated number/quantity. This releasing (clearing, deactivating, discarding, and/or suspending) may be referred to as an implicit resource release, an implicit preconfigured uplink resource release, and/or the like. The number/quantity of skipped uplink grants (and/or resource occasions) indicated by the one or more configuration parameters may comprise a number/quantity of consecutive skipped (and/or empty) uplink grants (and/or resource occasions). The wireless device may release (clear, deactivate, discard, and/or suspend) the one or more uplink radio resources, uplink grant(s) indicating the one or more uplink radio resources, and/or the one or more configuration parameters, for example, based on (e.g., after or in response to) a determination that the wireless device may skip N occasions (e.g., N consecutive occasions) of the one or more uplink radio resources or may not transmit uplink packet(s) via the one or more uplink radio resources for N times (e.g., N=the number of skipped uplink grants and/or resource occasions). The wireless device may not apply (and/or use) the implicit resource release (e.g., implicit preconfigured uplink resource release or the like), for example, if the one or more configuration parameters does not comprise parameter(s) indicating the number of skipped uplink grants (and/or resource occasions) (e.g., if ImplicitReleaseAfter is not present in the one or more configuration parameters). Any of the procedures described with respect to FIG. 18B may apply to procedures with respect to FIG. 18A, for example, for combined operation. Any of the procedures described with respect to FIG. 18A may apply to procedures with respect to FIG. 18B (e.g., activation and/or initiation of resources at 1803 may apply to activation and/or initiation of resources at 1805 and/or 1806).

Figure 19:
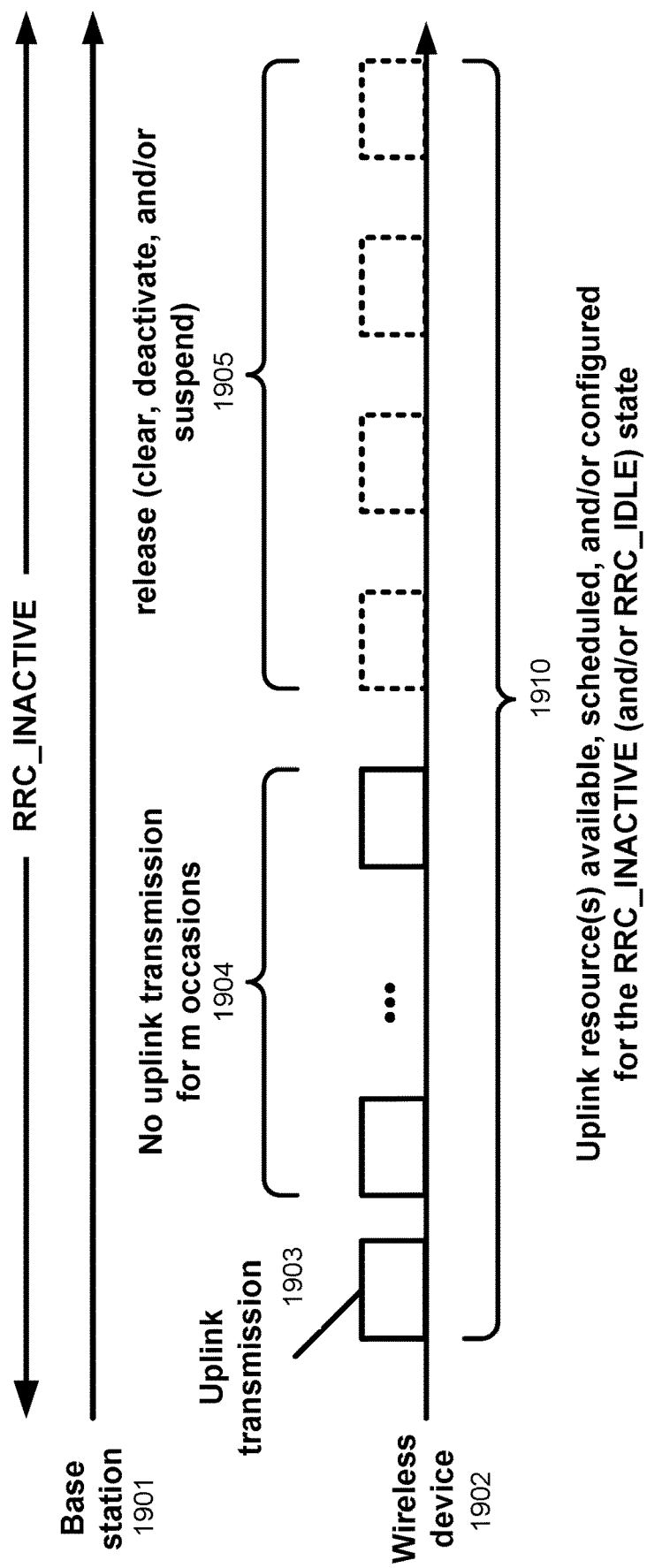
FIG. 19 shows an example of resource configuration.

FIG. 19 shows an example of resource configuration. A base station 1901 may configure a wireless device 1902 with one or more resources (e.g., 1910) for transmission and/or reception (e.g., during an RRC_INACTIVE state and/or an RRC_IDLE state). The base station 1901 may configure the wireless device 1902 with one or more resources for an uplink transmission 1903. One or more resources (e.g., for data packet transmission(s)) in an RRC_INACTIVE state (and/or an RRC_IDLE state) may be configured and used for transmission/reception (e.g., at 1903), configured and not used for transmission reception (e.g., at 1904), and/or released after being configured (e.g., at 1905). The wireless device 1902 may receive one or more RRC message(s) configuring uplink resource(s) (e.g., 1910). The uplink resource(s) (e.g., 1910) may be available, scheduled, and/or configured in the RRC_INACTIVE state (and/or RRC_IDLE state). The wireless device 1902 may not transmit uplink packet(s) during one or more occasions of the uplink resource(s) (e.g., at 1904). The wireless device 1902 may count/determine the one or more occasions. The wireless device 1902 may determine to release (e.g., may determine to at least one of release, clear, deactivate, and/or suspend) the uplink resource(s). The wireless device 1902 may release the uplink resource(s), for example, if a number/quantity of the one or more occasions that the wireless device may skip (and/or does not use to transmit uplink packet(s)) satisfies (e.g., is greater than or equal to) a threshold value. The number/quantity of the one or more occasions may be a number/quantity of consecutive one or more occasions of the uplink resource(s) that the wireless device may skip (and/or may not use).

A wireless device may count/determine a number/quantity of skipped uplink grants (and/or resource occasions). The wireless device may count/determine a number/quantity of skipped uplink grants, for example, to determine whether to release (e.g., clear, deactivate, discard, and/or suspend) the one or more uplink radio resources, uplink grant(s) indicating the one or more uplink radio resources, and/or the one or more configuration parameters. m may indicate the number/quantity of skipped uplink grants (and/or resource occasions) that the wireless device counts/determines. The wireless device may determine to release (e.g., clear, deactivate, discard, and/or suspend) the one or more uplink radio resources, uplink grant(s), and/or the one or more configuration parameters, for example, if m satisfies/reaches (e.g., is greater than or equal to) a threshold value. The threshold value may be configurable (e.g., the threshold value may be 1, 2, 3, 4, 8, and so on) by the one or more configuration parameters. The one or more configuration parameters may indicate that the threshold value is not configured (e.g., threshold value may be disabled). The wireless device may determine that the implicit resource release is not applied (e.g., is disabled), for example, if the one or more configuration parameters does not comprise the threshold value.

A wireless device may count/determine a number/quantity of skipped uplink grants (and/or resource occasions) with/using a counter. A value of the counter may be referred to as m. The counter may be implemented in one or more ways. The value of the counter may increase and/or decrease based on the implemented counter. The counter may comprise an up-counter may count a number/quantity of skipped uplink grants (and/or resource occasions) in increasing order. The wireless device may determine to release (e.g., clear, deactivate, discard, and/or suspend) the one or more uplink radio resources, uplink grant(s) indicating the one or more uplink radio resources, and/or the one or more configuration parameters, for example, if the value of counter, m, satisfies/reaches the threshold value. The counter may comprise a down-counter that may count a number/quantity of skipped uplink grants (and/or resource occasions) in a decreasing order. The wireless device may determine to release (e.g., clear, deactivate, discard, and/or suspend) the one or more uplink radio resources, uplink grant(s) indicating the one or more uplink radio resources, and/or the one or more configuration parameters, for example, if the value of counter may start from the threshold value (and/or a first predetermined value) and reaches zero (or a second quantity and/or predetermined value). The wireless device may determine to release (e.g., clear, deactivate, discard, and/or suspend) the one or more uplink radio resources, uplink grant(s) indicating the one or more uplink radio resources, and/or the one or more configuration parameters, for example, if a number of skipped uplink grants (and/or resource occasions) that the wireless device counters reaches/satisfies the threshold value (e.g., for any type of counter, such as an up-counter, a down-counter, and/or the like). Descriptions herein with respect to a counter may apply to any type of counter (e.g., descriptions relating to an up-counter may be applied to descriptions relating to a down-counter, and/or descriptions relating to a down-counter may be applied to descriptions relating to an up-counter).

A wireless device may determine to increase m based on at least one of following. The wireless device may increase m, for example, if a radio resource occasion of the one or more uplink radio resource is not used (e.g., the wireless device may increase m if the wireless device does not transmit data packet(s) via the radio resource occasion of the one or more uplink radio resource). The wireless device may increase m, for example, if a radio resource occasion of the one or more uplink radio resource is not used during a time period that the wireless device is in an RRC_INACTIVE state (and/or an RRC_IDLE state). The wireless device may increase m (e.g., uplink grant(s) of the one or more uplink radio resource and/or resource occasions of the one or more uplink radio resource skipped), for example, if no MAC PDU is generated for the uplink grant(s) and/or the resource occasions. The wireless device may increase m, for example, if an radio resource occasion of the one or more uplink radio resource is used (e.g., the wireless device transmits data packet(s) via the radio resource occasion of the one or more uplink radio resource) but no response (e.g., one or more of HARQ ACK, HARQ NACK, L2 (e.g., MAC CE) response, and/or L3 (e.g., RRC message) response) corresponding to the data packet(s) is received. The wireless device may increase m, for example, if the wireless device skips a radio resource occasion of the one or more uplink radio resource due to access barring to a cell in/via which the one or more uplink radio resources are configured. The wireless device may increase m, for example, if the wireless device skips a radio resource occasion of the one or more uplink radio resource due to the wireless device being in a wait time (and/or extended wait time). The wait time (and/or extended wait time) may indicate how many seconds the wireless device may wait (e.g., may be required to wait) based on (e.g., after or in response to) reception of a rejection (e.g., RRC Connection Reject) and/or at least until an RRC connection request message is sent/transmitted.

A base station (and/or network) may maintain the counter to be in-sync with a wireless device. The base station (and/or network) may determine to increase m based on at least the following. The base station (and/or network) may increase m, for example, if the base station does not receive uplink packet(s) via a radio resource occasion of the one or more uplink radio resource. The base station (e.g., network) may increase m, for example, during a time period that the wireless device is in an RRC_INACTIVE state (and/or an RRC_IDLE state). The base station (and/or network) may increase m, for example, if the base station (e.g., network) does not send/transmit a response (e.g., HARQ feedback (ACK and/or NACK)). The base station (and/or network) may increase m, for example, if the base station receives uplink packet(s) via a radio resource occasion of the one or more uplink radio resource but does not send/transmit, to the wireless device, a response to uplink packet(s). The response may comprise HARQ ACK feedback. The response may comprise HARQ NACK feedback. The response may comprise an L2 response (e.g., MAC CE) and/or an L3 response (e.g., RRC message). The base station (and/or network) may increase m, for example, if a radio resource occasion of the one or more uplink radio resource is skipped by the wireless device (e.g., due to access barring to a cell in/via which the one or more uplink radio resources are configured). The base station (and/or network) may increase m, for example, if a radio resource occasion of the one or more uplink radio resource is skipped by the wireless device due to the wireless device being in a wait time (and/or extended wait time). The wait time (and/or extended wait time) may indicate (e.g., define) how many seconds the wireless device waits based on (e.g., after or in response to) reception of RRC Connection Reject at least until an RRC connection request message is sent.

A wireless device may determine not to increase m based on at least one of following. The wireless device may not increase m, for example, during a time period that the wireless device is in an RRC_CONNECTED state. The wireless device may not increase m, for example, based on (e.g., after or in response to) the one or more uplink radio resource of the wireless device being suspended (e.g., deactivated, and/or cleared). The wireless device may not increase m, for example, during a time period that a timer (e.g., a barring timer) of the wireless device is running. The wireless device may determine, based on the barring timer (e.g., if the barring timer expires), the time before an access attempt is to be performed. The time before an access attempt is to be performed may be determined based on (e.g., after or in response to) an access attempt being barred at an access barring check. A base station (and/or a network) may maintain the counter to be in-sync with a wireless device. The base station (and/or network) may determine not to increase m, for example, based on at least following. The base station (and/or network) may not increase m, for example, during a time period that the wireless device is in an RRC_CONNECTED state. The base station (and/or network) may not increase m, for example, based on (e.g., after or in response to) the one or more uplink radio resource of the wireless device being suspended (e.g., deactivated, and/or cleared). The base station (and/or network) may not increase m, for example, during a time period that a timer (e.g., a barring timer) of the wireless device is running. The wireless device may determine, based on the barring timer (e.g., if the barring timer expires), the time before an access attempt is to be performed. The time before an access attempt is to be performed may be determined based on (e.g., after or in response to) an access attempt being barred at access barring check.

A wireless device may reset a counter based on at least one of following. The wireless device may reset the counter (e.g., to zero, such as for an up-counter) based on (e.g., after or in response to) successful communication between the wireless device and a base station (and/or a network). The wireless device may reset the counter (e.g., to zero, such as for an up-counter) based on (e.g., after or in response to) receiving an acknowledgement (e.g., ACK message) corresponding to uplink transmission via the one or more uplink radio resource. The wireless device may be in an RRC_INACTIVE (and/or RRC_IDLE) state. The wireless device may reset the counter (e.g., to zero, such as for an up-counter) based on (e.g., after or in response to) sending/transmitting an acknowledgement (e.g, ACK message) corresponding to a reception of downlink data packet(s) from the base station (and/or network) in an RRC_INACTIVE (and/or RRC_IDLE) state. The wireless device may not reset the counter based on (e.g., after or in response to) successful communication during a time period that the wireless device is in an RRC_CONNECTED state.

A base station (and/or network) may reset a counter based on at least one of following. The base station (and/or network) may reset (e.g., to zero, such as for an up-counter) based on (e.g., after or in response to) successful communication between a wireless device and the base station (and/or network). The base station (and/or network) may reset the counter (e.g., to zero, such as for an up-counter) based on (e.g., after or in response to) sending/transmitting an acknowledgement (e.g., ACK message) corresponding to uplink transmission performed by the wireless device via the one or more uplink radio resource. The wireless device may perform the uplink transmission in an RRC_INACTIVE (and/or RRC_IDLE) state. The base station (and/or network) may reset (e.g., to zero, such as for an up-counter) based on (e.g., after or in response to) receiving, from the wireless device, an acknowledgement (e.g., ACK message) corresponding to downlink data packet(s) sent/transmitted to the wireless device during a time period that the wireless device is in an RRC_INACTIVE (and/or RRC_IDLE) state. The base station (and/or network) may not reset the counter based on (e.g., after or in response to) successful communication during a time period that the wireless device is in an RRC_CONNECTED state.

One or more configuration parameters may indicate a value of a time alignment timer (TAT) (e.g., example parameter name: TimeAlignmentTimer) for a cell (and/or a cell group comprising the cell) in/via which the one or more uplink radio resources in an RRC_INACTIVE state (and/or RRC_IDLE state) are configured. The cell group comprising the cell may be referred to as a timing advance group (TAG) and/or any other type of cell group. The value of the TAT may indicate a duration of (e.g., how long) a timing advance offset value is valid and/or is used for adjusting uplink timing for uplink transmission to the cell (and/or cell(s) in the cell group). The value of the TAT may indicate/determine a duration that (e.g., how long) the wireless device may determine the cell (and/or cell(s) belonging to the associated TAG) to be uplink time aligned. The wireless device may determine (and/or adjust), based on the timing advance offset value, uplink timing for uplink transmission (e.g., PRACH, PUSCH, SRS, and/or PUCCH transmission) on/via the cell (and/or on/via cells in the cell group). The timing advance offset value may indicate how much (and/or long) the uplink timing for uplink transmission is delayed or advanced for uplink synchronization. the wireless device may run the TAT during a time interval (and/or duration) indicated by the value of the TAT. The wireless device may determine that the timing advance offset value is valid (and/or is used) for adjusting uplink timing for uplink transmission on the cell (or cell(s) in the cell group) during a time period that the TAT is running. The wireless device may determine that an uplink from the wireless device to the cell (e.g., base station) is out-of-synchronization, for example, if the TAT associated with the cell group (e.g., TAG) to which the cell belongs is not running and/or expires. The wireless device may stop performing uplink transmission(s) on/via a cell (and/or on/via cell(s) in the cell group), for example, if the TAT associated with the cell group (e.g., TAG) to which the cell belongs is not running and/or expires. The wireless device may stop uplink transmissions for a cell, for example, if the uplink transmission timing difference (e.g., a maximum uplink transmission timing difference) between TAGs (and/or other cell groups) of the wireless device, or the uplink transmission timing difference between TAGs (and/or other cell groups) of any MAC entity of the wireless device (e.g., two MAC entities configured for a dual connectivity), is exceeded. The wireless device may determine the TAT associated with the cell as expired, for example, if the uplink timing difference between TAGs (and/or other cell groups) is exceeded. The wireless device may perform a random access preamble transmission (and/or re-transmission) and/or MSG A transmission (and/or re-transmission), for example, if the TAT associated with the cell group (e.g., TAG) to which the cell belongs is not running and/or expires. The wireless device may start (and/or re-start) the TAT based on (e.g., after or in response to) receiving a timing advance command that indicates a timing advance offset value (e.g., a new and/or updated timing advance offset value) of the cell (and/or of cells in the cell group). The timing advance command may be received as a MAC CE and/or DCI. The timing advance command may indicate a timing advance offset value of a cell in/via which the one or more uplink radio resources are in an RRC_INACTIVE state (and/or an RRC_IDLE state).

The wireless device may start (and/or re-start) a time alignment timer based on (e.g., after or in response to) a switch/transition to an RRC_INACTIVE state (and/or to RRC_IDLE state). The wireless device may start (and/or re-start) the time alignment timer, for example, if the wireless device receives (and/or is configured with) the one or more uplink radio resources for the RRC_INACTIVE (and/or RRC_IDLE) state. The wireless device may start (and/or re-start) the time alignment timer based on (e.g., after or in response to) receiving configuration parameter(s) (e.g., timer value of the time alignment timer) associated with the time alignment timer. The wireless device may start (and/or re-start) the time alignment timer based on (e.g., after or in response to) receiving a timing advance offset value. The wireless device may receive a lower layer control message (e.g., DCI or PDCCH) that may indicate the timing advance offset value. The wireless device may receive a MAC layer control message (e.g., MAC CE and/or RAR) that may indicate the timing advance offset value. The wireless device may start (and/or re-start) the time alignment timer based on (e.g., after or in response to) receiving a timing advance command MAC control element and/or a PDCCH message indicating a timing advance adjustment. The wireless device may determine that the timing advance offset value is valid at least during a time period that the TAT is running. The wireless device may validate a TA value based on one or more validation conditions. The wireless device may start (and/or re-start) the time alignment timer based on (e.g., after or in response to) a determination that the TA is validated. The wireless device may determine that the TAT has expired, for example, if the TAT has run for a time interval (and/or time duration) indicated by the value of the TAT. The wireless device may determine that the timing advance offset value is invalid based on in response to the expiry of the TAT.

A timing advance value may be referred to as a timing alignment value. A timing advance offset value may be referred to as a timing alignment offset value. A timing alignment timer may be referred to as one or more of: a time alignment timer, a timing advance timer, and/or a time advance timer. A timing advance group may be referred to as a timing alignment group.

The one or more configuration parameters may indicate a number/quantity of occasions of the one or more uplink radio resources (e.g., an example parameter name: NumOccasions). The number/quantity of occasions may indicate that the one or more uplink radio resources is one time use resource (or grant) for a single uplink transmission. The number/quantity of occasions may indicate that the one or more uplink radio resources comprises a plurality of uplink radio resources. The number/quantity of occasions may indicate that the one or more uplink radio resources comprises one or more periodic radio resources.

The one or more configuration parameters may indicate a time domain resource allocation of the one or more uplink radio resources. The one or more configuration parameters may indicate a periodicity (e.g., example parameter name: Periodicity) of the one or more uplink radio resources in the RRC_INACTIVE (and/or RRC_IDLE) state. The one or more configuration parameters may comprise a time offset. The time offset may comprise a time domain offset with respect to (and/or related to) a time reference. The time reference may comprise a particular SFN (e.g., of a H-SFN), a particular subframe number, a particular slot number, a particular symbol number, and/or a combination thereof. The time reference may comprise predefined (e.g., SFN=0 and/or H-SFN=0). The time reference may comprise a predefined value (e.g., SFN=0 and/or H-SFN=0), for example, if a field of the time reference is not present in the one or more configuration parameters. An wireless device may receive one or more uplink grant(s), for example, indicated by the one or more configuration parameters. The one or more uplink grant(s) may indicate the one or more uplink radio resources. The one or more uplink radio resources may start from a symbol (of a slot of an SFN of a H-SFN) indicated by the time offset. The one or more uplink radio resources may occur from the symbol periodically with the periodicity. The wireless device may determine (e.g., sequentially determine) that an $N^{th}$ uplink grant of the one or more uplink grant(s) occurs in a transmission time interval (TTI, e.g., slot(s), mini-slot(s), symbol(s)) based on the time offset and N*Periodicity. The time offset may be indicated/defined in terms of a number/quantity of symbols, a number/quantity of slots, a number/quantity of subframes, a number/quantity of SFNs, a number/quantity of H-SFNs, and/or a combination thereof. The one or more configuration parameters may comprise a parameter, timeDomainOffset, or the like. A parameter (e.g., timeDomainOffset) may indicate the time offset that the wireless device received from a base station. The one or more configuration parameters may comprise a parameter, timeReferenceSFN, or the like (e.g., a time reference reference defined in terms of SFN(s) and/or H-SFN). A parameter (e.g., timeReferenceSFN) may indicate an SFN as the time reference used for determination of the time offset of a resource in time domain. The SFN may repeat with a period of 1024 frames. The wireless device may receive, via SFN=3, the one or more configuration parameters indicating timeReferenceSFN=0. A parameter, timeReferenceSFN=0, may indicate a time reference SFN=0 that is 3 SFNs before the SFN=3. A parameter, timeReferenceSFN=0, may indicate a time reference SFN=0 that is 1021 SFNs after the SFN=3. The wireless device may determine the closest SFN with the indicated number/quantity preceding the reception of the configured grant configuration. The wireless device may determine that timeReferenceSFN=0 indicates a time reference SFN=0 that is 3 SFNs before the SFN=3. The wireless device may determine (e.g., sequentially determine) that the $N^{th}$ uplink grant occurs (and/or the uplink grant recurs) in the symbol for which: [(SFN×numberOfSlotsPerFrame×numberOfSymbolsPerSlot)+(slot number in the frame×numberOfSymbolsPerSlot)+symbol number in the slot]=(time ReferenceSFN×numberOfSlotsPerFrame×numberOfSymbolsPerSlot+timeDomainOffset×numberOfSymbolsPerSlot+S+N×periodicity) modulo (1024×numberOfSlotsPerFrame×numberOfSymbolsPerSlot). A parameter, numberOfSlotsPerFrame, may indicate a number/quantity of slots in a frame. A parameter, numberOfSymbolsPerSlot, may indicate a number/quantity of symbols in a slot. A parameter, periodicity, may indicate a periodicity of the one or more uplink radio resources indicated by the one or more configuration parameters. S may be a symbol number (and/or a symbol offset) indicated by the one or more configuration parameters. The determination of the $N^{th}$ uplink grant may indicate that grant(s) (e.g., configured grant(s), pre-configured grant(s), etc., such as described with respect to FIG. 18A) may not require an additional activation message (e.g., DCI, MAC CE, and/or RRC) that activates (and/or initiates) the one or more uplink radio resources (and/or grant(s), configured grant(s), pre-configured grant(s), etc.). The wireless device may determine (e.g., sequentially determine) that the $N^{th}$ uplink grant occurs (and/or the uplink grant recurs) in the symbol for which: [(SFN×numberOfSlotsPerFrame×numberOfSymbolsPerSlot)+(slot number in the frame×numberOfSymbolsPerSlot)+symbol number in the slot]=[(SFNstart time×numberOfSlotsPerFrame×numberOfSymbolsPerSlot+slotstart time×numberOfSymbolsPerSlot+symbolstart time)+N×periodicity] modulo (1024×numberOfSlotsPerFrame×numberOfSymbolsPerSlot). The determination of the $N^{th}$ uplink grant above may indicate that grant(s) (e.g., configured grants, pre-configured grant(s), etc., such as described with respect to FIG. 18B) may require an additional activation message (e.g., DCI, MAC CE, and/or RRC) that activates (and/or initiates) the one or more uplink radio resources (and/or grant(s), configured grant(s), pre-configured grant(s), etc.). SFNstart time, slotstart time, and symbolstart time may indicate (e.g., correspond to) the SFN, slot, and symbol, respectively, at a time the one or more uplink grant(s) are initialized and/or re-initialized. SFNstart time, slotstart time, and symbolstart time may indicate (e.g., correspond to) the SFN, slot, and symbol, respectively, at a time that the wireless device receives an indication (e.g., DCI) of initializing (and/or re-initializing, activating, re-activating, etc.) the one or more uplink grant(s). SFNstart time, slotstart time, and symbolstart time may indicate (e.g., correspond to) the SFN, slot, and symbol, respectively, of a transmission opportunity of PUSCH in which the one or more uplink grant(s) are initialized and/or re-initialized. The transmission opportunity of a PUSCH may indicate (e.g., correspond to) the first opportunity of a PUSCH transmission in which the one or more uplink grant(s) is initialized and/or re-initialized.

A wireless device may initiate and/or re-initiate transmission via one or more uplink radio resources in the RRC_INACTIVE (and/or RRC_IDLE) state. The wireless device may initiate and/or re-initiate transmission via one or more uplink radio resources in the RRC_INACTIVE (and/or RRC_IDLE) state based on one or more conditions. The wireless device may receive configuration parameter(s) indicating the one or more conditions. The wireless device may determine if a cell, in/via which one or more uplink radio resources in the RRC_INACTIVE (and/or RRC_IDLE) state are configured, supports transmission(s) via the one or more uplink radio resources. The wireless device may receive one or more RRC message(s) (e.g., SIB). The one or more RRC message(s) may comprise configuration parameter(s) indicating whether/if the cell supports transmission(s) via the one or more uplink radio resources. The configuration parameter(s) may indicate which type of transmission is supported (and/or is available) via the one or more uplink radio resources. The type may comprise control plane (CP) transmission and/or user-plane (UP) transmission. The configuration parameter(s) may indicate a (e.g., which) type of network, via which the cell is connected, supports the transmission via the one or more uplink radio resources. The wireless device may determine whether/if the transmission via the one or more uplink radio resources is supported in the cell, for example, based on a type of network that the cell is connected. The type of network may comprise one or more generations and/or versions in a network system (e.g., 5G core, Evolved Packet Core (EPC), 3GPP Rel. 15, 16, 17, earlier/later releases, and/or the like) and/or one or more wireless technologies (e.g., Wi-Fi, 5G, Bluetooth, satellite, and/or the like). The configuration parameter(s) may indicate which type of spectrum (and/or frequency band) supports the transmission via the one or more uplink radio resources. The type of spectrum may comprise licensed spectrum and/or unlicensed spectrum. The type of spectrum may comprise a CBRS (Citizens Broadband Radio Service) band (e.g., a wideband in 3.5 GHz band). The type of spectrum may comprise a millimeter wave band (e.g., over 30 GHz band). The configuration parameter(s) in the RRC message(s) may indicate a combination of the type of network, the type of spectrum, and/or the type of transmission. Parameter(s), cp-PUR-SGC (e.g., the parameter value may be 'true'/'false' or 'enabled'/'disabled'), in the RRC message(s) may indicate whether/if CP transmission using PUR is supported in the cell (e.g., if/when connected to a 5G core network and/or any other network). Parameter(s), cp-PUR-EPC (e.g., the parameter value may be 'true'/'false' or 'enabled'/'disabled'), in the RRC message(s) may indicate whether/if CP transmission using PUR is supported in the cell (e.g, if/when connected to EPC). The wireless device may determine that the PUR is supported in the cell (e.g., if/when connected to EPC), for example, if the RRC message(s) received from a cell indicates cp-PUR-EPC='true' (or 'enabled').

The wireless device may initiate and/or re-initiate transmission via one or more uplink radio resources in the RRC_INACTIVE (and/or RRC_IDLE) state. The wireless device may initiate and/or re-initiate transmission via one or more uplink radio resources in the RRC_INACTIVE (and/or RRC_IDLE) state, for example, based on one or more conditions. The wireless device may initiate and/or re-initiate transmission via one or more uplink radio resources in the RRC_INACTIVE (and/or RRC_IDLE) state, for example, if at least one of following conditions are satisfied: the wireless device has a valid configuration of the one or more uplink radio resources; the wireless device has a valid timing advance value; the wireless device triggers to request establishment of an RRC connection; the wireless device triggers to request resumption of an RRC connection; the wireless device has a stored value of a valid security parameter (e.g., nextHopChainingCount provided in the RRCConnectionRelease message with suspend indication during the preceding suspend procedure); the wireless device triggers the establishment or resumption request for mobile originating calls and/or the establishment cause is mo-Data or mo-ExceptionData or delayTolerantAccess; and/or a size of an MAC PDU (e.g., comprising the total UL data) is expected to be smaller than or equal to a transport block size (TBS) configured for PUR.

The wireless device may determine, based on one or more validation conditions (e.g., a TAT based validation and/or a measurement based validation), if the wireless device has a valid timing advance value. The wireless device may determine the configuration of the one or more uplink radio resources is valid, for example, based on configuration parameter(s) of the one or more uplink radio resources indicating a validity of the configuration. The wireless device may receive one or more message(s) comprising the configuration parameter(s). The configuration may be determined to be valid, for example, if a field (e.g., config) in the message(s) is set to setup (e.g., true). The configuration may be determined to be valid, for example, if the field (e.g., config) is set to release (e.g., false).

The wireless device may determine, based on one or more validation conditions, if a timing advance value is valid (or not) for transmission via the one or more uplink radio resources in the RRC_INACTIVE (and/or RRC_IDLE) state. The one or more validation conditions may comprise a TAT based validation and/or a measurement based validation. The wireless device may determine to apply the configured condition(s) among the one or more validation conditions. The wireless device may receive one or more message(s) comprising configuration parameters of a first validation condition (e.g., the TAT based validation) among the one or more validation conditions. The message(s) may not comprise configuration parameters of a second validation condition (e.g., the measurement based validation) among the one or more validation conditions. The wireless device may determine if the timing advance value is valid (or not) based on the first validation condition. the wireless device may determine if the timing advance value is valid (or not) at least based on the first validation condition and the second validation condition for example, if the message(s) comprising configuration parameters of the first validation condition (e.g., the TAT based validation) and the second validation condition (e.g., the measurement based validation).

The wireless device may determine a validity of the timing advance value based on a TAT, for example, for the TAT based validation. The wireless device may receive one or more RRC message(s) comprising a value of the TAT. The TAT may be for a cell (and/or a TAG comprising the cell) in/via which one or more uplink radio resources in the RRC_INACTIVE (and/or RRC_IDLE) state are configured. The wireless device may determine that the timing advance value for transmission via the one or more uplink radio resources is valid, for example, if the TAT is running. The wireless device may determine that the validation of the timing advance value for transmission is not based on the TAT, for example, if the value of the TAT is not configured (e.g., the RRC message(s) does not comprise the value of the TAT).

Figure 20:
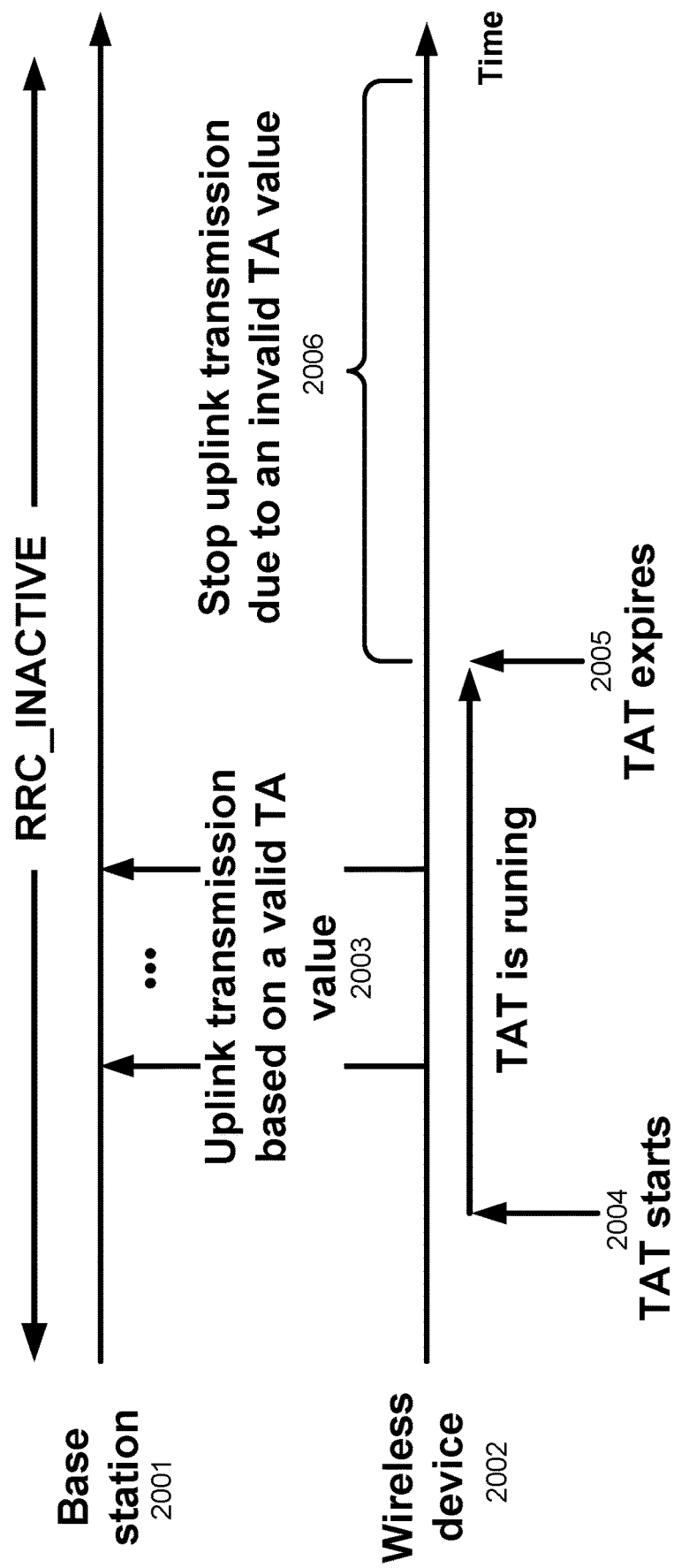
FIG. 20 shows an example of resource configuration.

FIG. 20 shows an example of resource configuration. The resource configuration may be based on one or more timers. A wireless device 2002 may send/transmit, to a base station 2001, one or more uplink transmissions (e.g., at 2003). The sending/transmitting one or more uplink transmissions may be based on a valid timing advance (TA) value. The sending/transmitting one or more uplink transmissions may be during a time period that a time alignment timer (TAT) is running. The time period that a TAT is running may be from a first period of time at which the TAT starts (e.g., 2004) to a second period of time at which the TAT expires (e.g., 2005). The one or more uplink transmissions may occur during a time period that the wireless device 2002 is in an RRC_INACTIVE state (and/or an RRC_IDLE state). The wireless device 2002 may receive, from the base station 2001, one or more RRC message(s) comprising configuration parameters of uplink resource(s) in an RRC_INACTIVE state (and/or an RRC_IDLE state). The uplink resource(s) may be available, scheduled, and/or configured in the RRC_INACTIVE state (and/or in the RRC_IDLE state). The wireless device 2002 may send/transmit uplink packet(s) via one or more occasions of the uplink resource(s), for example, if a TA value for the transmission is validated (e.g., at 2003). The wireless device 2002 may determine (e.g., validate) the TA value as valid to be used for one or more data packet transmission(s) in an RRC_INACTIVE state (and/or in an RRC_IDLE state), for example, if a TAT is running (e.g., at 2004 to 2005). The wireless device 2002 may send/transmit data via one or more uplink resource(s) in an RRC_INACTIVE state (and/or in an RRC_IDLE state), for example, if the wireless device may determine (e.g., validate) the TA value as valid and/or if the TAT is running. The wireless device 2002 may determine that the TA value is invalid, for example, if the TAT is not running (and/or if the TAT expires). The wireless device 2002 may stop (e.g., may be prohibited to perform) uplink transmission via the uplink resource(s) (e.g., at 2006), for example, at and/or after a time that the TAT expires (e.g., 2005).

The wireless device may determine validity of the timing advance value based on measurement(s) of DL RS of a cell, for example, for a measurement-based validation. The wireless device may determine, based on measurement(s) of DL RS of a cell in/via which the one or more uplink radio resources are configured, for example, if the timing advance value for transmission via the one or more uplink radio resources is valid. The measurement(s) of the DL RS of the cell may be a serving cell measurement (e.g., RSRP). The wireless device may receive one or more RRC message(s) comprising one or more threshold values of the measurement. The wireless device may measure at least one DL RS received from the cell (e.g., TRP), for example, in/via which the one or more uplink radio resources are configured. The at least one DL RS may comprise a synchronization signal and/or a CSI-RS. The measurement of the at least one DL RS may comprise an RSRP. The measured value of the at least one DL RS may comprise an RSRQ and/or RSSI (Received Signal Strength Indicator). The wireless device may determine that a timing advance value for transmission via the one or more uplink radio resources is valid, for example, if the measured value is within a range indicated by the one or more threshold values. The wireless device may determine that the timing advance value for transmission via the one or more uplink radio resources is valid, for example, if the measured value has not changed more than a range indicated by the one or more threshold values after the wireless device measured a previous DL RS. The wireless device may measure the previous DL RS, for example, based on measurement configuration(s) that schedule one or more measurements. The wireless device may measure the previous DL RS, for example, independent of resource allocation of the uplink resource(s). The wireless device may measure the previous DL RS for the last TA validation that the wireless device performed for the transmission via the one or more uplink radio resources.

The one or more threshold values of the measurement may comprise an increase threshold value and/or a decrease threshold value. The increase threshold value and/or the decrease threshold value may be based on (e.g., indicated/defined in terms of) RSRP, RSRQ, RSSI, and/or any combination thereof. The increase threshold value and/or the decrease threshold value may indicate the threshold(s) of change in the cell. The increase threshold value and/or the decrease threshold value may indicate a range in which the wireless device determines the TA value to be valid (e.g., to be used for transmission via the one or more uplink radio resources in RRC_INACTIVE (and/or RRC_IDLE)). The range may indicate an area of the cell (e.g., a certain coverage tier in a cell, for example, center area, cell edge area, etc.), in which the TA value may be used for transmission via the one or more uplink radio resources in an RRC_INACTIVE (and/or an RRC_IDLE) state.

The increase threshold value and/or the decrease threshold value may indicate value(s) of thresholds in dBm or any other unit of measurement. The wireless device may determine the TA value to be valid, for example, if the measurement of DL RS of the cell is less than the increase threshold value. The wireless device may determine the TA value to be valid, for example, if the measurement of DL RS of the cell is greater than the decrease threshold value.

Figure 21B:
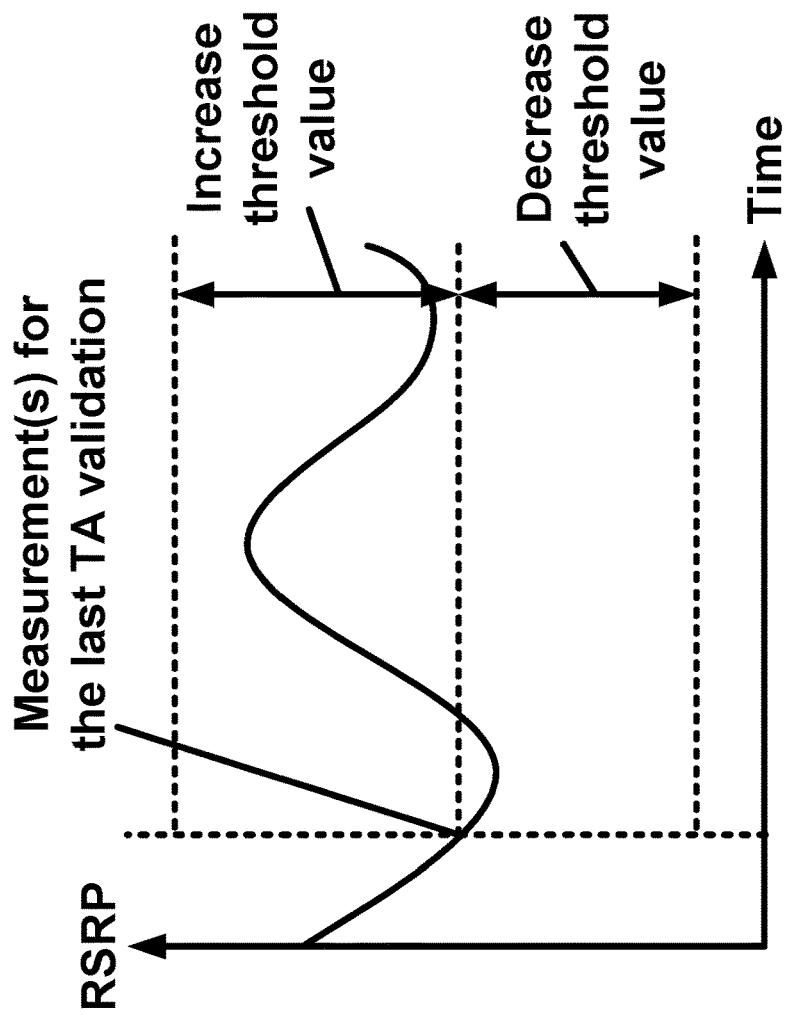
FIG. 21B shows an example of TA validation.
Figure 21A:
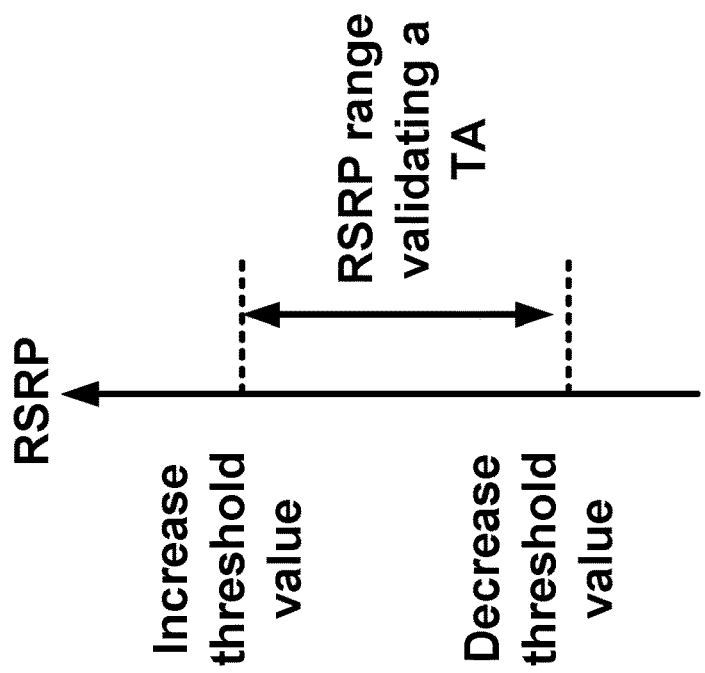
FIG. 21A shows an example of timing advance (TA) validation.

FIG. 21A is an example of TA validation. A threshold value may be used to validate an RSRP value. The wireless device may receive one or more message(s) (e.g., RRC message(s)) comprising an increase threshold value and/or a decrease threshold value. The increase threshold value and/or decrease threshold value may be absolute value(s) of threshold(s) (e.g., in dBm and/or any other unit of measurement). A TA value may be used for transmission in one or more radio resource(s) in an RRC_INACTIVE (and/or an RRC_IDLE) state, for example, if the measurement (e.g., RSRP) is in an RSRP range indicated by the increase threshold value and/or decrease threshold value. The wireless device may determine that the TA value is valid, for example, if the measurement (e.g., RSRP) is less than the increase threshold value and/or greater than the decrease threshold value.

The increase threshold value and/or the decrease threshold value may indicate value(s), for example, in dB for the TA validation. The wireless device may determine that the TA value is valid, for example, if the measurement of DL RS of the cell has not increased by more than the increase threshold value. The wireless device may determine that the TA value is valid, for example, if the measurement of DL RS of the cell has not decreased by more than the decrease threshold value. The wireless device may determine how much the measurement has changed (e.g., has not increased and/or has not decreased) based on one or more reference measurement(s). The one or more reference measurement(s) may comprise one or more measurements performed for the last (e.g., most recent) TA validation. The last TA validation may be performed by the wireless device for transmission via the one or more uplink radio resources in an RRC_INACTIVE (and/or an RRC_IDLE) state.

FIG. 21B shows an example of TA validation. TA validation may be based on a relative threshold value. The wireless device may receive one or more message(s) (e.g., RRC message(s)) comprising an increase threshold value and/or a decrease threshold value. The increase threshold value and/or decrease threshold value may be value(s) of threshold(s) relative to reference measurement(s) (e.g., in dB and/or any other unit of measurement). The wireless device may compare measurement(s) with the reference measurement(s), for example, if the wireless device determines whether a TA value, that is to be used for transmission, is valid. The wireless device may determine that the TA value is valid, for example, if the measurement of DL RS of the cell has not increased by more than the increase threshold value, and/or if the measurement of DL RS of the cell has not decreased by more than the decrease threshold value. The wireless device may determine that the TA value, to be used for the transmission via the one or more radio resource(s) in an RRC_INACTIVE (and/or an RRC_IDLE) state, is valid, for example, if the measurement of DL RS of the cell has increased by more than the increase threshold value, and/or if the measurement of DL RS of the cell has decreased by more than the decrease threshold value.

The wireless device may receive one or more messages comprising the increase threshold value and decrease threshold value. The wireless device may use the increase threshold value and/or decrease threshold value for the TA validation. The wireless device may receive one or more messages comprising one of the increase threshold value and/or decrease threshold value. The wireless device may use the one of the increase threshold value and/or decrease threshold value. The wireless device in a cell edge area may receive one or more messages comprising the increase threshold value. The wireless device (e.g., in a cell center area) may receive a message comprising the decrease threshold value. The increase threshold value and/or decrease threshold value may be absent in one or more messages. The wireless device may receive a message comprising no field value for the increase threshold value and decrease threshold value. The wireless device may determine that TA validation is not based on the measurement(s) (e.g., RSRP, RSRP, and/or RSSI). The TA validation based on change in measurement(s) (e.g., RSRP, RSRP, and/or RSSI) of the cell may not be applicable, for example, if the increase threshold value and/or decrease threshold value are not configured.

The wireless device may monitor PDCCH identified/indicated by an RNTI during a response window. The wireless device may monitor a PDCCH identified/indicated by an RNTI during a response window, for example, after or in response to transmitting data via the one or more uplink radio resources. The wireless device may receive one or more message(s) (e.g., RRC message(s)) indicating the RNTI and/or the size of the response window (e.g., example parameter name: ResponseWindowTimer). The response window may start from a reference time associated with transmitting the data via the one or more uplink radio resources. The reference time may comprise a transmission time interval (e.g., frame, subframe, slot, and/or symbol) during which the wireless device may send/transmit the data via the one or more uplink radio resources. The reference time may comprise the end of the corresponding PUSCH transmission (e.g., the transmission of the data via the one or more uplink radio resources). The reference time may be at the first PDCCH occasion from the end of the corresponding PUSCH transmission (e.g., the transmission of the data via the one or more uplink radio resources). The reference time may comprise a time offset (e.g., predefined or RRC-configured). The reference time may comprise the subframe (or slot) that may comprise the end of the corresponding PUSCH transmission, plus a time offset. The reference time may comprise the first PDCCH occasion from the end of the corresponding PUSCH transmission, plus a time offset.

The wireless device may receive a control message (e.g., DCI) via PDCCH during the time window (e.g., ResponseWindowTimer is running) The received control message (e.g., DCI) may be CRC scrambled by the RNTI that the wireless device receives for transmission via the one or more radio resource(s) in an RRC_INACTIVE state (and/or an RRC_IDLE state). The control message (e.g., DCI) may comprise an uplink grant for retransmission of the data. The wireless device may start and/or re-start the time window (e.g., ResponseWindowTimer) based on (e.g., after or in response to) receiving the uplink grant. The time window may start and/or re-start at the last slot (and/or subframe, symbol, etc.) of a PUSCH transmission corresponding to the retransmission indicated by the uplink grant. The time window may start and/or re-start at the first PDCCH occasion from the end of the PUSCH transmission corresponding to the retransmission indicated by the uplink grant. The control message (e.g., DCI) may indicate an acknowledgement (e.g., L1 ACK) for the transmission of the data via the one or more radio resource(s) in an RRC_INACTIVE state (and/or an RRC_IDLE state). The wireless device may determine to stop the time window (e.g., ResponseWindowTimer), and/or determine that the transmission of the data via the one or more radio resources(s) is successful. The control message (e.g., DCI) may comprise a downlink assignment of PDSCH comprising the MAC PDU. The wireless device may determine to stop the time window (e.g., ResponseWindowTimer), and/or determine that the transmission of the data via the one or more radio resources(s) is successful, for example, if the wireless device decodes the MAC PDU successfully. The control message (e.g., DCI) may indicate a failure of the transmission of the data (e.g., fallback). The wireless device may determine to stop the time window (e.g., ResponseWindowTimer), for example, based on (e.g., after or in response to) receiving the control message indicating the failure (e.g., fallback). The wireless device may determine the transmission of the data via the one or more radio resource(s) has failed, for example, based on (e.g., after or in response to) receiving the control message indicating the failure (e.g., fallback). The wireless device may initiate a random access procedure, for example, based on (e.g., after or in response to) receiving the control message indicating the failure (e.g., fallback). The wireless device may initiate a random access procedure, for example, based on (e.g., after or in response to) receiving the control message indicating the failure (e.g., fallback). The wireless device may determine that the time window (e.g., ResponseWindowTimer) expires. The wireless device may determine that the preconfigured uplink grant has skipped, and/or the PUR transmission has failed, based on (e.g., after or in response to) the expiry of the time window.

A wireless device and/or a base station may use HARQ operation(s) and/or process(es) for one or more retransmissions of uplink transmission in an RRC_INACTIVE state (and/or in an RRC_IDLE state). A wireless device may send/transmit data packet(s) via one or more uplink radio resources configured for an RRC_INACTIVE state (and/or an RRC_IDLE state) (e.g., such as shown/described with respect to FIG. 17). The wireless device may monitor a PDCCH based on (e.g., after or in response to) transmitting the data packet(s), for example, during a time period that an RRC state is kept as an RRC_INACTIVE state (and/or an RRC_IDLE state). The wireless device may receive, via the PDCCH, DCI that may indicate an uplink grant for a retransmission of the data packet(s). The uplink grant may indicate, as an uplink radio resource for the retransmission, one of the one or more uplink radio resources. The uplink grant may indicate, for the retransmission, the uplink radio resource that may be independent of (e.g., allocated separately from) the one or more uplink radio resources. The wireless device may receive, for example, an indication (e.g., different type of DCI) that indicates to perform an RA procedure. The wireless device may receive the indication (e.g., different type of DCI) that indicates to perform an RA procedure, for example, instead of receiving an uplink grant. The indication may indicate a failure of the transmission of the data packet(s). The wireless device may switch/transition to the RRC CONNECTED state, for example, by initiating and/or performing an RRC connection setup procedure and/or an RRC resume procedure. The wireless device may initiate (and/or perform) the RRC connection setup procedure and/or the RRC resume procedure based on an RA procedure. The wireless device may initiate the RA procedure based on receiving the indication (e.g., that indicates that the wireless device performs the RA procedure). The wireless device may initiate the RA procedure based on receiving a paging message (e.g., that indicates that the wireless device performs the RA procedure) and/or based on an uplink packet arrival. The one or more uplink radio resources configured for the RRC_INACTIVE (and/or RRC_IDLE) state may not be used during a time period that the wireless device is in the RRC CONNECTED state. The wireless device may not send/transmit (and/or may stop to send/transmit) a data packet via the one or more uplink radio resources, for example, if the RRC state is RRC_CONNECTED. The wireless device may release (e.g., clear, deactivate, suspend, and/or discard) the one or more uplink radio resources configured for the RRC_INACTIVE (and/or RRC_IDLE) state and/or uplink grant(s) indicating the one or more uplink radio resources based on (e.g., after or in response to) the RRC state being switched/transitioned to the RRC CONNECTED state. The wireless device may suspend the one or more uplink radio resources configured for the RRC_INACTIVE (and/or RRC_IDLE) state and/or uplink grant(s) indicating the one or more uplink radio resources based on (e.g., after or in response to) the RRC state being switching/transitioned to the RRC CONNECTED state.

The wireless device may send/transmit one or more message(s) (e.g., RRC message(s) such as PURConfigurationRequest) that may request one or more parameters of grant(s) (e.g., configured grants, pre-configured grant(s), etc.) indicating one or more uplink radio resources in an RRC_INACTIVE state (and/or in an RRC_IDLE state). The wireless device may initiate a procedure, for example, a wireless device-initiated procedure, to transmit the message(s). The wireless device may send/transmit the one or more message(s) based on (e.g., after or in response to) receiving a request from a base station, for example, for a base station-initiated procedure. The wireless device may send/transmit the one or more message(s) during a time period that the wireless device is in any RRC state (e.g., RRC_CONNECTED, RRC_INACTIVE, and/or RRC_IDLE). The wireless device may transmit the message(s) during a time period that the wireless device is in particular RRC state(s). The wireless device may transmit the message(s) during a time period that the wireless device is in an RRC_INACTIVE state (and/or an RRC_IDLE state). The wireless device may send/transmit the one or more message(s) during a time period that the wireless device is in an RRC_CONNECTED state. The one or more messages may indicate data traffic information. The one or more messages may indicate a number/quantity of occasions of one or more uplink radio resources in an RRC_INACTIVE state (and/or in an RRC_IDLE state), for example, an example parameter (e.g., requestedNumOccasions). The one or more messages may indicate a periodicity of one or more uplink radio resources in an RRC_INACTIVE state (and/or an RRC_IDLE state), for example, an example parameter (e.g., requestedPeriodicity). The one or more messages may indicate a TB size of data packet sent/transmitted via one or more uplink radio resources in an RRC_INACTIVE state (and/or an RRC_IDLE state), for example, an example parameter (e.g., requested TBS). The one or more messages may indicate a time offset for one or more uplink radio resources in an RRC_INACTIVE state (and/or in an RRC_IDLE state), for example, an example parameter (e.g., requestedTimeOffset). The wireless device may not receive (e.g., expect to receive) a response to the message(s) from the base station. The wireless device may receive, from the base station, one or more configuration parameters for transmission of uplink data via the one or more uplink radio resources in an RRC_INACTIVE (and/or RRC_IDLE) state.

A wireless device may be configured with an operating band of a cell for transmission in an RRC_INACTIVE (and/or RRC_IDLE) state. The operating band for the transmission may comprise a carrier bandwidth. The operating band may comprise a DL band and/or a UL band. The operating band for the transmission may comprise a BWP. The BWP may comprise a DL BWP (e.g., the DL band) and/or a UL BWP (e.g., the UL band). The wireless device may receive one or more message(s) (e.g., RRC message(s) and/or RRC release message) comprising a configuration of the operating band for transmission/reception with the RRC_INACTIVE (and/or RRC_IDLE) state in the cell. The message(s) may indicate the configuration based on the number/quantity of RB (and/or PRB) and a frequency location (e.g., a position of a center frequency). The configuration may indicate a numerology (e.g., subcarrier spacing) used in the operating band. The configuration may indicate separate numerologies (e.g., subcarrier spacings) for the DL band (e.g., DL BWP) and the UL band (e.g., UL BWP). The numerologies (e.g., subcarrier spacings) configured for the DL band (e.g., DL BWP) and the UL band (e.g., UL BWP) may be different or the same.

The one or more message(s) may indicate a location and a range of the operating band (e.g., start, size and/or center frequency and bandwidth, and the like). The location and/or the range of the operating band (e.g., start, size and/or center frequency and bandwidth, and the like) may be indicated/defined in terms of a resource unit (e.g., RB and/or PRB), for example, as a multiple of the resource unit. The location and/or the range of the operating band may be at least a part of one carrier of the cell. The one or more message(s) may indicate the location and/or the range of the operating band based on a frequency offset and a bandwidth with respect to a center frequency of the carrier bandwidth of the cell. The one or more message(s) may indicate the location and the range of the operating band based on the frequency offset and the bandwidth of the operating band with respect to the center frequency at which a synchronization signal detected by the wireless device is located (e.g., initial BWP).

The one or more message(s) may indicate numerology information (e.g., $\mu$ and/or subcarrier spacing) used in the operating band. The wireless device may determine the RE structure from the numerology information. The message(s) may comprise configuration parameters of control channel(s) (e.g., PDCCH and/or PUCCH), data channel(s) (e.g., PDSCH and/or PUSCH), and/or reference signals (e.g., SSB(s), CSI-RS(s), and/or SRS(s)). The one or more message(s) may indicate the frequency location(s) of the control channel(s), data channel(s), and/or reference signals based on frequency offset(s) with respect to a reference location in the operating band. The reference location may be a start (and/or end) point of a first RB matches a start (and/or end) point of the operating band. The one or more radio resource(s) in an RRC_INACTIVE state (and/or an RRC_IDLE state) may be allocated to the start point (e.g., using a frequency offset from the reference location) comprising a size indicated/defined in terms of a number of RBs (and/or PRBs). The wireless device may determine the location and/or size of the control channel(s), the data channel(s), and/or the reference signals based on the determined RE structure.

The one or more radio resource(s) in an RRC_INACTIVE state (and/or in an RRC_IDLE state) may be allocated in the operating band comprising one or more sub-bands (e.g., BWPs). The one or more radio resource(s) in the RRC_INACTIVE state (and/or in the RRC_IDLE state) may be allocated to a particular sub-band in the operating band. The one or more message(s) that the wireless device may receive may indicate the operating band comprising one or more sub-bands (e.g., BWPs). The one or more message(s) may indicate one or more sub-bands with/using separate locations (e.g., frequency location), sizes (e.g., bandwidth), and/or the numerology (e.g., subcarrier spacing). The RE structure for configuring the one or more sub-bands and the RE structure for configuring the operating band may be different. The DL band (e.g., DL BWP) and the UL band (e.g., UL BWP) may be configured separately. The DL band and the UL band may have different configuration information, for example, in terms of the frequency location and the numerology (e.g., subcarrier spacing). The wireless device may receive a DL control message (e.g., DCI via PDCCH) and/or DL data (e.g., transport block via PDSCH) based on the information of the operating band (and/or sub-band) configured in the DL band. The wireless device may transmit a UL control (e.g., PUCCH) and/or UL data (e.g., transport block via PUSCH) based on the information of the operating band (and/or sub-band) configured in the UL band. The one or more radio resource(s) in the RRC_INACTIVE state (and/or in the RRC_IDLE state) may be allocated per a sub-band. The frequency location and/or a size of the one or more radio resource(s) may be with respect to the sub-band.

For the transmission via the one or more radio resource(s) in an RRC_INACTIVE state (and/or in an RRC_IDLE state), a base station may send/transmit one or more message(s) (e.g., RRC message(s)) to a wireless device to configure configuration parameters. The configuration parameters may comprise one or more fields indicating at least one of following: the antenna port(s) to be used for the transmission via one or more radio resource(s) in the RRC_INACTIVE state (and/or in the RRC_IDLE state); DMRS configuration used for the transmission via the one or more radio resource(s) in the RRC_INACTIVE state (and/or in the RRC_IDLE state); a value of the configured and/or pre-configured grant timer (e.g., the configured and/or pre-configured grant timer may be in multiples of periodicity); the frequency domain resource allocation; a frequency hopping configuration (e.g., Iitra-slot frequency hopping and/or inter-slot frequency hopping—if the field is absent, frequency hopping may not be configured); frequency hopping offset, for example, used when frequency hopping is enabled; the MCS table the wireless device may use for PUSCH transmission (e.g., PUSCH transmission with and/ or without transform precoding) the transmission via the one or more radio resource(s) in the RRC_INACTIVE state (and/or in the RRC_IDLE state), for example, if the field is absent the wireless device may determine a predefined MCS (e.g., qam64, qam 256, etc.); The modulation order, code rate, and/or TB size of the transmission via the one or more radio resource(s); the number/quantity of HARQ processes configured for the transmission via the one or more radio resource(s) in the RRC_INACTIVE state (and/or in the RRC_IDLE state); uplink power control parameter(s) for the transmission via the one or more radio resource(s), for example, indicator and/or index of closed loop uplink power control, one or more reference power values (e.g., p0) and/or pathloss scaling value (e.g., Alpha); periodicity of the one or more radio resource(s), for example, a valid periodicity value may be determined (e.g., pre-defined) based on the numerology (e.g., subcarrier spacing), and/or the periodicity may be an absolute time value and/or defined in terms of TTI (symbol, slot, subframe, system frame, and/or any combination thereof); RBG size for PUSCH the transmission via the one or more radio resource(s); a redundancy version (RV) sequence (e.g., [0 2 3 1], [0 3 0 3]) for the transmission via the one or more radio resource(s); a number/quantity of repetitions of the transmission via the one or more radio resource(s); activation type indicator indicating if/whether an additional activation message (e.g., DCI, MAC CE, and/or RRC) is required to activate the one or more radio resource(s) (e.g., such as described/shown with respect to FIG. 18A and/or FIG. 18B); SRS resource indicator indicating the SRS resource to be used; time domain allocation indicating a start symbol (e.g., stat symbol number (or symbol offset) S used to determine that the Nth uplink grant) and length L (e.g., the value of the time domain allocation may be a combination of start symbol and length); PUSCH mapping type of the transmission via the one or more radio resource(s); a time domain offset defined with respect to a time reference (e.g., SFN=0 and/or timeReferenceSFN); and/or an indicator indicating whether a beta offset value is configured dynamically or semi-statically, wherein the beta offset value may be used to determine an uplink power of and/or UCI multiplexing of the PUSCH transmission via the one or more radio resource(s).

The one or more radio resource(s) may be configured with/using a particular BWP. The wireless device may receive one or more message(s) (e.g., RRC message(s)) comprising configuration parameters of the particular BWP. The particular BWP may comprise a DL BWP and/or a UL BWP. The configuration parameters may indicate a numerology (e.g., subcarrier spacing) used in the particular BWP. The configuration parameters may indicate a numerology applied to the DL BWP and/or the UL BWP. The configuration parameters may comprise separate fields and/or indicators indicating numerologies, each of which may be used in a DL BWP and/or a UL BWP. The numerologies used in DL BWP and/or UL BWP may be the same or different. The configuration parameters may indicate radio resource configuration parameters of DL and/or UL control channel (e.g., PDCCH and/or PUCCH) used for transmission via the one or more radio resource(s). The configuration parameters may comprise radio resource configuration parameters of a DL and/or a UL data channel (e.g., PDSCH and/or PUSCH) used for transmission via the one or more radio resource(s). The DL control and/or data channels (e.g., PDCCH and/or PDSCH) may be configured within the DL BWP. The UL control and/or data channels (e.g., PUCCH and/or PUSCH) may be configured within the UL BWP.

The particular BWP may comprise an initial BWP. The DL BWP of the particular BWP may comprise an initial DL BWP. The UL BWP of the particular BWP may comprise an initial UL BWP. The particular BWP may be configured separately from the initial BWP. The DL BWP of the particular BWP may be different form the initial DL BWP. The UL BWP of the particular BWP may be different from initial UL BWP. The one or more radio resource(s) may be associated with a DL BWP and/or a UL BWP. PDCCH (e.g., ACK, NACK, and/or fallback response(s) to the transmission via the one or more radio resource(s)) and/or PDSCH (e.g., RRC response to the RRC message transmitted via the one or more radio resource(s)) related to the transmission via the one or more radio resource(s) may be configured with the DL BWP. PUCCH (e.g., ACK and/or NACK response to the PDSCH) and/or PUSCH (e.g., data via the one or more radio resource(s)) related to the transmission via the one or more radio resource(s) may be configured with the UL BWP. The wireless device may determine that the particular BWP (e.g., DL BWP and/or UL BWP) comprises the initial BWP and/or is the initial BWP (e.g., initial DL BWP and/or initial UL BWP, respectively). The wireless device may determine that the particular BWP (e.g., DL BWP and/or UL BWP) comprises the initial BWP and/or is the initial BWP (e.g., initial DL BWP and/or initial UL BWP, respectively), for example, if field(s) indicating the configuration (e.g., frequency location, bandwidth, and/or numerology (e.g., subcarrier spacing)) of the particular BWP (e.g., that is different from the initial BWP) are absent in the configuration parameters indicating the one or more radio resource(s).

The particular BWP may be a last BWP (e.g., most recent BWP) that the wireless device used in an RRC_CONNECTED state. The DL BWP of the particular BWP may be a last DL BWP (e.g., most recent DL BWP) that the wireless device used in an RRC_CONNECTED state. The UL BWP of the particular BWP may be a last UL BWP (e.g., most recent UL BWP) that the wireless device used in an RRC_CONNECTED state. The wireless device may switch/transition to an RRC_INACTIVE state (and/or to an RRC_IDLE state) from an RRC_CONNECTED state. The BWP (e.g., the last DL BWP and/or the last UL BWP) that the wireless device uses in an RRC_CONNECTED state may be used in the switched/transitioned RRC_INACTIVE state (and/or the RRC_IDLE state). The wireless device may determine that the particular BWP (e.g., DL BWP and/or UL BWP) is the BWP (e.g., the last DL BWP and/or the last UL BWP, respectively), for example, if field(s) indicating the configuration (e.g., frequency location, bandwidth, and/or numerology (e.g., subcarrier spacing)) of the particular BWP (e.g., that may be different from the last BWP) are absent in the configuration parameters indicating the one or more radio resource(s).

The particular BWP may be configured separately from the initial BWP. The DL BWP of the particular BWP may be different form the initial DL BWP. The UL BWP of the particular BWP may be different from initial UL BWP. The one or more radio resource(s) may be associated with a DL BWP and/or a UL BWP. A PDCCH (e.g., ACK, NACK, and/or fallback response(s) to the transmission via the one or more radio resource(s)) and/or a PDSCH (e.g., RRC response to the RRC message transmitted via the one or more radio resource(s)) related to the transmission via the one or more radio resource(s) may be configured with the DL BWP. A PUCCH (e.g., ACK and/or NACK response to the PDSCH) and/or a PUSCH (e.g., data via the one or more radio resource(s)) related to the transmission via the one or more radio resource(s) may be configured with the UL BWP.

Figure 22:
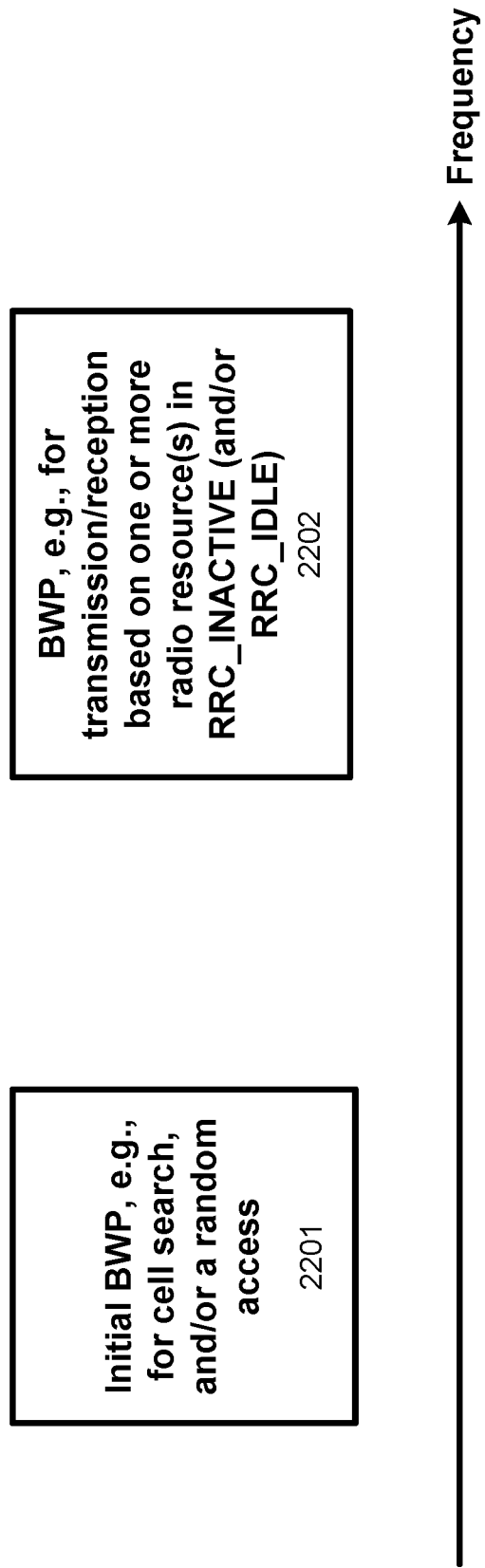
FIG. 22 shows an example of one or more radio resource(s) in one or more bandwidth parts (BWPs).

FIG. 22 shows an example of one or more radio resource(s) in one or more BWPs. The one or more BWPs may comprise one or more DL BWPs and/or one or more UL BWPs (e.g., a DL BWP and/or a UL BWP). The wireless device may receive one or more message(s) (e.g., broadcast message(s) and/or wireless device specific RRC message) comprising configuration parameters of an initial BWP 2201 (e.g., initial DL BWP and/or initial UL BWP). The initial BWP 2201 may be used/indicated/configured for a cell search and/or an initial/random access. The wireless device may receive SSB(s) (e.g., cell-defining SSB) via the initial DL BWP. The wireless device may perform a random access procedure via the initial BWP. The wireless device may transmit Msg1, Msg3 and/or Msg A via the initial UL BWP. The wireless device may receive Msg2, Msg4 and/or Msg B via the initial DL BWP. The one or more radio resource(s) configured for transmission in an RRC_INACTIVE state (and/or in an RRC_IDLE state) may be configured in a BWP different from the initial BWP. The BWP may be a last BWP 2202 (e.g., most recent BWP) that the wireless device may have used in the RRC_CONNECTED state (e.g., before switching/transitioning to an RRC_INACTIVE state and/or in an RRC_IDLE state). The BWP (e.g., 2202) may be for transmission and/or reception for the wireless device in the RRC_INACTIVE state (and/or the RRC_IDLE state). The BWP (e.g., 2002) may comprise a BWP for a particular use and/or of a particular type (e.g., type of data, application, size, etc.). The BWP (e.g., 2002) may comprise an SDT BWP (e.g., a BWP for SDT). The BWP (e.g., 2002) may comprise the initial BWP 2201 and/or one or more other BWPs. The BWP (e.g., 2002) may comprise a subset of the initial BWP 2201, such as a BWP for a smaller portion of resources (e.g., SDT resources) relative to the resources of the initial BWP 2201. The one or more radio resource(s) for the transmission may be configured in the UL BWP of the BWP. The PDCCH and/or PDSCH may be configured in the DL BWP of the BWP. The wireless device may deactivate the BWP, for example, if an RRC state of the wireless device changes (e.g., to RRC_CONNECTED). The one or more radio resource(s) and/or PUCCH associated with the transmission in the RRC_INACTIVE (and/or RRC_IDLE) may be configured in an initial UL BWP. The PDCCH and/or PDSCH associated with the transmission in the RRC_INACTIVE (and/or RRC_IDLE) may be configured in an initial DL BWP. The one or more message(s) may indicate whether the BWP is configured separately from the initial BWP.

A wireless device may perform (e.g., with a base station) a downlink and/or uplink beam management in an RRC_INACTIVE state (and/or in an RRC_IDLE state). The downlink and/or uplink beam management may comprise a downlink and/or uplink beam measurement procedure, configuration and/or re-configuration of one or more beams, a beam activation of the one or more beams, and/or a beam selection among the one or more beams.

An indicator of a reference signal in the downlink and/or uplink beam management may indicate a beam (e.g., TX beam and/or RX beam of the wireless device) to use in an RRC_INACTIVE state (and/or in an RRC_IDLE state). A wireless device may receive one or more message(s) (e.g., RRC message(s)) comprising configuration parameters of one or more radio resource(s) in the RRC_INACTIVE state (and/or in the RRC_IDLE state). The configuration parameters may indicate one or more reference signals. The one or more reference signals may comprise an SSB indicated/identified by an SSB index/identifier, a CSI-RS indicated/identified by a CSI-RS index/identifier (and/or CSI-RS resource index/identifier). The one or more reference signals may comprise an SRS identified by an SRS index/identifier (e.g., SRS resource index/identifier, SRS resource set index/identifier, and/or a combination thereof). The reference signal may represent/indicate a particular beam. The SSB may represent/indicate a wide beam. The CSI-RS may represent/indicate a narrow beam. The SRS may represent/indicate a TX beam of the wireless device.

The configuration parameters in the one or more message(s) may comprise indicator(s) indicating which reference signal(s) are associated with which transmission (e.g., PUSCH, PUCCH, and/or SRS) and/or reception (e.g., PDCCH and/or PDSCH). The configuration parameters may comprise indicator(s) indicating which reference signal(s) are associated with data (e.g., PDSCH) and/or control signal (e.g., PDCCH) reception in RRC_INACTIVE (and/or RRC_IDLE). The data and/or the control signal may be associated with the transmission via the one or more radio resource(s) in an RRC_INACTIVE state (and/or in an RRC_IDLE state). The reception may be for receiving a response (e.g., RRC response via PDSCH and/or L1 ACK/NACK/fallback via PDCCH) to the transmission. The indicator(s) may comprise/indicate parameter(s) for configuring a QCL relationship between one or more DL reference signals (e.g., SSBs and/or CSI-RSs) and the DM-RS ports of the PDSCH, the DM-RS port of PDCCH, and/or the CSI-RS port(s) of a CSI-RS resource. The parameter(s) may comprise one or more TCI states. The one or more TCI states (e.g., each of the one or more TCI states) may comprise at least one of following: one or more DL RS(s) (e.g., SSB(s), CSI-RS(s), any combination thereof), cell index/identifier, BWP index/identifier, and/or QCL relationship type (e.g., the one or more large-scale properties). The indicator(s) may be a TCI state of a particular channel configuration (e.g., PDSCH, PDCCH (e.g., CORESET)). The PDSCH and/or PDCCH (e.g., CORESET) configuration may comprise at least one of the one or more TCI states. A TCI state of PDSCH may indicate a QCL relationship between one or more DL reference signals (e.g., SSBs and/or CSI-RSs) and the DM-RS ports of the PDSCH. The wireless device may determine RX beam(s) used to receive data via the PDSCH based on the TCI state (e.g., QCL relationship of the TCI state). A TCI state of PDCCH may indicate a QCL relationship between one or more DL reference signals (e.g., SSBs and/or CSI-RSs) and the DM-RS ports of the PDCCH. The wireless device may determine RX beam(s) used to receive control signal(s) via the PDCCH based on the TCI state (e.g., QCL relationship of the TCI state).

A wireless device may receive one or more message(s) that configured, re-configures, updates, and/or activates the TCI state(s) of a PDSCH and/or a PDCCH (e.g., CORESET). A first control message (e.g., an RRC message) that the wireless device may receive may indicate at least one TCI state to be used for the PDSCH and/or the PDCCH (e.g., CORESET). A first control message (e.g., an RRC message) that the wireless device may receive may indicate one or more TCI states. A second control message (e.g., another RRC message, a DCI and/or MAC CE) that the wireless device may receive may indicate at least one of the one or more TCI states to be used for the PDSCH and/or PDCCH (e.g., CORESET). A first control message (e.g., an RRC message) that the wireless device may receive may indicate one or more TCI states. A second control message (e.g., an RRC message, MAC CE, and/or DCI) that the wireless device may receive may indicate (and/or activate) at least first one of the one or more TCI states. A third control message (e.g., an RRC message, MAC CE, and/or DCI) that the wireless device may receive may indicate at least second one of the at least first one of the one or more TCI states to be used for the PDSCH and/or PDCCH (e.g., CORESET).

The wireless device may receive the configuration parameters comprising indicator(s) indicating which reference signal(s) are associated with the data (e.g., PUSCH) and/or control signal (e.g., PUCCH) transmission associated with the transmission via the one or more radio resource(s). The indicator(s) may comprise a spatial relation information. The spatial relation information may be for transmission(s) via a PUSCH, a PUCCH, and/or a SRS. The wireless device may determine (e.g., identify/indicate) a particular spatial relation information based an index and/or identifier of the particular spatial relation information. The spatial relation information may indicate at least one of following: cell index/identifier, one or more DL RSs (e.g., SSB(s), CSI-RS(s), and/or any combination thereof), SRS resource index/identifier, BWP index/identifier, pathloss reference RS index/identifier, and/or power control parameter(s). The wireless device may determine antenna ports and/or precoder used for transmission(s) via a PUSCH and/or a PUCCH based on the spatial relation information.

The indicator(s) may comprise the spatial relation information of a particular channel configuration (e.g., srs-spatial-relation-information for PUSCH and/or pucch-spatial-relation-information of PUCCH). The PUSCH configuration may comprise at least one spatial relation information. The PUCCH configuration may comprise at least one spatial relation information. The spatial relation information of the PUSCH may be different from the one of the PUCCH. The spatial relation information of the PUSCH may be the same as the one of the PUCCH. The spatial relation information(s) of the PUSCH and PUCCH may be configured separately and/or independently. There may be one or more spatial relation information(s) applied to (and/or used for) the PUSCH and the PUCCH.

The wireless device may determine antenna ports and/or precoder used for the PUSCH based on the spatial relation information of the PUSCH. The wireless device may receive one or more message(s) comprising configuration parameters of transmission via one or more radio resource(s) in an RRC_INACTIVE state (and/or in an RRC_IDLE state). The configuration parameters (e.g., SRS resource indicator) may indicate an SRS resource of an SRS resource set. The SRS resource may comprise spatial relation information. The wireless device may determine, for the transmission via the one or more radio resource(s), to use the same antenna port(s) as the SRS port(s) of the SRS resource. The wireless device may send/transmit, based on the determination, data via the one or more radio resource(s) using the same antenna port(s).

The wireless device may determine one or more antenna ports and/or precoders used for the PUCCH based on the spatial relation information of the PUCCH. The wireless device may receive one or more message(s) comprising configuration parameters of PUCCH in an RRC_INACTIVE state (and/or in an RRC_IDLE state). The wireless device may send/transmit uplink control signal(s) via the PUCCH for HARQ feedback (e.g., ACK or NACK) to a PDSCH in an RRC_INACTIVE state (and/or in an RRC_IDLE state), for SR transmission(s), and/or measurement report(s). The configuration parameters (e.g., PUCCH spatial relation information) may indicate the spatial setting (e.g., precoder and/or spatial domain filter) for PUCCH transmission and/or the parameters for PUCCH power control. The wireless device may determine, for the PUCCH transmission in the RRC_INACTIVE state (and/or in the RRC_IDLE state), a spatial domain filter used for a reception of a DL RS indicated by the spatial relation information. The wireless device may send/transmit the PUCCH using a same spatial domain filter as for a reception of the SSB for a cell, for example, if the spatial relation information for the PUCCH comprises an SSB index/identifier of an SSB. The wireless device may send/transmit the PUCCH using a same spatial domain filter as for a reception of the CSI-RS for a cell, for example, if the spatial relation information for the PUCCH comprises a CSI-RS index/identifier (e.g., NZP-CSI-RS resource index/identifier) of a CSI-RS. The wireless device may send/transmit the PUCCH using a same spatial domain filter as for a transmission of the SRS for a cell and/or UL BWP, for example, if the spatial relation information for the PUCCH comprises an SRS index/identifier of an SRS (e.g., SRS resource).

A wireless device may receive one or more message(s) that may configure, re-configure, update, and/or activate the spatial relation information of a PUSCH, a PUCCH, and/or a SRS. A first control message (e.g., an RRC message) that the wireless device may receive may indicate at least one spatial relation information to be used for the PUSCH, PUCCH, and/or SRS. A first control message (e.g., an RRC message) that the wireless device may receive may indicate one or more spatial relation information(s). A second control message (e.g., another RRC message, a DCI and/or MAC CE) that the wireless device may receive may indicate at least one of the one or more spatial relation information(s) to be used for the PUSCH, PUCCH, and/or SRS. A first control message (e.g., an RRC message) that the wireless device may receive may indicate one or more spatial relation information(s). A second control message (e.g., an RRC message, MAC CE, and/or DCI) that the wireless device may receive may indicate (and/or activate) at least first one of the one or more spatial relation information(s). A third control message (e.g., an RRC message, MAC CE, and/or DCI) that the wireless device may receive may indicate at least second one of the at least first one of the one or more spatial relation information(s) to be used for the PUSCH, PUCCH, and/or SRS.

Figure 23:
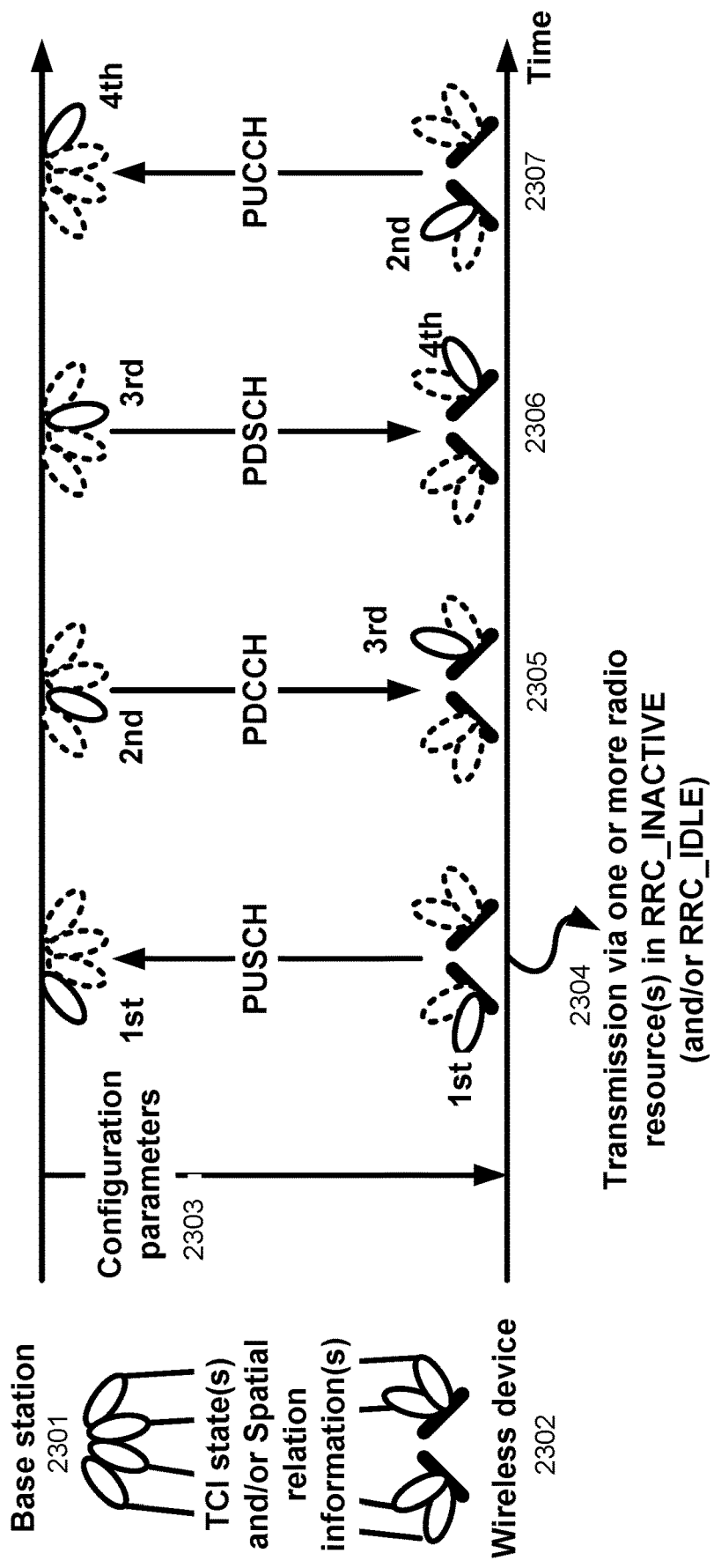
FIG. 23 shows an example of beam management.

FIG. 23 shows an example of beam management. The beam management may comprise beam management for transmission and/or reception in an RRC_INACTIVE state (and/or in an RRC_IDLE state). A wireless device 2302 may receive, from a base station 2301, one or more message(s) 2303 comprising one or more configuration parameters of transmission/reception in an RRC_INACTIVE state (and/or in an RRC_IDLE state). The one or more configuration parameters may indicate configurations of radio resources of a PUSCH, a PDCCH, a PDSCH, and/or a PUCCH used in an RRC_INACTIVE state (and/or in an RRC_IDLE state). The one or more configuration parameters may indicate one or more radio resource(s) for uplink transmission (e.g., via PUSCH) in RRC_INACTIVE (and/or RRC_IDLE). The configuration parameters may indicate which beam(s) (e.g., reference signal(s)) are used to send/transmit (e.g., via a PUSCH and/or a PUCCH) or receive (e.g., via a PDSCH and/or a PDCCH). At 2304, the wireless device 2302 may send/transmit, using a 1st beam, data via one or more radio resource(s) in an RRC_INACTIVE state (and/or in an RRC_IDLE state). The wireless device 2302 may start to monitor a PDCCH (e.g., after 2304) using a 3rd beam. At 2305, the wireless device 2302 may receive, via the PDCCH, DCI that comprise downlink assignment of PDSCH. At 2306, the wireless device 2302 may receive the PDSCH using the 4th beam. At 2307, the wireless device may send/transmit, via a PUCCH, a HARQ feedback (e.g., ACK or NACK) using the 2nd beam. The base station 2301 may receive and/or transmit data using different beams and/or a same beam, for example, the 1st beam for PUSCH reception, the 2nd beam for PDCCH transmission, the 3rd beam for PDSCH transmission, and/or the 4th beam for PUCCH reception. The wireless device 2302 may receive one or more second message(s) (e.g., RRC message, MAC CE, DCI, and/or a combination thereof) that may reconfigure, change, activate/deactivate, and/or update the beam configuration of the PUSCH, PDCCH, PDSCH, and/or PUCCH.

A wireless device may perform one or more procedures in an RRC_INACTIVE state (and/or in an RRC_IDLE state). The wireless device may perform a system information (SI) acquisition procedure, cell selection and/or re-selection procedure, paging message reception, and/or data transmission via one or more radio resource(s) in the RRC_INACTIVE (and/or RRC_IDLE). A wireless device may receive AS, NAS, and/or positioning assistance data information via an SI acquisition procedure. The wireless device (e.g., in RRC_IDLE and/or RRC_INACTIVE) may determine, based on the SI acquisition procedure, whether a valid version of (at least) the MIB and/or one or more SIB (e.g., SIB1 through SIB4, SIB5, and/or SIB11). The wireless device may initiate (and/or perform) the SI acquisition procedure based upon a cell selection (e.g., upon power-on), cell-reselection, return from out of coverage, after reconfiguration with sync completion, after entering the network from another RAT, after/upon receiving an indication (e.g., an indication in Short Message received in a paging occasion) that the system information has changed, after/upon receiving a PWS (Public Warning System) notification, after/upon receiving a positioning request from upper layers, and/or if the wireless device does not have a valid version of a stored SIB(s).

By performing the one or more procedures, the wireless device may receive cell configuration parameters (e.g., in MIB and/or SIB(s)) of a cell. The cell configuration parameters may indicate the one or more radio resource(s), for transmission in an RRC_INACTIVE state (and/or in an RRC_IDLE state), that are configured for the wireless device. The wireless device may receive an MIB and/or SIB(s) (e.g., SIB1 and/or any SIB broadcast/multicast/unicast), for example, in the SI acquisition procedure. The MIB and/or SIB(s) may indicate cell configuration parameters (e.g., numerology, UL/DL BWP configuration, transmitted SSB(s)), and/or random access configuration parameters) of the cell. Value(s) of the cell configuration parameters may be the same as the value(s) that the wireless device may have received in a reference time. The reference time may be a time that the wireless device may receive parameter(s) (e.g., UL grant, periodicity, power control parameters, indicator(s) of beam(s), the like) associated with the one or more radio resource(s) for the transmission in RRC_INACTIVE (and/or RRC_IDLE). The reference time may be a time that the wireless device switches/transitions an RRC state to RRC_INACTIVE (and/or RRC IDLE) from RRC_CONNECTED, and/or a time that the wireless device may receive an RRC release message. The reference time may be a time that the wireless device sends/transmits data via the one or more radio resource(s). The reference time may be a time that the wireless device performs a last SI acquisition procedure. One or more values of the cell configuration parameters of the cell may be different from the values that the wireless device received in the reference time.

Figure 24:
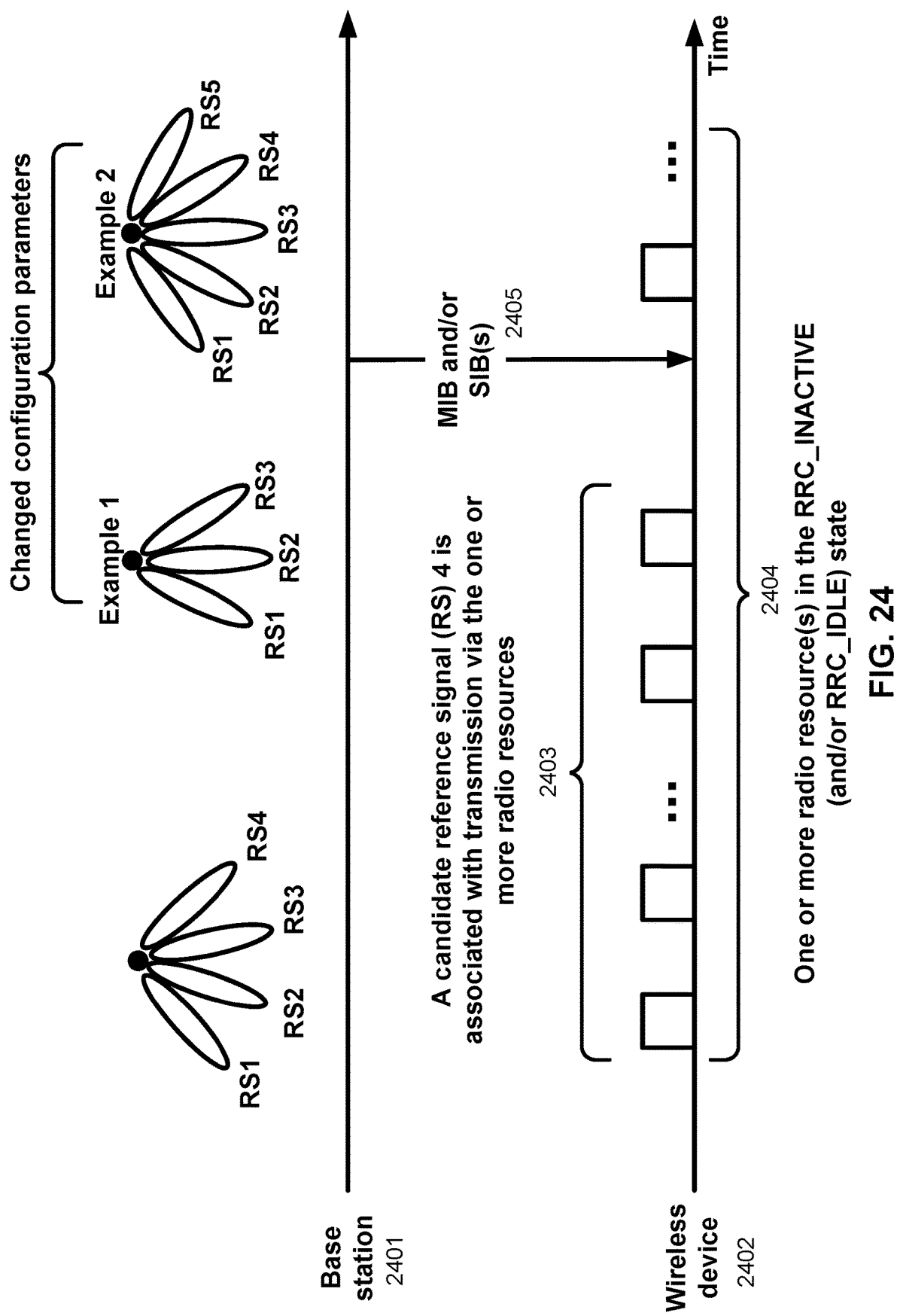
FIG. 24 shows an example of a change in one or more cell configuration parameter(s).

FIG. 24 shows an example of change in one or more cell configuration parameter(s). The change in cell configuration parameter(s) for me for a cell and/or a wireless device in an RRC_INACTIVE state (and/or in an RRC_IDLE state). A wireless device 2402 may receive, from a base station 2401, one or more configuration parameters of one or more radio resources in an RRC_INACTIVE state (and/or in an RRC_IDLE state). The configuration parameters may comprise indicator(s) (e.g., TCI states and/or spatial relation information(s)) indicating which a RS (e.g. SSB, CSI-RS, and/or SRS) is used to transmit and/or receive data (and/or control signal(s)) in an RRC_INACTIVE state (and/or in an RRC_IDLE state). The indicator(s) may indicate that the wireless device 2404, based on an RS (e.g., an RS4), sends/transmits data via the one or more radio resources (e.g., 2404). The RS (e.g., RS4) may be an SSB and/or a CSI-RS. The wireless device 2402 may determine that the base station 2401 may send/transmit 4 RSs and/or any other quantity of RSs (e.g., RS1, RS2, RS3, and RS4), for example, if the wireless device receives the configuration parameters. The RSs (e.g., 4 RSs) may comprise candidates RSs (e.g., 2403) that the base station 2401 may send/transmit. The wireless device 2402 may determine the number/quantity of candidate RSs at least based on a numerology (e.g., subcarrier spacing). The number/quantity of candidate RSs may be predefined per numerology (e.g., subcarrier spacing). During a time period that the wireless device is in an RRC_INACTIVE state (and/or in an RRC_IDLE state), the wireless device 2402 may receive MIB and/or SIB(s) (e.g., at 2405). The wireless device 2402 may receive the MIB and/or the SIB(s) via an SI acquisition procedure. The MIB and/or the SIB(s) may indicate parameters associated with the configuration parameters of one or more radio resources. The MIB and/or the SIB(s) may indicate that a number/quantity of RSs (e.g., candidate RSs) that the base station 2401 may send/transmit is/has changed (e.g., from 4 to 3 in Example 1 of FIG. 24, from 4 to 5 in Example 2 of FIG. 24, or from any first quantity to any second quantity). The MIB and/or the SIB(s) may comprise one or more parameter(s) (e.g., ssb-PositionInBurst) indicating time domain position(s) of the transmitted RSs (e.g., SSBs) in a time interval (e.g., in a half frame). A number/quantity of transmitted RSs (e.g., SSBs) indicated by the parameter(s) may be equal to or less than a number/quantity of the candidate RSs that the base station 2401 may send/ transmit. The wireless device 2402 may determine, based on the one or more parameter(s), that the RS (e.g., RS4) is not sent/transmitted. The MIB and/or the SIB(s) may indicate that a periodicity of SSB burst (e.g. time interval between a first burst transmission of RS1, RS2, RS3, and RS4 and a second burst transmission of RS1, RS2, RS3, and RS4) transmission is/has changed.

A wireless device may receive one or more configuration parameters of one or more radio resources in an RRC_INACTIVE state (and/or in an RRC_IDLE state). The one or more configuration parameters may comprise one or more indicator(s) indicating a first numerology (e.g., a first subcarrier spacing of a UL BWP) used for the wireless device to determine uplink radio resources (e.g., PUSCH and/or PUCCH) for the transmission in an RRC_INACTIVE state (and/or in an RRC_IDLE state). The one or more configuration parameters may comprise one or more indicator(s) indicating a second numerology (e.g., a second subcarrier spacing of a DL BWP) used for the wireless device to determine downlink radio resources (e.g., PDSCH and/or PDCCH) for the reception in an RRC_INACTIVE state (and/or in an RRC_IDLE state). A single numerology indicated by the configuration parameters may be used to determine the uplink radio resources and/or the downlink radio resources. The wireless device may receive the indicator(s) indicating the first numerology and the second numerology, for example, if the wireless device receives the configuration parameters, if the wireless device switches/transitions an RRC state to RRC_INACTIVE (and/or to RRC IDLE) from RRC_CONNECTED, and/or if the wireless device receives an RRC release message. The wireless device may determine one or more configurations (e.g., a resource grid and/or a size of RE such as described/shown with respect to FIG. 8) of a PUSCH, a PUCCH, a PDSCH, and/or a PDCCH based on the first numerology and/or the second numerology. The wireless device may determine that the first numerology (e.g., a first subcarrier spacing) and/or the second numerology (e.g., a second subcarrier spacing) may be changed, for example, during a time period that the wireless device is in an RRC_INACTIVE state (and/or in an RRC_IDLE state). An MIB and/or a SIB(s) that the wireless device may receive, for example, via an SI acquisition procedure, may indicate one or more parameters associated with the one or more configuration parameters of the one or more radio resources. The MIB and/or the SIB(s) may indicate that the first numerology (e.g., a first subcarrier spacing) and/or the second numerology (e.g., a second subcarrier spacing) are different from the numerology/numerologies(s) that the wireless device determined at a time that the wireless device receives the one or more configuration parameters.

The one or more configuration parameters may indicate a first configuration (e.g., bandwidth and/or frequency location, frequency offset) of a UL operating band (e.g., a UL BWP). The first configuration of the UL operating band may be used by the wireless device to determine uplink radio resources (e.g., PUSCH resources and/or PUCCH resources) for transmission in an RRC_INACTIVE state (and/or in an RRC_IDLE state). The one or more configuration parameters may indicate a second configuration (e.g., bandwidth and/or frequency location, frequency offset) of a DL operating band (e.g., a DL BWP). The second configuration of the DL operating band may be used by the wireless device to determine downlink radio resources (e.g., PDSCH resources and/or PDCCH resources) for the reception in an RRC_INACTIVE state (and/or in an RRC_IDLE state). The wireless device may receive the one or more configuration parameters, for example, if the wireless device switches/transitions an RRC state to RRC_INACTIVE (and/or to RRC IDLE) from RRC_CONNECTED, and/or if the wireless device receives an RRC release message. The wireless device may determine configurations of a PUSCH, a PUCCH, a PDSCH, and/or a PDCCH, for example, based on the first configuration and/or the second configuration. The wireless device may determine that the first configuration and/or the second configuration may be changed, for example, during a time period that the wireless device is in an RRC_INACTIVE state (and/or in an RRC_IDLE state). an MIB and/or an SIB(s) that the wireless device receives, for example, via an SI acquisition procedure, may indicate that the first configuration and/or the second configuration are different from the one(s) that the wireless device determined when the wireless device receives parameters of uplink radio resources and/or downlink radio resources in RRC_INACTIVE (and/or RRC_IDLE).

Figure 25:
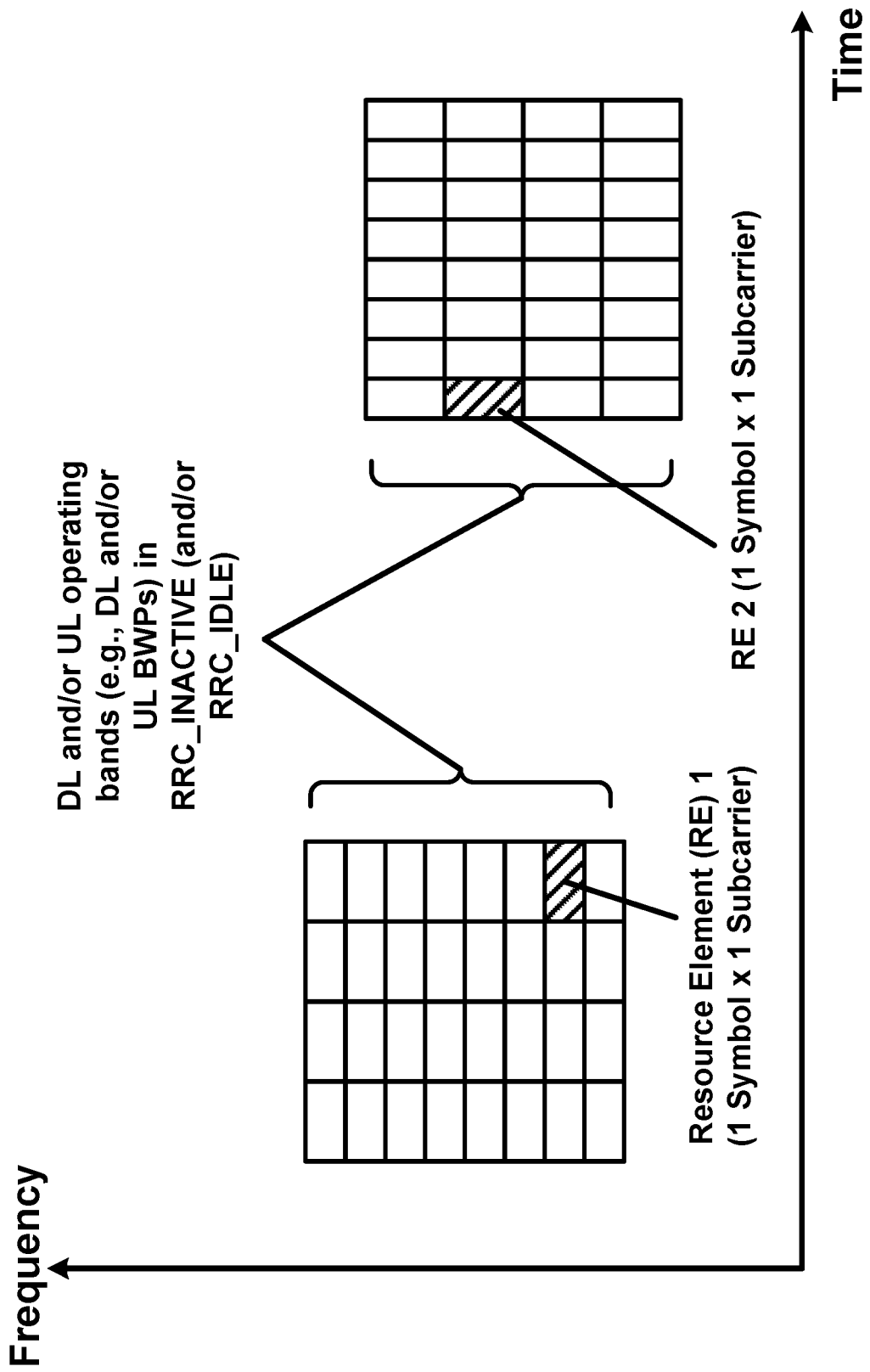
FIG. 25 is an example of a change in one or more cell configuration parameter(s).

FIG. 25 shows an example of change in one or more cell configuration parameter(s). The change in one or more cell configuration parameters may comprise a change of a cell in an RRC_INACTIVE state (and/or an RRC_IDLE state). One or both of the two resource grids shown in FIG. 25 (e.g., a first resource grid comprising RE1 and a second resource grid comprising RE2) may correspond to a resource grid described/shown with respect to FIG. 8. The operating band in FIG. 25 may comprise a UL operating band (e.g., UL BWP) and/or DL operating band (e.g., DL BWP). A wireless device may receive first cell configuration parameters. The first cell configuration parameters may comprise first parameters indicating parameter value(s) of cell configuration parameter(s) (e.g., a numerology, a subcarrier spacing, a bandwidth, a frequency location, a frequency offset, and/or the like) of the operating band. The wireless device may determine, based on the first configuration (e.g., the parameter value(s)), one or more UL and/or DL radio resources used for transmission and/or reception in RRC_INACTIVE (and/or RRC_IDLE). RE1 in FIG. 25 may comprise a resource element that may be determined based on the first configuration. The wireless device may determine, based on the numerology (e.g., the subcarrier spacing), a size (e.g., a time duration of a symbol and subcarrier spacing) of RE1. The wireless device may determine, based on the frequency location and/or the frequency offset of the operating band, a location of RE1 in the frequency and/or time domains. The wireless device may determine that at least one of the parameter value(s) of the first configuration is changed, during a time period that the wireless device is in an RRC_INACTIVE state (and/or in an RRC_IDLE state). The at least one of the parameter value(s) may comprise a value of the numerology, the subcarrier spacing, the bandwidth, the frequency location, and/or the frequency offset of the operating band. The wireless device may determine a size of an RE (e.g., RE2 in FIG. 25) in the operating band based on the at least one of the parameter value(s). The at least one of the parameter value(s) may change the time duration of the symbol of the operating band, the subcarrier spacing of the operating band, a bandwidth of the operating band, and/or a frequency location of the operating band.

Broadcast/multicast (e.g., MIB and/or SIB(s)) and/or unicast (e.g., wireless-device specific) message(s) may indicate the change of the cell configuration parameter(s) of a cell. Unicast (e.g., wireless-device specific) message(s) may indicate the (re-)configuration of radio resource configuration parameter(s) configured to a wireless device. The unicast (e.g., wireless-device specific) message(s) may indicate updated value(s) of the radio resource configuration parameter(s) configured to the wireless device.

A base station may determine to change/update at least one cell configuration parameter (e.g., numerology, UL/DL BWP configuration, and/or beam configuration such as a number of candidate and/or transmitted SSB(s)), of the cell, that is associated with the radio resource configuration parameter(s). The base station may send/transmit, to a wireless device, at least one unicast (e.g., wireless-device specific) message that may configure and/or reconfigure the radio resource configuration parameter(s), for example, based on (e.g., after or in response to) the determination to change the at least one cell configuration parameter. The at least one unicast (e.g., wireless-device specific) message may indicate one or more value(s) of the radio resource configuration parameter(s) that are updated based on the at least one cell configuration parameter. The wireless device may receive, from the base station, the at least one unicast (e.g., wireless-device specific) message that indicate the updated value(s) of the radio resource configuration parameter(s). The wireless device may configure and/or re-configure the radio resource configuration parameter(s) with the updated value(s), for example, based on (e.g., after or in response to) receiving the at least one unicast message. The at least one unicast message may indicate the change of the at least one cell configuration parameter. The wireless device may receive separate message(s) (e.g., broadcast, multicast, and/or unicast message(s)) that may indicate the change of the at least one cell configuration parameter. The wireless device may configure and/or re-configure (e.g., update) the at least one cell configuration parameter with updated value(s) indicated by the at least one unicast message and/or the separate message(s).

A wireless device may receive, from a base station, broadcast (e.g., MIB and/or SIB(s)) and/or multicast (e.g., paging message) message(s), for example, in a non-active RRC state (e.g., RRC_INACTIVE and/or RRC_IDLE). The wireless device may not receive, from the base station, an unicast message (e.g., wireless-device specific message), for example, that may configure and/or re-configure the configuration parameter(s) of one or more resources for transmission and/or reception in the non-active RRC state (e.g., RRC_INACTIVE and/or RRC_IDLE). The wireless device may not receive, from the base station, the unicast message (e.g., wireless-device specific message), for example, before performing the transmission via the one or more resources in the non-active RRC state (e.g., RRC_INACTIVE and/or RRC_IDLE).

Changed cell configuration parameter(s) of a cell associated with configuration parameter(s) of one or more resources that are used for transmission and/or reception in a non-active RRC state (e.g., RRC_INACTIVE and/or RRC_IDLE) may cause one or more problems for at least some communications. A wireless device may determine, based on broadcast and/or multicast message(s), that the cell configuration parameter(s) are changed. The broadcast and/or multicast message(s) may be sent/transmitted to a plurality of wireless devices (e.g., that may comprise the wireless device). The broadcast and/or multicast message(s) may not indicate updated parameter values of a particular wireless device (e.g., the configuration parameter(s) of one or more resources for the wireless device). This lack of updated parameter values may be at least in part due to a base station (e.g., network) reconfiguring the configuration parameter(s) in an RRC_CONNECTED state. In non-active RRC states, the base station may update location change information of the wireless device (e.g., tracking area update, CN tracking are, and/or RAN-based notification update). The base station may send/transmit a paging message to the wireless device, for example, if the base station determines to reconfigure the configuration parameter(s). The wireless device may initiate a random access procedure based on (e.g., after or in response to) receiving the paging message from the base station.

The wireless device may receive first message(s) in RRC_INACTIVE (and/or RRC_IDLE). The wireless device may determine that the cell configuration parameter(s) of the cell are changed based on parameter value(s) in the first message(s) (e.g., such as described with respect to FIG. 24 and FIG. 25). The first message(s) may be broadcast and/or multicast message(s) (e.g., MIB, and/or SIB(s)). The changed cell configuration parameters may cause an ambiguity of time/frequency/spatial resource allocation of one or more resources used for transmission and/or reception in a non-active RRC state. The wireless device may determine whether time/frequency/spatial resource allocation of the one or more resources used for transmission and/or reception in a non-active RRC state is based on the changed cell configuration parameter(s) or cell configuration parameter(s) configured before receiving the first message(s). The wireless device determines, for example, without receiving second message(s) that may configure and/or re-configure the time/frequency/spatial resource allocation of the one or more resources, whether the time/frequency/spatial resource allocation is based on the changed cell configuration parameter(s) or cell configuration parameter(s) configured before receiving the first message(s). For example, in FIG. 24, the missing RS4 in Example 1 may cause an ambiguity as to which RS the wireless device is to perform the transmission via the one or more radio resources. An additional RS (e.g., RS5) in Example 2 may cause an ambiguity as to whether the last RS (e.g., RS5 in Example 2) is associated with the one or more radio resources or the fourth RS among the candidate RSs (RS4 in Example 2)) is still associated with the one or more radio resources. The changed cell configuration parameters such as a numerology (e.g., DL and/or UL operating bands) and/or location of the DL and/or UL operating bands in time and/or frequency domain may cause an ambiguity (e.g., such as described with respect to FIG. 25). The wireless device may determine whether the one or more radio resources are configured based on the changed cell configuration parameters and/or based on the cell configuration parameters determined at a time that the wireless device receives the configuration parameter(s) of the one or more radio resources. The determination by the wireless device may be different from a determination by the base station (e.g., without receiving, by the wireless device, unicast message(s) that may configure and/or re-configure the configuration parameters of the one or more radio resources). This ambiguity may occur, for example, based on (e.g., after or in response to) determining that the cell configuration parameter(s) are changed, and/or that the wireless device has not received a downlink message (e.g., RRC message, MAC CE, and/or DCI that may (re-)configure the configuration parameters of the one or more radio resources) by the time of the transmission via the one or more radio resources.

Figure 26:
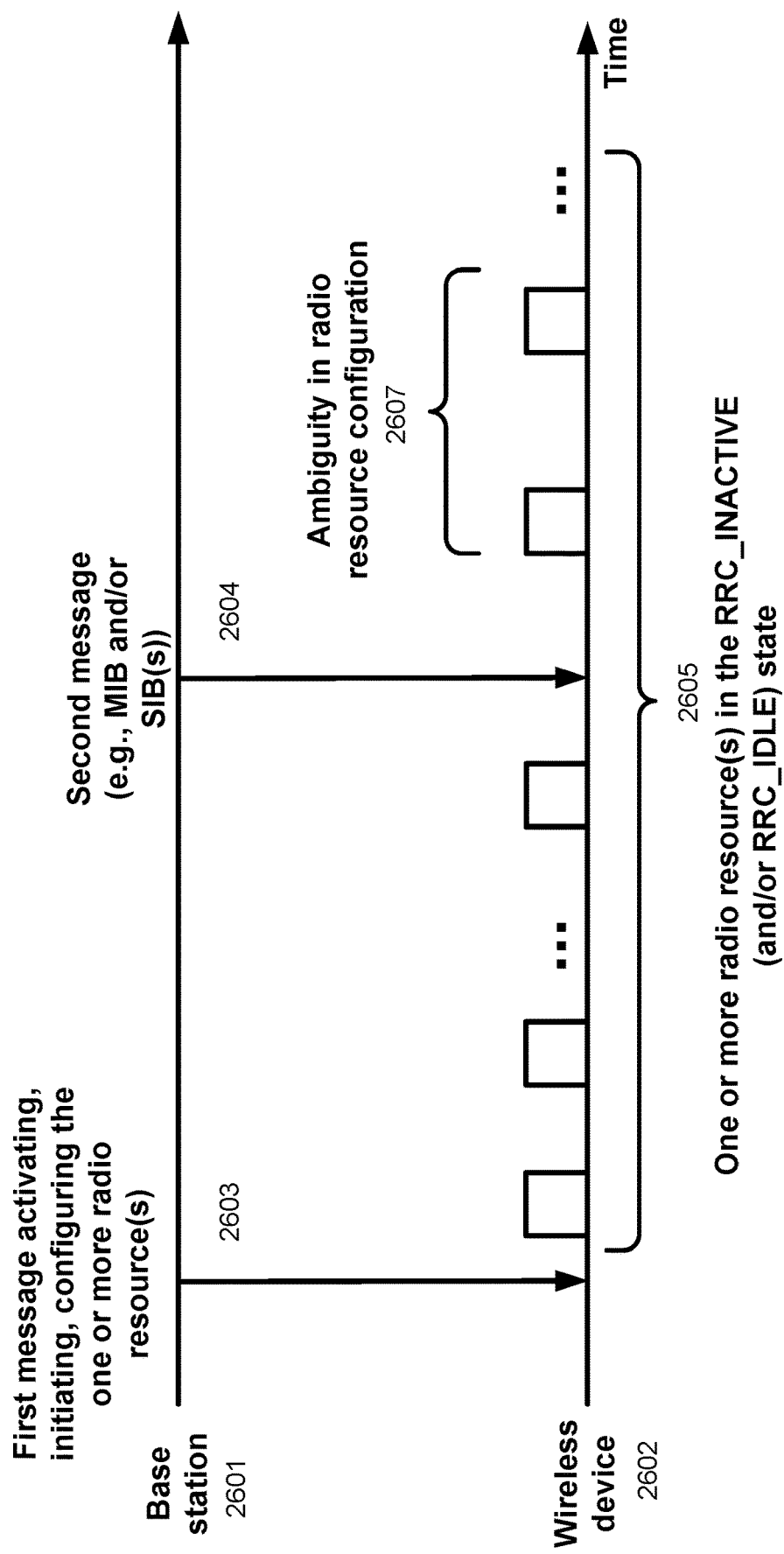
FIG. 26 is an example of a change in one or more cell configuration parameter(s).

FIG. 26 shows an example of a change in one or more cell configuration parameter(s). The change in one or more cell configuration parameters may be for a cell in an RRC_INACTIVE state (and/or in an RRC_IDLE state). A wireless device 2602 may receive, from a base station 2601, a first message 2603 indicating grant(s) of one or more radio resource(s) (e.g., 2605) of an operating band (e.g., DL and/or UL BWP) in an RRC_INACTIVE state (and/or in an RRC_IDLE state). The first message may comprise an RRC release message. The wireless device 2602 may determine radio resource configuration parameters (e.g., periodicity, a time offset, a time reference, frequency location, the like) of the one or more radio resource(s) at least based on the cell configuration parameter(s) (e.g., numerology, subcarrier spacing, a size of RE, bandwidth and/or frequency location of the operating band). The wireless device 2602 may receive a second message 2604 in an RRC_INACTIVE state (and/or in an RRC_IDLE state). The second message may comprise a MIB and/or SIB(s). The wireless device 2602 may determine, based on parameter value(s) indicated by the MIB and/or SIB(s), that one or more values of the cell configuration parameter(s) are changed. The wireless device 2602 and the base station 2601 may have different determinations (e.g., based on, after, or in response to receiving the second message 2604) as to whether the radio resource configuration parameters are based on the changed values of the cell configuration parameter(s) or based on the values of the cell configuration parameter(s) that the wireless device has before receiving the second message. The ambiguity in radio resource configuration parameter(s) (e.g., based on, after, or in response to receiving the second message 2604) may cause a failure of transmission and/or reception using one or more radio resource(s) in the RRC_INACTIVE state (and/or in the RRC_IDLE state) (e.g., at 2607).

As described herein, improved performance may be achieved (e.g., reduced failure) for transmission and/or reception using one or more radio resource(s) in an RRC_INACTIVE state (and/or in an RRC_IDLE state). A wireless device may validate one or more radio resource(s) in an RRC_INACTIVE state (and/or in an RRC_IDLE state) to determine whether the wireless device is to perform transmission and/or reception using one or more radio resource(s). The validation may be based on cell configuration parameter(s), for example, that may be associated with the one or more radio resource(s). The wireless device may determine that the one or more radio resource(s) is invalid to use for the transmission and/or reception, for example, if at least one of cell configuration parameter(s) is different from the one that the wireless device receives in a reference time. The reference time may be a time that the wireless device may receive the configuration parameters of the one or more radio resource(s). The reference time may be a time that the wireless device may perform transmission and/or reception using the one or more radio resource(s) (e.g., the latest transmission and/or reception). The wireless device may not perform transmission and/or reception via the one or more radio resource(s), for example, if the wireless device determines that the one or more radio resource(s) is/are invalid. Validation described herein may result in avoiding an ambiguity between the wireless device and the base station. The validation based on the cell configuration parameter(s) may improve spectral efficiency by stopping unnecessary transmission and/or reception with the ambiguity. The validation based on the cell configuration parameter(s) may reduce power consumption by stopping unnecessary transmission and/or reception with the ambiguity.

Figure 27:
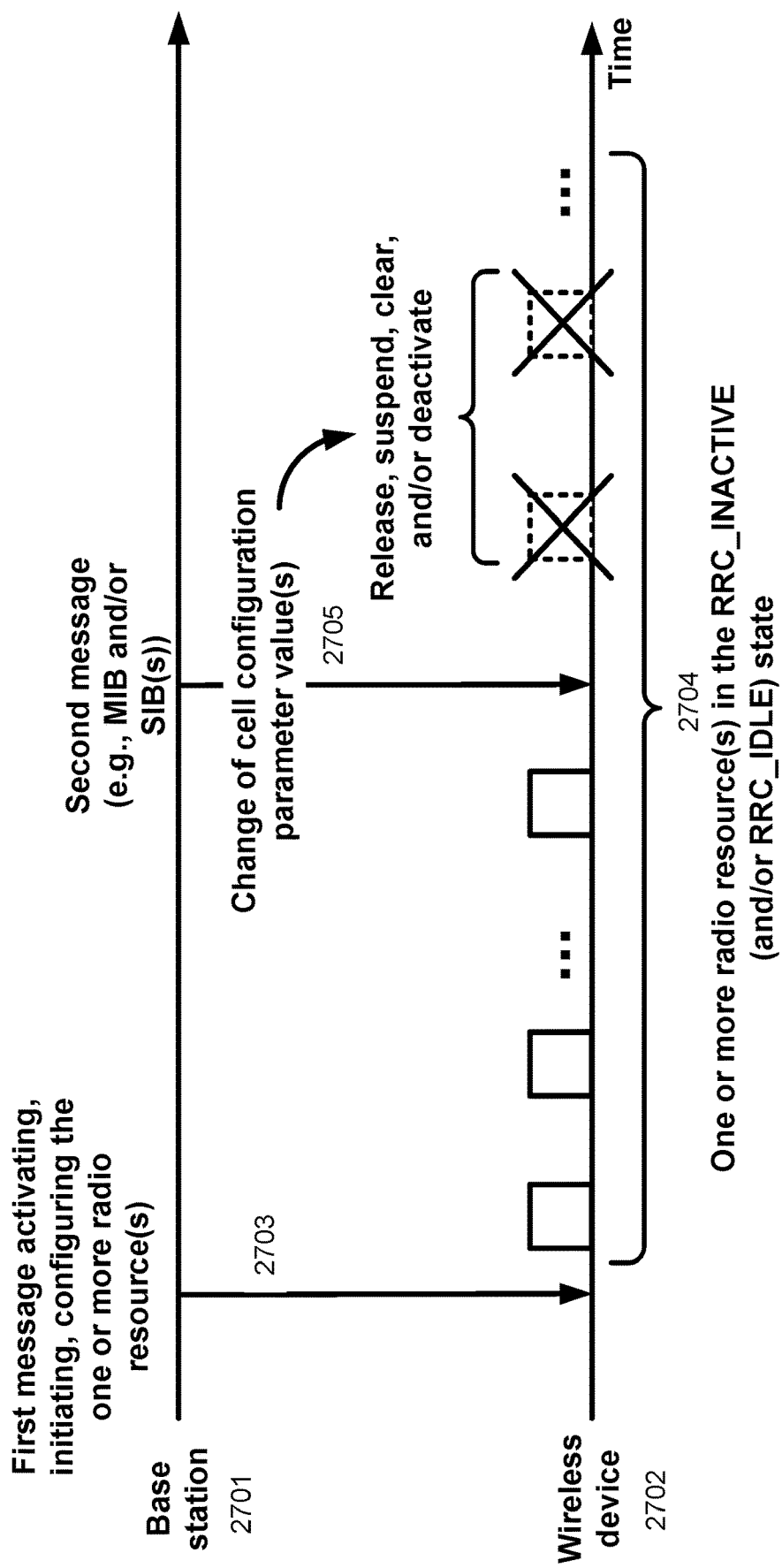
FIG. 27 is an example of a change in one or more cell configuration parameter(s).

FIG. 27 shows an example of a change in one or more cell configuration parameter(s). The change in one or more cell configuration parameters may be for a cell in an RRC_INACTIVE state (and/or in an RRC_IDLE state). A wireless device 2702 may receive, from a base station 2701, a first message 2703 indicating grant(s) of one or more radio resource(s) (e.g., 2704) of an operating band (e.g., DL and/or UL BWP) in an RRC_INACTIVE state (and/or in an RRC_IDLE state). The wireless device 2702 may initiate (activate, and/or configure) the one or more radio resource(s) based on (e.g., after or in response to receiving the first message). The wireless device 2702 may determine radio resource configuration parameters (e.g., periodicity, a time offset, a time reference, frequency location, the like) of the one or more radio resource(s) at least based on one or more cell configuration parameter(s) (e.g., numerology, subcarrier spacing, a size of RE, bandwidth and/or frequency location of the operating band). The wireless device 2702 may receive the cell configuration parameter(s), before or at a time that the wireless device receives the first message 2703. The wireless device 2702 may receive a second message 2705 in an RRC_INACTIVE state (and/or in an RRC_IDLE stte). The second message 2705 may comprise a MIB and/or SIB(s). The wireless device 2702 may determine, based on parameter value(s) indicated by the MIB and/or SIB(s), that one or more values of the cell configuration parameter(s) are changed. The wireless device may determine that the one or more radio resource(s) is/are invalid to use for transmission and/or reception in an RRC_INACTIVE state (and/or in an RRC_IDLE state), for example, based on (e.g., after or in response to) determining that the one or more values of the cell configuration parameter(s) are changed. The wireless device 2702 may stop sending/transmitting and/or receiving data (and/or control information) via the one or more radio resource(s), for example, based on (e.g., after or in response to) determining that the one or more values of the cell configuration parameter(s) are changed. The wireless device 2705 may count skipped occasion(s) as skipped uplink grants (and/or one or more radio resource(s)). The wireless device may increment a counter value of a counter by one (e.g., up-counter, such as described/shown with respect to FIG. 19).

The wireless device determine that the one or more radio resource(s) is valid to use for transmission and/or reception in an RRC_INACTIVE state (and/or in an RRC_IDLE state), for example, if the one or more values of the cell configuration parameter(s) remain the same. The wireless device may selectively determine (e.g., depending on the one or more cell configuration parameter(s)), whether/if the one or more radio resource(s) is valid. The wireless may determine that the one or more radio resource(s) is valid, for example, if a value of reference power of the cell configuration parameter(s) for the transmission in RRC_INACTIVE (and/or RRC_IDLE) is/has changed. The wireless device may determine that the one or more radio resource(s) is invalid, for example, if a number/quantity of candidate SSBs is/has changed.

The one or more values of the cell configuration parameter(s) that are changed may comprise one or more of: DL RS configuration parameter value(s), numerology value(s), and/or BWP configuration parameter value(s). The DL RS configuration parameter value(s) may comprise a number/quantity of sent/transmitted DL RSs (e.g., SSBs and/or CSI-RSs), and/or a number/quantity of candidate DL RSs (e.g., SSBs and/or CSI-RSs), and/or radio resource location (e.g., periodicity) of candidate and/or sent/transmitted DL RSs (e.g., SSBs and/or CSI-RSs). The numerology value(s) may comprise a first numerology of uplink operating band (e.g., UL BWP) and/or a second numerology of downlink operating band (e.g., DL BWP). The BWP configuration parameter value(s) may comprise a bandwidth and/or frequency offset of initial UL BWP, initial DL BWP, uplink operating band (e.g., UL BWP), and/or downlink operating band (e.g., DL BWP).

The wireless device may release the radio resource configuration parameters (e.g., periodicity, a time offset, a time reference, frequency location, the like) of the one or more radio resource(s), for example, based on (e.g., after or in response to) determining that the one or more values of the cell configuration parameter(s) are changed. The wireless device may deactivate (e.g., suspend, and/or clear) the radio resource configuration parameters (e.g., periodicity, a time offset, a time reference, frequency location, the like) of the one or more radio resource(s), for example, based on (e.g., after or in response to) determining the one or more values of the cell configuration parameter(s) are changed. The wireless device may keep the radio resource configuration parameters. The wireless device may initiate and/or re-initiate (and/or reactivate) the radio resource configuration parameters, for example, based on (e.g., after or in response to) a determination that the one or more radio resource(s) is valid to use for transmission and/or reception in an RRC_INACTIVE state (and/or in an RRC_IDLE state).

The wireless device may initiate a random access procedure, for example, based on (e.g., after or in response to) determining that the one or more values of the cell configuration parameter(s) are changed. The wireless device may send/transmit a message comprising a report indicating that the one or more radio resource(s) is invalid to use for transmission and/or reception in an RRC_INACTIVE state (and/or in an RRC_IDLE state). The wireless device may receive second radio resource configuration parameters (e.g., periodicity, a time offset, a time reference, frequency location, the like) of the one or more radio resource(s), for example, based on (e.g., after or in response to) sending/transmitting the message. The second radio resource configuration parameters may be based on the changed one or more values of the cell configuration parameter(s).

The wireless device may determine, based on a type of cell configuration parameter(s) having the changed one or more values, whether to release (deactivate, clear, and/or suspend) or invalidate (and/or skip) the one or more radio resource(s), for example, after or in response to determining that the one or more values of the cell configuration parameter(s) are changed. The wireless device may determine that a number/quantity of candidate DL RSs (e.g., SSBs) remains the same, during a time period that particular candidate DL RS(s) of the candidate DL RSs are not sent/transmitted from a base station. The particular candidate DL RS(s) may be the candidate DL RS(s) that are based on the wireless device determining one or more parameter(s) (e.g., TCI states, and/or spatial relation information) of transmission and/or reception in an RRC_INACTIVE state (and/or in an RRC_IDLE state). DL RS(s) used for the transmission and/or reception in an RRC_INACTIVE state (and/or in an RRC_IDLE state) may be missing (e.g., not transmitted from the base station and/or not received by the wireless device). The wireless device may skip the transmission and/or reception, for example, if the DL RSs are missing. The wireless device may not deactivate (e.g., suspend, and/or clear) the radio resource configuration parameters (e.g., periodicity, a time offset, a time reference, frequency location, the like) of the one or more radio resource(s).

Figure 28:
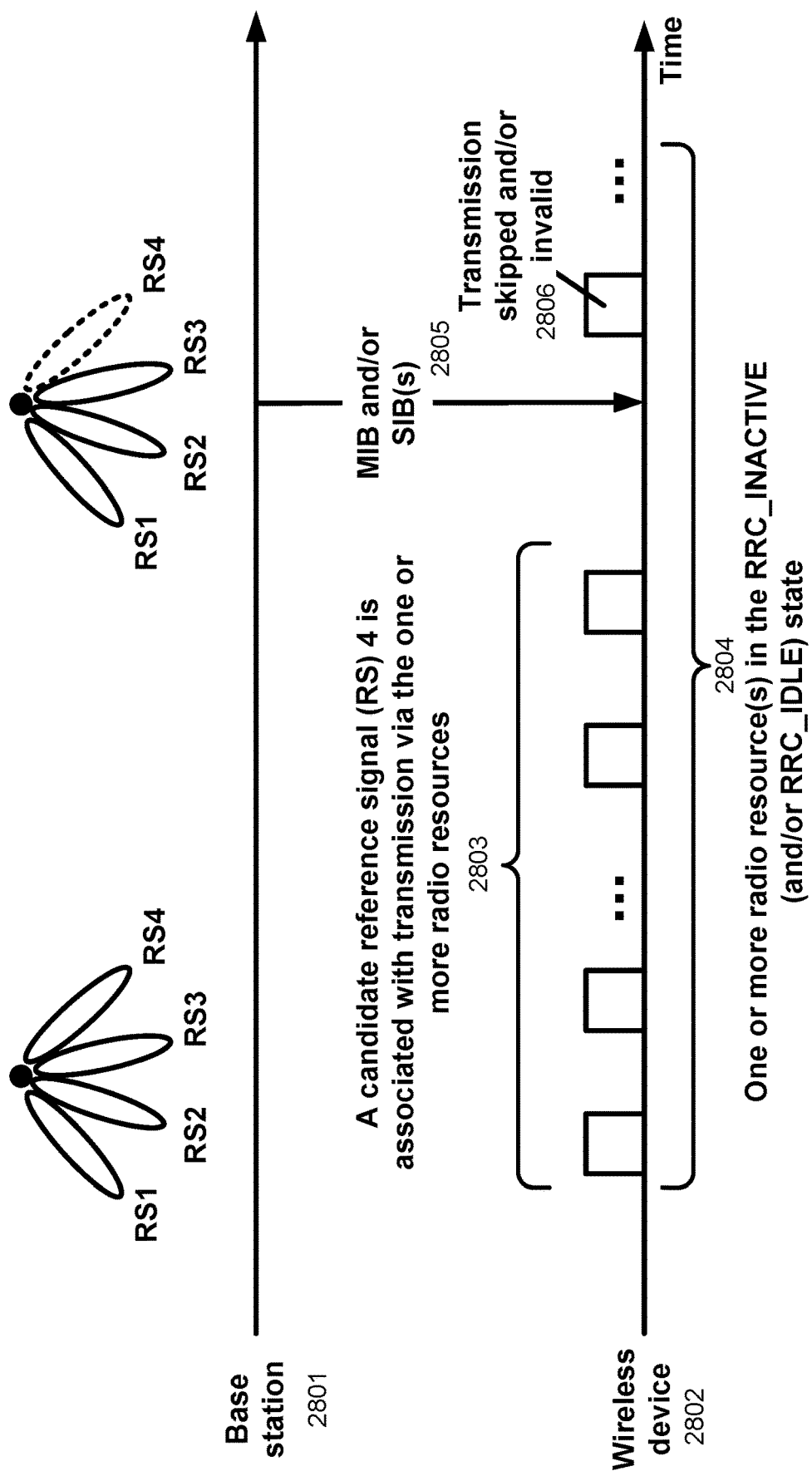
FIG. 28 is an example of a change in one or more cell configuration parameter(s).

FIG. 28 shows an example of a change in one or more cell configuration parameter(s). The change in one or more cell configuration parameter(s) may be for a cell in an RRC_INACTIVE state (and/or in an RRC_IDLE state). A wireless device 2802 may receive, from a base station 2801, one or more configuration parameters (e.g., 2804) of one or more radio resources in RRC_INACTIVE (and/or RRC_IDLE). The one or more configuration parameters may comprise indicator(s) (e.g., TCI states and/or spatial relation information(s)) indicating which RS (e.g. SSB, CSI-RS, and/or SRS) that may be used to send/transmit and/or receive data (and/or control information) in an RRC_INACTIVE state (and/or in an RRC_IDLE state). The indicator(s) may indicate that the wireless device 2802, based on an RS (e.g., RS4), sends/transmits data via the one or more radio resources (e.g., 2803). The RS (e.g., RS4) may comprise a SSB and/or a CSI-RS. RS1, RS2, RS3, and RS4 may comprise candidate RSs. The base station 2801 may send/transmit all of the candidate RSs. The base station 2801 may not send/transmit all of the candidate RSs. The wireless device 2802 may determine, based on a numerology and/or parameter received from a MIB and/or SIB(s) (e.g., ssb-PositionInBurst), how many and/or which candidate RSs are sent/transmitted from the base station 2801. The base station 2801 may send/transmit 4 RSs or any other quantity of RSs (e.g., RS1, RS2, RS3, and RS4), for example, if the wireless device receives the one or more configuration parameters. During a time period that the wireless device is in an RRC_INACTIVE state (and/or in an RRC_IDLE state), the wireless device 2802 may receive a MIB and/or SIB(s) (e.g., at 2805). The wireless device may receive the MIB and/or the SIB(s) via an SI acquisition procedure. The MIB and/or the SIB(s) may indicate that a number/quantity of candidate RSs remains the same, during a time period that the RS (e.g., RS4) is not sent/transmitted from the base station 2801. The wireless device 2802 may not suspend (e.g., deactivate, clear, and/or release) the one or more configuration parameters and/or grant(s) of one or more radio resources in an RRC_INACTIVE state (and/or in an RRC_IDLE state). The wireless device 2802 may keep the configuration parameters and/or grant(s) of one or more radio resources in an RRC_INACTIVE state (and/or in an RRC_IDLE state) as active. The wireless device may stop trasnmission and/or reception of data (and/or of control information) via the one or more radio resource(s), for example, based on (e.g., after or in response to) the wireless device determining that the RS (e.g., RS4) is not sent/transmitted from the base station 2801. The wireless device 2802 may skip (e.g., at 2806) the transmission and/or reception using the RS (e.g., RS4 via the one or more radio resource(s)), for example, based on (e.g., after or in response to) the wireless device determining that the RS (e.g., RS4) is not sent/transmitted from the base station 2801. The wireless device 2802 may invalidate (e.g., at 2806) the transmission and/or reception using the RS (e.g., RS4 via the one or more radio resource(s)), for example, based on (e.g., after or in response to) the wireless device determining that the RS (e.g., RS4) is not sent/transmitted from the base station 2801.

Figure 29:
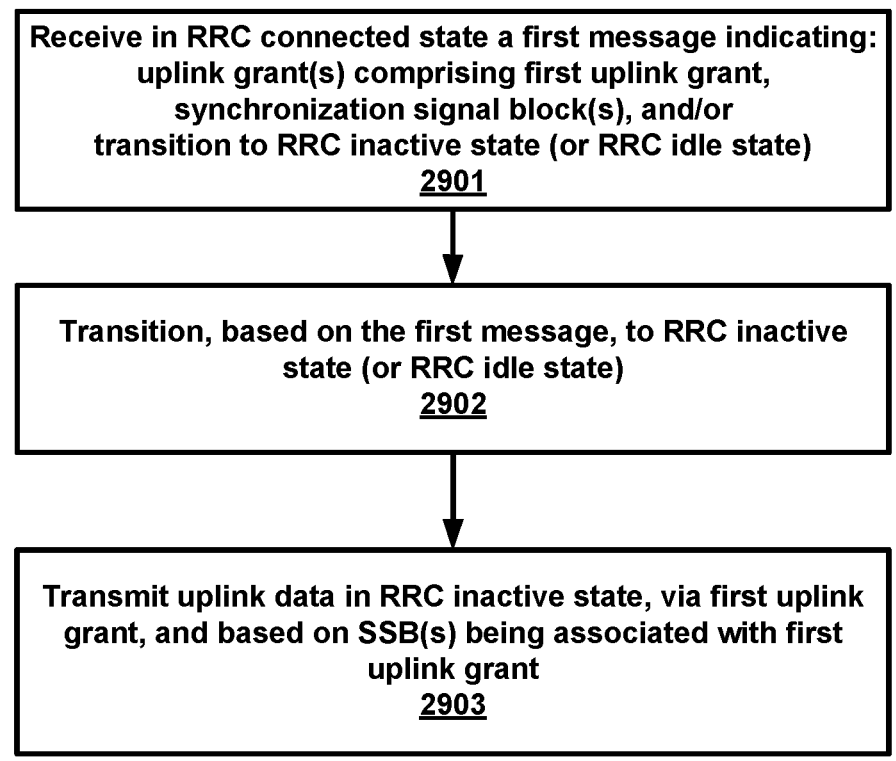
FIG. 29 shows an example method for transmission in an RRC inactive state.

FIG. 29 shows an example method for transmission in an RRC inactive state. The method may be performed by a wireless device. At step 2901, a wireless device may receive a first message. The wireless device may receive the first message in an RRC_CONNECTED state. The first message may indicate one or more configured and/or pre-configured uplink grant(s) (and/or resources of a cell). The one or more configured uplink grant(s) may comprise at least a first uplink grant. The configured and/or pre-configured uplink grant(s) (and/or resources) may be based on a first synchronization signal and/or a PBCH block (SSB) configuration of the cell. At least one SSB may be associated with the first uplink grant. The wireless device may receive a second message indicating a second SSB configuration of the cell. The wireless device may determine that the first SSB configuration is different from the second SSB configuration. The wireless device may stop, based on the determination that the first SB configuration is different from the second SSB configuration, uplink transmission via the one or more configured and/or pre-configured uplink resources. At step 2901, the wireless device may receive the first SSB configuration during a time period that the wireless device has an RRC connection with a base station of the cell (e.g., the wireless device is in an RRC_CONNECTED state). The wireless device may receive the first SSB configuration via a radio resource configuration message dedicated to the wireless device. The one or more configured and/or pre-configured uplink grant(s) (and/or resources) may be configured on an uplink carrier of the cell for an uplink transmission. At step 2901, the first message may comprise a radio resource configuration release message. The first message may indicate a release of an RRC connection. At step 2901, the first message may indicate a switch/transition of an RRC state of the wireless device from an RRC connected state to an RRC inactive state.

At step 2902, the wireless device may switch/transition, based on (e.g., after or in response to) the first message, an RRC state of the wireless device from an RRC connected state to an RRC inactive state (and/or to an RRC idle state). The first message may indicate at least one of: one or more SSBs associated with the one or more configured and/or pre-configured uplink resources; a periodicity of the one or more configured and/or pre-configured uplink resources; a time offset of the one or more configured and/or pre-configured uplink resources; and/or a timing alignment timer value of the one or more configured and/or pre-configured uplink resources. The wireless device may store, during a time period that the wireless device is in a radio resource control (RRC) inactive state, a first packet in an uplink buffer At step 2903, the wireless device may send/transmit uplink data (e.g., a first packet), during a time period that the wireless device remains in the radio resource control (RRC) inactive state, on/via an uplink carrier of the cell via the configured and/or pre-configured uplink resources (e.g., via the first uplink grant). The wireless device may receive, during a time period that the wireless device is in a radio resource control (RRC) inactive state, a system information block (SIB) indicating the first SSB configuration. The wireless device may determine that the first SSB configuration indicated by the SIB is the same as the first SSB configuration associated with the first uplink grant (e.g., on which the configured and/or pre-configured uplink resources are based). The wireless device may continue, based on the determining, uplink transmission via the one or more configured and/or pre-configured uplink resources. The wireless device may store, during a time period that the wireless device is in a radio resource control (RRC) inactive state, a second packet in an uplink buffer. The wireless device may send/transmit the second packet, during a time period that the wireless device remains in the radio resource control (RRC) inactive state, on an uplink carrier of the cell via the configured and/or pre-configured uplink resources. The second message may comprise a broadcast message of the cell. The wireless device may receive the second message based on a SIB acquisition procedure during a time period that the wireless device has no RRC connection with a base station of the cell. The determination that the first SSB configuration is different from the second SSB configuration may be based on no reception of at least one SSB associated with the one or more configured and/or pre-configured uplink resources.

The determination that the first SSB configuration is different from the second SSB configuration may be based on an indication in the second message indicating at least one SSB associated with the one or more configured and/or pre-configured uplink resources is not sent/transmitted from the base station. The determination that the first SSB configuration is different from the second SSB configuration may be based on a first number/quantity of SSBs indicated by the first SSB configuration being different from a second number/quantity of SSBs indicated by the second SSB configuration. The wireless device may store, during a time period that the wireless device is in an RRC inactive state, a third packet in an uplink buffer. The uplink transmission may comprise an uplink transmission of the third packet, during a time period that the wireless device is in the RRC inactive state, via the one or more configured and/or pre-configured uplink resources. The wireless device may initiate random access based on the determination that the first SSB configuration is different from the second SSB configuration. The wireless device may complete the random access. The completing the random access may comprise determining new uplink resources different from the one or more (pre-)configured uplink resources. The wireless device may send/transmit the third packet via the new uplink resources. The wireless device may suspend, based on the determination that the first SSB configuration is different from the second SSB configuration, the one or more (pre-)configured uplink resources. The wireless device may release, based on the determination that the first SSB configuration is different from the second SSB configuration, configuration parameters of the one or more configured and/or pre-configured uplink resources. The wireless device may initiate a random access procedure on the cell based on an uplink data packet available (e.g., uplink data arrival) and/or based on the determination that the first SSB configuration is different from the second SSB configuration.

Figure 30:
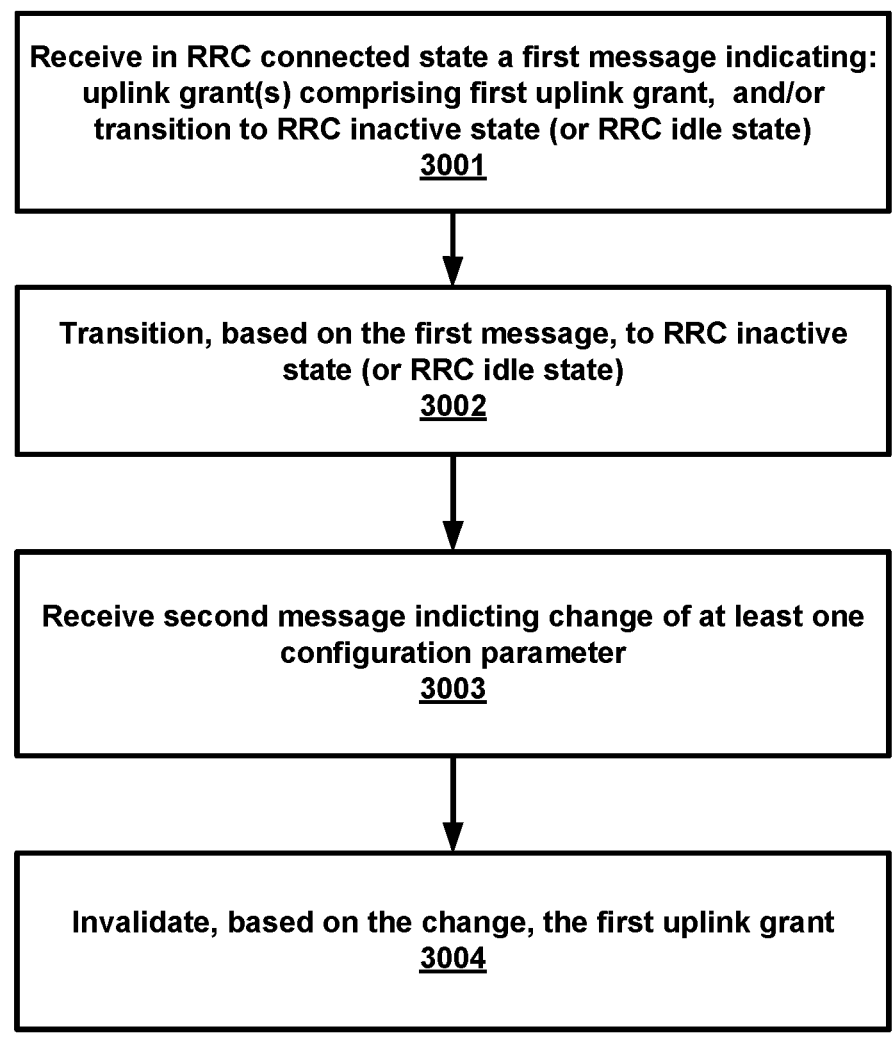
FIG. 30 shows an example method for a change of wireless device configuration.

FIG. 30 shows an example method for a change of wireless device configuration. The method may be performed by a wireless device. At step 3001, a wireless device may receive a first message comprising one or more cell configuration parameters. The one or more cell configuration parameters may comprise first cell configuration parameters of a cell and second configuration parameters of the cell. The first cell configuration parameters may indicate/determine one or more configured and/or pre-configured uplink grant(s) (and/or resources) comprising at least a first uplink grant. Steps 3001 and 3002 may correspond to steps 2901 and 2902, respectively, described with respect to FIG. 29. At step 3003, the wireless device may receive a second message comprising a broadcast message (e.g., a system information block of the cell). The wireless device may determine, based on the second message (e.g., system information block), that at least one parameter of the first configuration parameters has changed. The wireless device may stop, based on the determining/change, an uplink transmission via the one or more configured and/or pre-configured uplink resources (e.g., by invalidating the first uplink grant).

A wireless device may receive a first message indicating one or more configured and/or preconfigured uplink resources of a cell. The configured and/or preconfigured uplink resources may be based on one or more cell configuration parameters of the cell. The wireless device may receive a second message indicating one or more values of the one or more cell configuration parameters. The wireless device may determine that the one or more values of the one or more cell configuration parameters are different from the ones received in a reference time. The wireless device may stop, based on the determination that the one or more values of the one or more cell configuration parameters are different from the ones received in a reference time, uplink transmission via the one or more preconfigured uplink resources. The reference time may be a time that the wireless device receives the first message. The one or more cell configuration parameters may comprise a numerology used for the one or more preconfigured uplink resources. The one or more cell configuration parameters may comprise configuration parameter(s) of an operation band that may be used for the one or more preconfigured uplink resources. The configuration parameters may comprise a bandwidth of the operation band and/or a frequency offset determining a location of the operation band in a frequency domain. The one or more cell configuration parameters may comprise configuration parameter(s) of downlink reference signal(s) associated with the one or more preconfigured uplink resources.

A wireless device may receive a first message indicating one or more configured and/or preconfigured uplink resources of a cell. The configured and/or preconfigured uplink resources may be based on one or more cell configuration parameters of the cell. The wireless device may receive a second message indicating one or more values of the one or more cell configuration parameters. The wireless device may determine that the one or more values of the one or more cell configuration parameters are different from the ones received in a reference time. The wireless device may determine to skip, based on the determination that the one or more values of the one or more cell configuration parameters are different from the ones received in a reference time, uplink transmission via the one or more preconfigured uplink resources. The wireless device may increment a counter value of a counter based on the skipped uplink transmission.

A wireless device may perform a method comprising multiple operations. The wireless device may receive, in a radio resource control (RRC) connected state, an RRC release message. The RRC release message may comprise a wireless device-specific message for the wireless device. The RRC release message may indicate a release of an RRC connection. The RRC message may indicate a transition of the wireless device from the RRC connected state to an RRC inactive state. The RRC inactive state may comprise an RRC idle state. The RRC message may indicate a configured uplink grant (and/or one or more configured uplink grants comprising the configured uplink grant) to transmit uplink data in the RRC inactive state. The configured uplink grant may comprise a configured grant for a small data transmission. The RRC message may indicate at least one synchronization signal block (SSB) of a plurality of SSBs, wherein the at least one SSB is associated with the first configured uplink grant. The RRC release message may indicate, based on a spatial relation information, that the at least one SSB of the plurality of SSBs is associated with the configured uplink grant. The plurality of SSBs may comprise synchronization signal and PBCH blocks. The RRC release message may indicate a bandwidth part of a cell, wherein the configured uplink grant may be configured in the bandwidth part. The bandwidth part may comprise at least one of an initial bandwidth part of the cell or a small data transmission bandwidth part. The bandwidth part may be an initial bandwidth part of the cell. The bandwidth part may be different from an initial bandwidth part of the cell. The bandwidth part may be a bandwidth part used to receive the RRC release message. The wireless device may transition, based on the RRC release message, to the RRC inactive state. The wireless device may transmit, in the RRC inactive state and based on the at least one SSB being associated with the configured uplink grant, uplink data via the configured uplink grant. Transmitting the uplink data may comprise transmitting a small data transmission. The configured uplink grant may be determined based on at least one cell configuration parameter of the cell. The wireless device may receive, in the RRC inactive state, a broadcast message indicating a change of the at least one cell configuration parameter. The wireless device may invalidate, based on the change, a second configured uplink grant for a transmission of uplink data in the RRC inactive state. The change may comprise an absence of at least one of the plurality of SSBs associated with the second configured uplink grant. The wireless device may initiate, based on invalidating the second configured uplink grant, a random access procedure on an initial bandwidth part. The wireless device may release the second configured uplink grant based on invalidating the second configured uplink grant. The wireless device may suspend the second configured uplink grants based on invalidating the second configured uplink grant. The at least one cell configuration parameter may comprise a subcarrier spacing of the configured uplink grant. The at least one cell configuration parameter may comprise burst information of the plurality of the SSBs. The RRC release message may indicate time domain resource allocation of the configured uplink grant comprising at least one of: a periodicity of the configured uplink grant; and/or a time offset of the configured uplink grant. The RRC release message may indicate one or more configuration parameters associated with a bandwidth part, wherein the one or more configuration parameters comprise at least one of: a numerology of the bandwidth part; a number/quantity of resource blocks of the bandwidth part; and/or a frequency location of the bandwidth part. The RRC release message may indicate a timing alignment timer value of the configured uplink grant. The wireless device may comprise one or more processors; and memory storing instructions that, when executed by the one or more processors, cause the wireless device to perform the described method, additional operations and/or include the additional elements. A base station may comprise one or more processors; and memory storing instructions that, when executed by the one or more processors, cause the base station to perform steps complementary to the described wireless device method, additional operations and/or include the additional elements. A system may comprise the wireless device configured to perform the described method, additional operations and/or include the additional elements; and a base station configured to communicate with the wireless device (e.g., send/transmit the RRC release message). A computer-readable medium may store instructions that, when executed, cause performance of the described method, additional operations and/or include the additional elements.

A wireless device may perform a method comprising multiple operations. The wireless device may receive, in a radio resource control (RRC) connected state, an RRC release message. The RRC release message may indicate a transition of the wireless device from the RRC connected state to an RRC inactive state. The RRC release message may indicate a configured uplink grant (and/or one or more configured uplink grants comprising the configured uplink grant), configured in a bandwidth part of a cell, to transmit uplink data in the RRC inactive state. The configured uplink grant may comprise a configured grant for a small data transmission. The RRC release message may indicate configuration parameters of the bandwidth part of the cell. The wireless device may transition, based on the RRC release message, to the RRC inactive state. The wireless device may transmit, in the RRC inactive state and using the bandwidth part, uplink data via the configured uplink grant. Transmitting the uplink data may comprise transmitting a small data transmission. The RRC inactive state may comprise an RRC idle state. The configuration parameters may comprise at least one of: a frequency location of the bandwidth part; a number/quantity of resource blocks of the bandwidth part; and/or a numerology of the bandwidth part. The bandwidth part may comprise at least one of an initial bandwidth part of the cell or a small data transmission bandwidth part. The bandwidth part may be different from an initial bandwidth part of the cell. The initial bandwidth part may comprise radio resources of a random access procedure that the wireless device initiate in the RRC inactive state. The bandwidth part may comprise a bandwidth part used to receive the RRC release message. The wireless device may comprise one or more processors; and memory storing instructions that, when executed by the one or more processors, cause the wireless device to perform the described method, additional operations and/or include the additional elements. A base station may comprise one or more processors; and memory storing instructions that, when executed by the one or more processors, cause the base station to perform steps complementary to the described wireless device method, additional operations and/or include the additional elements. A system may comprise the wireless device configured to perform the described method, additional operations and/or include the additional elements; and a base station configured to communicate with the wireless device (e.g., send/transmit the RRC release message). A computer-readable medium may store instructions that, when executed, cause performance of the described method, additional operations and/or include the additional elements.

A wireless device may perform a method comprising multiple operations. The wireless device may receive, in a radio resource control (RRC) connected state, an RRC release message. The RRC release message may indicate a transition of the wireless device from the RRC connected state to an RRC inactive state. The RRC release message may indicate one or more configured uplink grants comprising a configured uplink grant (and/or one or more configured uplink grants comprising the configured uplink grant) to transmit uplink data in the RRC inactive state. The configured uplink grant may comprise a configured grant for a small data transmission. The wireless device may transition, based on the RRC release message, to the RRC inactive state. The wireless device may receive, in the RRC inactive state, a broadcast message indicating a change of at least one cell configuration parameter. The wireless device may invalidate, based on the change, the configured uplink grant. The wireless device may transmit, in the RRC inactive state and prior to the receiving the broadcast message, uplink data via the configured uplink grant. Transmitting the uplink data may comprise transmitting a small data transmission. The change may comprise an absence of at least one of the plurality of SSBs associated with one or more configured uplink grants (e.g., the configured grant). The RRC inactive state may comprise an RRC idle state. The at least one cell configuration parameter may comprise at least one of: a subcarrier spacing of uplink radio resource for the transmission; and/or burst information of one or more synchronization signal and PBCH blocks (SSBs) of the cell. The wireless device may comprise one or more processors; and memory storing instructions that, when executed by the one or more processors, cause the wireless device to perform the described method, additional operations and/or include the additional elements. A base station may comprise one or more processors; and memory storing instructions that, when executed by the one or more processors, cause the base station to perform steps complementary to the described wireless device method, additional operations and/or include the additional elements. A system may comprise the wireless device configured to perform the described method, additional operations and/or include the additional elements; and a base station configured to communicate with the wireless device (e.g., send/transmit the RRC release message). A computer-readable medium may store instructions that, when executed, cause performance of the described method, additional operations and/or include the additional elements.

A base station may perform a method comprising multiple operations. The base station may transmit a radio resource control (RRC) release message indicating: a transition of a wireless device from an RRC connected state to an RRC inactive state; a configured uplink grant to transmit uplink data in the RRC inactive state; and/or at least one synchronization signal block (SSB) of a plurality of SSBs, wherein the at least one SSB is associated with the configured uplink grant. The base station may receive, from the wireless device and based on the at least one SSB being associated with the configured uplink grant, uplink data via the configured uplink grant. The configured uplink grant may comprise a configured grant for a small data transmission. Receiving the uplink data may comprise receiving a small data transmission. The RRC release message may be a wireless device-specific message for the wireless device. The RRC release message may indicate a release of an RRC connection. The RRC release message may indicate a bandwidth part of a cell. The configured uplink grant may be configured in the bandwidth part. The base station may comprise one or more processors; and memory storing instructions that, when executed by the one or more processors, cause the base station to perform the described method, additional operations and/or include the additional elements. A wireless device may comprise one or more processors; and memory storing instructions that, when executed by the one or more processors, cause the wireless device to perform steps complementary to the described base station method, additional operations and/or include the additional elements. A system may comprise the base station configured to perform the described method, additional operations and/or include the additional elements; and a wireless device configured to communicate with the base station (e.g., send/transmit the uplink data). A computer-readable medium may store instructions that, when executed, cause performance of the described method, additional operations and/or include the additional elements.

A base station may perform a method comprising multiple operations. The base station may transmit a radio resource control (RRC) release message indicating: a transition of a wireless device from an RRC connected state to an RRC inactive state; a configured uplink grant, configured in a bandwidth part of a cell, to transmit uplink data in the RRC inactive state; and/or configuration parameters of the bandwidth part of the cell. The base station may receive, from the wireless device and using the bandwidth part of the cell, uplink data via the configured uplink grant. The configuration parameters of the bandwidth part of the cell may comprise at least one of: a frequency location of the bandwidth part; a quantity of resource blocks of the bandwidth part; or a numerology of the bandwidth part. The bandwidth part may comprise at least one of: an initial bandwidth part; or a small data transmission bandwidth part. The bandwidth part may be a bandwidth part used to receive the RRC release message. The configured uplink grant may comprise a configured grant for a small data transmission. Receiving the uplink data may comprise receiving a small data transmission. The base station may comprise one or more processors; and memory storing instructions that, when executed by the one or more processors, cause the base station to perform the described method, additional operations and/or include the additional elements. A wireless device may comprise one or more processors; and memory storing instructions that, when executed by the one or more processors, cause the wireless device to perform steps complementary to the described base station method, additional operations and/or include the additional elements. A system may comprise the base station configured to perform the described method, additional operations and/or include the additional elements; and a wireless device configured to communicate with the base station (e.g., send/transmit the uplink data). A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
receiving, by a wireless device, at least one system information block message indicating an initial bandwidth part configured for the wireless device, wherein the at least one system information block message further indicates whether a second bandwidth part, different from the initial bandwidth part, is configured for the wireless device for uplink data transmission during a radio resource control (RRC) inactive state;
receiving, by the wireless device in an RRC connected state and via a cell, an RRC release message comprising:
an indication to transition the wireless device from the RRC connected state to the RRC inactive state;
an indication of a configured uplink grant to transmit, via the cell and in the RRC inactive state, uplink data; and
an identifier of an index of at least one synchronization signal block (SSB), of a plurality of SSBs of the cell, associated with the configured uplink grant;
transitioning, based on the RRC release message, to the RRC inactive state;
receiving an SSB of the at least one SSB indicated by the RRC release message; and
based on the at least one system information block message indicating the second bandwidth part is not configured for the wireless device for uplink data transmission during the RRC inactive state, transmitting, in the RRC inactive state and using the initial bandwidth part instead of the second bandwidth part, uplink data via the configured uplink grant indicated by the RRC release message.

2. The method of claim 1, wherein the configured uplink grant comprises a configured grant for a small data transmission.

3. The method of claim 1, wherein the transmitting the uplink data comprises transmitting a small data transmission, and
wherein the transmitting the uplink data is further based on:
the configured uplink grant; and
the SSB of the at least one SSB.

4. The method of claim 1, wherein the RRC release message is a wireless device specific message for the wireless device.

5. The method of claim 1, wherein the RRC release message indicates a release of an RRC connection.

6. The method of claim 1, wherein the RRC release message indicates a bandwidth part of the cell.

7. The method of claim 6, wherein the bandwidth part comprises at least one of:
the initial bandwidth part; or
the second bandwidth part.

8. The method of claim 1, further comprising:
based on receiving, by the wireless device in the RRC inactive state, a broadcast message indicating a change of at least one cell configuration parameter, invalidating the configured uplink grant.

9. The method of claim 1, wherein the receiving the SSB comprises receiving the SSB during a time period in which the wireless device is in the RRC inactive state.

10. A method comprising:
transmitting, by a base station, at least one system information block message indicating an initial bandwidth part configured for a wireless device, wherein the at least one system information block message further indicates whether a second bandwidth part, different from the initial bandwidth part, is configured for the wireless device for uplink data transmission during a radio resource control (RRC) inactive state;
transmitting, by the base station and via a cell, an RRC release message comprising:
an indication to transition the wireless device from an RRC connected state to the RRC inactive state;
an indication of a configured uplink grant to transmit, via the cell and in the RRC inactive state, uplink data; and
an identifier of an index of at least one synchronization signal block (SSB), of a plurality of SSBs of the cell, associated with the configured uplink grant;
transmitting an SSB of the at least one SSB indicated by the RRC release message; and
based on the at least one system information block message indicating the second bandwidth part is not configured for the wireless device for uplink data transmission during the RRC inactive state, receiving, from the wireless device in the RRC inactive state and via the initial bandwidth part instead of the second bandwidth part, uplink data via the configured uplink grant indicated by the RRC release message.

11. The method of claim 10, wherein the configured uplink grant comprises a configured grant for a small data transmission.

12. The method of claim 10, wherein the receiving the uplink data comprises receiving a small data transmission.

13. The method of claim 10, wherein the RRC release message is a wireless device specific message for the wireless device.

14. The method of claim 10, wherein the RRC release message indicates a release of an RRC connection.

15. The method of claim 10, wherein the receiving the uplink data is further based on:
the configured uplink grant; and
the SSB of the at least one SSB.

16. A method comprising:
receiving, by a wireless device, at least one system information block message indicating an initial bandwidth part configured for the wireless device, wherein the at least one system information block message further indicates whether a second bandwidth part, different from the initial bandwidth part, is configured for the wireless device for uplink data transmission during a radio resource control (RRC) inactive state;

receiving, by the wireless device in an RRC connected state, an RRC release message comprising:
- an indication to transition the wireless device from the RRC connected state to the RRC inactive state;
- an indication of a configured uplink grant, configured in the second bandwidth part, to transmit uplink data in the RRC inactive state;
- an identifier of an index of at least one synchronization signal block (SSB), of a plurality of SSBs of a cell, associated with the configured uplink grant; and
- configuration parameters, of the second bandwidth part, for transmission of uplink data;

transitioning, based on the RRC release message, to the RRC inactive state; and based on the at least one system information block message indicating the second bandwidth part is configured for the wireless device for uplink data transmission during the RRC inactive state, transmitting, in the RRC inactive state, using the second bandwidth part instead of the initial bandwidth part, uplink data via the configured uplink grant indicated by the RRC release message.

17. The method of claim 16, wherein the initial bandwidth part is an initial bandwidth part of the cell.

18. The method of claim 16, wherein the configuration parameters of the second bandwidth part comprise at least one of:
- a frequency location of the second bandwidth part;
- a quantity of resource blocks of the second bandwidth part; or
- a numerology of the second bandwidth part.

19. The method of claim 16, wherein the second bandwidth part comprises a small data transmission bandwidth part.

20. The method of claim 16, wherein the second bandwidth part is a bandwidth part used to receive the RRC release message.

21. The method of claim 16, wherein the configured uplink grant comprises a configured grant for a small data transmission.

22. The method of claim 16, wherein the transmitting the uplink data comprises transmitting a small data transmission, and
wherein the transmitting the uplink data is further based on:
- the configured uplink grant configured in the second bandwidth part; and
- an SSB of the at least one SSB.

23. The method of claim 16, wherein the initial bandwidth part is a bandwidth part used for at least one of a cell search process or a random access process.

24. A method comprising:
transmitting, by a base station, at least one system information block message indicating an initial bandwidth part configured for a wireless device, wherein the at least one system information block message further indicates whether a second bandwidth part, different from the initial bandwidth part, is configured for the wireless device for uplink data transmission during a radio resource control (RRC) inactive state;

transmitting, by the base station, an RRC release message comprising:
- an indication to transition the wireless device from an RRC connected state to the RRC inactive state;
- an indication of a configured uplink grant, configured in the second bandwidth part, to transmit uplink data in the RRC inactive state;
- an identifier of an index of at least one synchronization signal block (SSB), of a plurality of SSBs of a cell, associated with the configured uplink grant; and
- configuration parameters, of the second bandwidth part, for transmission of uplink data; and based on the at least one system information block message indicating the second bandwidth part is configured for the wireless device for uplink data transmission during the RRC inactive state, receiving, via the second bandwidth part instead of the initial bandwidth part, from the wireless device, uplink data via the configured uplink grant indicated by the RRC release message.

25. The method of claim 24, wherein the configuration parameters of the second bandwidth part comprise at least one of:
- a frequency location of the second bandwidth part;
- a quantity of resource blocks of the second bandwidth part; or
- a numerology of the second bandwidth part.

26. The method of claim 24, wherein the second bandwidth part comprises a small data transmission bandwidth part.

27. The method of claim 24, wherein the second bandwidth part is a bandwidth part used to transmit the RRC release message.

28. The method of claim 24, wherein the configured uplink grant comprises a configured grant for a small data transmission.

29. The method of claim 24, wherein the receiving the uplink data comprises receiving a small data transmission, and
wherein the receiving the uplink data is further based on:
- the configured uplink grant configured in the second bandwidth part; and
- an SSB of the at least one SSB.

30. The method of claim 24, wherein the initial bandwidth part is a bandwidth part used for at least one of a cell search process or a random access process.

\* \* \* \* \*